US012456553B2

(12) United States Patent
Matos et al.

(10) Patent No.: US 12,456,553 B2
(45) Date of Patent: Oct. 28, 2025

(54) PERSONALIZED RECOMMENDATIONS IN A DIGITAL THERAPY PLATFORM

(71) Applicant: Sword Health, S.A., Oporto (PT)

(72) Inventors: Ana Clara Ferreira Matos, Oporto (PT); Diogo Ricardo Castro Gonçalves, Oporto (PT); Daniela Alves do Paço, Oporto (PT); Virgílio António Ferro Bento, Oporto (PT); João Pedro de Jesus Vieira Pereira, Oporto (PT); Filipe Daniel Martins Rodrigues, Oporto (PT); Ivo Emanuel Marques Gabriel, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 0 days.

(21) Appl. No.: 18/585,380

(22) Filed: Feb. 23, 2024

(65) Prior Publication Data
US 2025/0273351 A1 Aug. 28, 2025

(51) Int. Cl.
G16H 80/00 (2018.01)
G16H 20/00 (2018.01)

(52) U.S. Cl.
CPC ............. G16H 80/00 (2018.01); G16H 20/00 (2018.01)

(58) Field of Classification Search
CPC .............................. G16H 80/00; G16H 20/00
(Continued)

(56) References Cited

U.S. PATENT DOCUMENTS 9,898,789 B2 2/2018 Ram et al.
10,130,311 B1 11/2018 De Sapio et al.
(Continued)

FOREIGN PATENT DOCUMENTS

CN 115023763 A * 9/2022 ............. G06N 20/00
WO WO-2015103442 A1 7/2015
(Continued)

OTHER PUBLICATIONS

Yogesh Kalakoti et al.; TransDTI: Transformer-Based Language Models for Estimating DTIs and Building a Drug Recommendation Workflow; ACS Publications; ACS Omega 2022, 7, 2706-2717 (Year: 2022).*
(Continued)

Primary Examiner — Hiep V Nguyen
(74) Attorney, Agent, or Firm — SCHWEGMAN LUNDBERG & WOESSNER, P.A.

(57) ABSTRACT

An example digital therapy platform is disclosed that provides personalized recommendations. Patient data is collected from a plurality of data sources associated with a patient profile of a patient in the digital therapy platform. At least a subset of the patient data is processed to detect a patient event. In response to detecting the patient event, a personalized recommendation is generated. The personalized recommendation is associated with the patient profile and generated using at least one machine learning model. An action is invoked in the digital therapy platform based on the personalized recommendation, and the patient profile is adjusted to reflect the action. The digital therapy platform causes presentation of at least one of a first indication of the action at a first device associated with a therapist assigned to the patient profile or a second indication of the action at a second device associated with the patient.

19 Claims, 19 Drawing Sheets

(58) Field of Classification Search
USPC .......................................................... 705/2
See application file for complete search history.

(56) References Cited

U.S. PATENT DOCUMENTS

| | | | |
|---|---|---|---|
| 10,413,238 B1 | 9/2019 | Cooper et al. | |
| 11,039,763 B2 | 6/2021 | Ye et al. | |
| 2007/0179816 A1 | 8/2007 | Lemme | |
| 2012/0290319 A1* | 11/2012 | Saria ...................... | G16H 15/00 |
| | | | 705/3 |
| 2015/0038806 A1 | 2/2015 | Kaleal, III et al. | |
| 2015/0324532 A1 | 11/2015 | Jones et al. | |
| 2018/0330810 A1* | 11/2018 | Gamarnik .............. | G16H 10/20 |
| 2019/0328322 A1 | 10/2019 | Inada | |
| 2020/0066390 A1 | 2/2020 | Svendrys et al. | |
| 2020/0114207 A1 | 4/2020 | Weldemariam et al. | |
| 2021/0202103 A1* | 7/2021 | Bostic .................... | G16H 50/80 |
| 2022/0016484 A1 | 1/2022 | Bissonnette et al. | |
| 2022/0076666 A1 | 3/2022 | Trehan | |
| 2022/0208385 A1 | 6/2022 | Voschina et al. | |
| 2022/0246268 A1 | 8/2022 | Hunter et al. | |
| 2022/0392611 A1 | 12/2022 | Appelbaum et al. | |
| 2023/0071274 A1 | 3/2023 | Trehan | |

FOREIGN PATENT DOCUMENTS

| | | | | |
|---|---|---|---|---|
| WO | WO-2019010435 A1 | | 1/2019 | |
| WO | WO-2020198065 A1 | * | 10/2020 | ............... A61B 5/16 |
| WO | WO-2022086454 A1 | * | 4/2022 | ........... A61B 5/0077 |

OTHER PUBLICATIONS

U.S. Appl. No. 18/585,355, Response filed Oct. 29, 2024 to Non Final Office Action mailed Jul. 30, 2024, 15 pgs.

U.S. Appl. No. 18/585,355, Non Final Office Action mailed Jul. 30, 2024, 20 pgs.

U.S. Appl. No. 18/585,355, Advisory Action mailed Feb. 11, 2025, 3 pgs.

U.S. Appl. No. 18/585,355, Final Office Action mailed Dec. 2, 2024, 18 pgs.

U.S. Appl. No. 18/585,355, Notice of Allowance mailed Mar. 19, 2025, 7 pgs.

U.S. Appl. No. 18/585,355, Response filed Jan. 31, 2025 to Final Office Action mailed Dec. 2, 2024, 17 pgs.

* cited by examiner

PERSONALIZED RECOMMENDATIONS IN A DIGITAL THERAPY PLATFORM

BACKGROUND

The field of digital therapy, encompassing a wide range of treatments and activities, has seen significant advancements in recent years, particularly with the integration of technology to assist in the rehabilitation, treatment, and support of patients, as well as communication between patients and therapists.

A therapist is often responsible for assigning a suitable digital therapy program to a patient, modifying the digital therapy program if needed, and communicating with the patient throughout their digital therapy journey. Communication between a therapist and a patient can facilitate effective treatment management, patient adherence or improvement, and overall satisfaction with a therapeutic process. In many cases, digital therapy technology allows for bidirectional communication between a therapist and a patient. Such communications may occur during therapy sessions (e.g., the therapist may guide a patient through an exercise) or between therapy sessions (e.g., the therapist may send the patient reminders or tips prior to an upcoming therapy session).

However, therapist-patient interactions in digital therapy may be limited by the availability of therapists and challenges in scaling digital therapy platforms. For example, a therapist, constrained by time and resources, can struggle to maintain personalized and timely interactions with each patient assigned to them, which can lead to gaps in understanding and addressing individual health needs and preferences. This challenge may be exacerbated in scenarios where there is a shortage of therapists, which can negatively impact the quality and responsiveness of communications.

Some digital therapy platforms have attempted to facilitate patient communication through automated systems. However, these systems typically rely on generic templates and predefined responses that may lack the depth and personalization necessary for effective therapy management. An automated system might, for instance, send a standard follow-up message or a reminder to a patient based on a scheduled timeline, without considering the patient's specific circumstances or recent interactions with the digital therapy platform. This can result in mechanical interactions between the patient and the system, making the experience less engaging for the patient and possibly even leading to the patient disregarding communications.

The limitations of traditional systems may be multifaceted. For example, an automated system may fail to capture the dynamic nature of a patient's therapy journey, such as changes in their condition, their individual response to treatment, or personal feedback. As an example, due to a recent injury, the patient may be struggling with various exercises during digital physical therapy sessions and need personalized attention, such as tips for improving performance or even a modified digital therapy program (e.g., easier exercises to account for the recent injury). A system relying on generic templates and predefined responses may lack the technical capabilities to facilitate a significant improvement in such a patient's condition or experience.

Another technical challenge associated with existing systems is the form and content of automated communications. In this regard, automated messages sent to a patient may not fully convey the empathy and support that a patient might receive from a human therapist. For example, the patient may receive messages from an automated system that are clearly generic or template-based and that do not offer actionable insights based on the patient's specific needs, goals, or challenges.

Furthermore, existing systems may lack the technical capabilities to provide a therapist with actionable insights or recommendations based on patient data from various data sources. As a result, a therapist might need to spend a significant amount of time analyzing patient information (e.g., the medical history and performance of the patient over time) to make informed decisions. This is a time-consuming and cumbersome process, further constraining resources while not necessarily leading to optimal treatment adjustments. Moreover, this can limit the scalability of a digital therapy platform.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
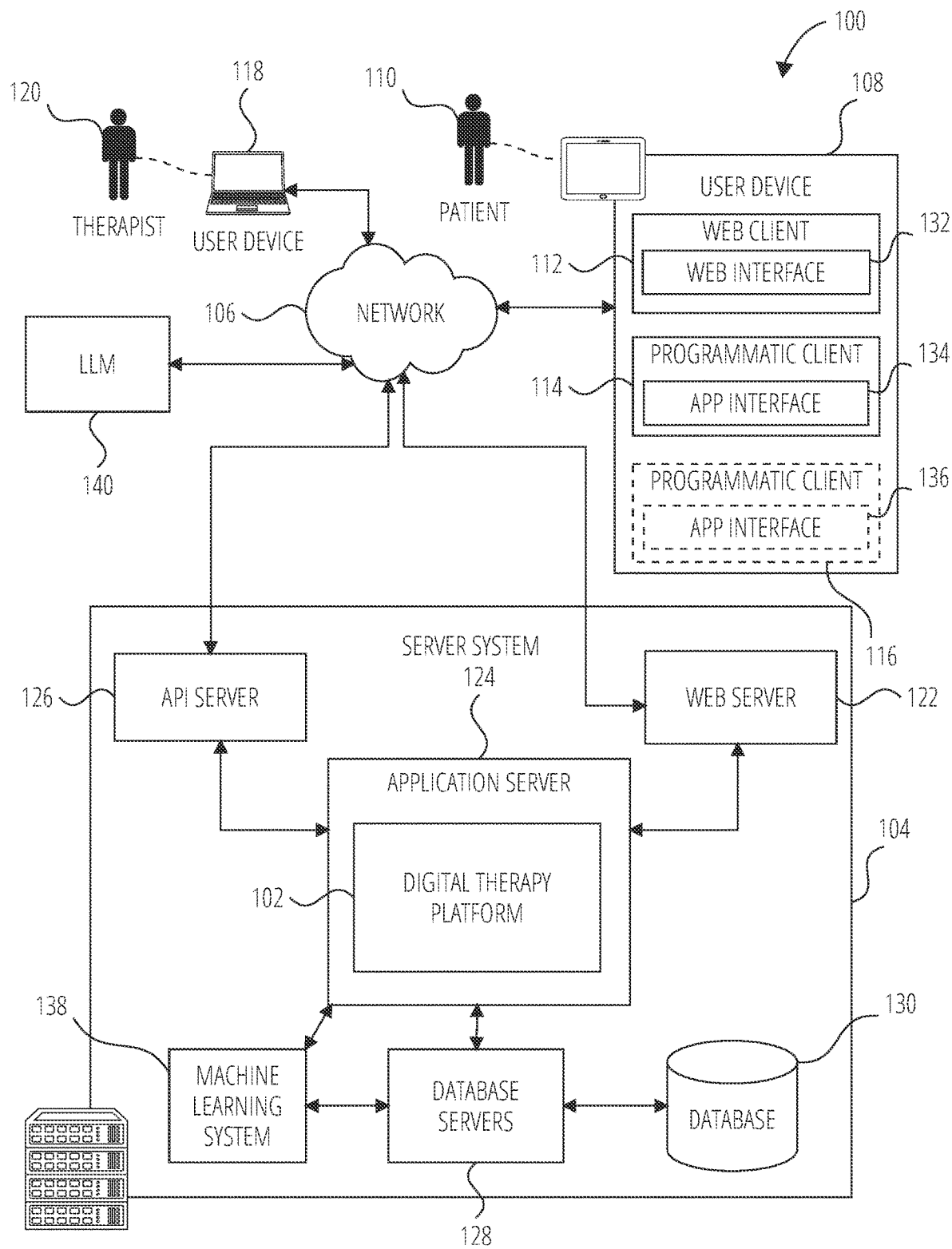
FIG. 1 diagrammatically illustrates a networked computing environment that includes a digital therapy platform, according to some examples.

The present disclosure uses the terms "digital therapy," "digital therapy platform," "patient," "therapist," and "therapy session." As used herein, the term "digital therapy" may include a broad spectrum of health and wellness therapies, interventions, plans, programs, or activities delivered at least partially through digital means. Digital therapy may be aimed at addressing or diagnosing specific conditions and/or aimed at promoting physical fitness or well-being and/or aimed at preventative care. Accordingly, digital therapy may include targeted therapeutic plans, such as those for musculoskeletal (MSK) rehabilitation, pelvic-floor therapy, or behavioral therapy, but may also include more general activities that are not necessarily linked to a specific therapeutic condition, such as general fitness-related exercises, strength exercises, or injury prevention. Digital therapy programs may be personalized and interactive, where activities are tailored to an individual's health objectives, whether for specific therapeutic purposes or more general purposes (such as fitness enhancement).

As used herein, the term "digital therapy platform" may include a technology-based or technology-driven platform designed to facilitate one or more health-related and/or wellness-related activities. As mentioned above with reference to "digital therapy," activities associated with a digital therapy platform may be aimed at addressing or diagnosing specific conditions and/or aimed at promoting physical fitness or well-being and/or aimed at preventative care. Accordingly, utilization of a digital therapy platform is not necessarily limited to diagnosing, treating, or managing specific conditions, as it may also be used for general or regular exercise (for example). A digital therapy platform may integrate or leverage various digital tools, such as mobile applications, web applications, wearable devices, motion trackers, other sensors, and/or interactive software to provide personalized solutions.

As used herein, the term "patient" may include a person making use of digital therapy or a digital therapy platform to facilitate health and/or wellness, whether generally or to address a specific condition or concern. A patient may be a person who engages with a digital therapy platform to seek guidance, support, or interventions. A patient may have a specific medical condition that needs to be addressed, or may utilize digital therapy for more general purposes or regular exercise. For example, a patient may be a person who utilizes the digital therapy platform for MSK rehabilitation through a targeted digital therapy program that includes exercises aimed at rehabilitating the person, or a person who utilizes the digital therapy platform to improve general fitness levels without having a targeted digital therapy program assigned to them.

As used herein, the term "therapist" may include a therapist (e.g., a physical therapist), clinician, physician, other healthcare professional, or worker (e.g., a personal trainer) that treats, manages, communicates with, or otherwise assists with advising, guiding, motivating, treating, or rehabilitating a patient in a digital therapy context. For example, in the context of the present disclosure, a therapist can be a person assigned to work with a patient by offering advice, designing or adapting digital therapy programs, and/or providing motivation and support. In some examples, a therapist involved with a digital therapy platform can have multiple patients assigned to them.

In the context of digital therapy or a digital therapy platform, the term "therapy session" (or simply "session"), as used herein, may include a patient/user engagement with the digital therapy platform. An engagement may involve the patient performing one or more exercises based on instructions or guidance provided by the digital therapy platform, in which case the session can be referred to as an exercise session. A session may be tailored to address a specific health condition (e.g., through targeted exercises). In some cases, a session may be aimed at supporting general wellness, prevention, or fitness goals, without being targeted to a specific condition. Accordingly, a session may involve targeted or general exercises, depending on a patient's needs or requirements. For example, a therapy goal of a patient might be to address or alleviate a specific medical condition, or simply to improve overall health or well-being.

The following technical description of a digital therapy platform, according to some examples, outlines limitations of traditional systems and benefits of employing machine learning models, such as large language models (LLMs), to provide a more adaptive, personalized, efficient, and/or engaging therapy experience.

Examples described herein provide a digital therapy platform that leverages artificial intelligence (AI), such as machine learning algorithms (e.g., LLMs), to analyze patient data from various sources and generate personalized recommendations for therapists. This enables therapists to manage treatment protocols more effectively and maintain a high level of patient engagement, even in the face of resource constraints.

An example system enables a continuous dialogue between the therapist and the patient, encompassing treatment adjustments as well as motivational and supportive messages. By providing a platform that can intelligently process and respond to patient events in real-time, examples described herein provide improvements in the field of digital therapy, offering a more adaptive, personalized, and engaging experience for both patients and therapists.

In some examples, the system processes patient data to detect patient events and trigger appropriate recommendations and/or actions. The recommendations are tailored to the individual needs of each patient, taking into account, for example, their unique clinical conditions, progress, goals, and/or preferences. By doing so, a digital therapy platform aids a therapist in making informed decisions, optimizing treatment plans, and maintaining a high level of patient engagement.

For instance, upon detecting a patient event such as a change in reported pain level or a missed session, the digital therapy platform can automatically suggest a modification to the digital therapy program (e.g., treatment protocol) of the patient or initiate a communication to address the issue. This automated and proactive approach may ensure that the therapy remains responsive to the patient's current state, thereby improving adherence and outcomes. By providing automated and context-aware recommendations, a therapist can focus on delivering personalized care without being overwhelmed by, for example, data review or analysis.

In some examples, the therapist utilizes a user-friendly patient management user interface, where AI-generated recommendations are presented, for example, for therapist review. In some examples, a personalized recommendation is presented together with one or more reasons for the personalized recommendation (as determined by an AI assistant, for example). The therapist may then accept, modify, or reject these suggestions, with decisions being fed back into the digital therapy platform. Accordingly, a collaborative process may be provided between an "AI therapist" and a "human therapist" to create a dynamic and adaptive therapy management system that learns and evolves over time.

As the patient moves through a treatment journey, the digital therapy platform may continue to monitor patient data, providing real-time insights to the therapist. This ongoing analysis may allow for appropriate adaptations to the digital therapy program as the patient's condition changes, ensuring that sessions are as effective as possible. For example, the end of a session might constitute a patient event, which results in the digital therapy platform automatically generating a summary for the therapist, highlighting the patient's progress and any recommended adjustments for future sessions.

Traditional digital therapy systems often rely on manual data analysis and static treatment protocols, which can be time-consuming and may not adequately address the individual needs of each patient. These systems may lack the technical capabilities to process complex and unstructured data, such as clinical notes or patient feedback. The technical challenge of integrating and interpreting multifaceted patient data to generate actionable recommendations can be a technical hurdle for conventional systems. Each patient's therapy journey may introduce a wide array of variables, including their response to treatment, adherence to the protocol, and changes in their condition. The diversity of recommendations for a digital therapy system to generate can be vast, encompassing, for example, adjustments to exercises, communication strategies, and overall treatment plans. A static or deterministic system may be unable to adapt to the evolving needs of patients and the dynamic nature of therapy can lead to suboptimal care and reduced patient satisfaction.

The use of a machine learning model, such as an LLM or another generative machine learning model, within the digital therapy platform offers a technical solution to one or more of these challenges. Machine learning models can be trained to analyze large and diverse datasets, understand the nuances of therapy management, and produce recommendations that are not only relevant to the patient's immediate needs but also aligned with their long-term health goals. This capability allows for a level of personalization and responsiveness that may closely mirror and/or supplement the expertise of a human therapist.

According to some examples described herein, the digital therapy platform leverages the capabilities of one or more LLMs to process patient data, including both structured and unstructured information, and generate personalized recommendations for therapists. These recommendations are informed by an analysis of the patient's therapy history, current performance, and potential future needs. Personalized recommendations may be automatically implemented (e.g., triggered or invoked as actions in the digital therapy platform) or be subject to therapist review.

In some examples, the digital therapy platform utilizes prompt engineering techniques to guide an LLM in generating recommendations that are clinically sound as well as practical and actionable. This may ensure that the suggestions provided to therapists are grounded in clinical evidence and best practices.

An example method includes collecting patient data from a plurality of data sources associated with a patient profile of a patient in a digital therapy platform, and processing at least a subset of the patient data to detect a patient event. The data sources may include structured data and/or unstructured data. The patient data may include, for example, data describing a therapy goal of the patient, data describing a baseline condition of the patient, data describing changes in a condition of the patient, motion data of the patient, performance data of the patient related to one or more sessions, or patient feedback data.

Various data sources may be linked to the patient profile. For example, data can be obtained from one or more sensors that track motion of the patient, a wearable device of the patient, a database comprising electronic patient records, a database comprising self-reported patient data, or a database comprising therapist-reported patient data (e.g., therapist notes).

A digital therapy platform may support various patient events. Examples of patient events include an onboarding event (e.g., a new patient registers on the digital therapy platform), completion of a session, completion of a scheduled assessment, improvement of a condition of the patient, deterioration of the condition of the patient, lack of participation in a digital therapy program (e.g., the patient has missed a session or a plurality of sessions), receipt of a message from the patient (e.g., the patient has submitted a query via a chat function, or the digital therapy platform detects, based on sentiment analysis in a message, that the patient may be feeling frustrated), or receipt of a therapy kit by the patient (e.g., the patient has registered on the digital therapy platform and a motion tracking kit has been delivered to the physical address of the patient). A patient event may be detected using a rules-based engine and/or AI systems.

In some examples, the method includes, in response to detecting the patient event, generating a personalized recommendation associated with the patient profile. The personalized recommendation may be generated using a rules-based engine and/or AI systems. In some examples, a generative machine learning model, such as an LLM, is used to generate the personalized recommendation. Examples of personalized recommendation include a recommended digital therapy program for the patient, a recommended modification of a digital therapy program of the patient, and a personalized message recommended for transmission to the patient.

The method may include invoking an action in the digital therapy platform. The action may be based at least partially on the personalized recommendation. In some examples, the personalized recommendation may correspond directly to the action (e.g., where a therapist approves the personalized recommendation with no changes, or where a personalized recommendation is presented directly to the patient without needing prior review or approval from a therapist). Examples of actions include assigning a digital therapy program to the patient in the digital therapy platform, modifying the digital therapy program, or causing transmission of a message (e.g., a personalized message) to the patient.

In some examples, the method includes adjusting the patient profile to reflect the action. For example, the patient profile may be updated to show an adjusted digital therapy program or new communications transmitted to the patient.

The method may include causing presentation of a first indication of the action at a first device associated with a therapist assigned to the patient profile and/or a second indication of the action at a second device associated with the patient. For example, where the action involves transmitting a personalized message, the digital therapy platform may automatically enable the therapist and the patient to view the transmitted personalized message. As another example, where the action involves adjusting the digital therapy program by changing an exercise schedule, the digital therapy platform may automatically present the adjustments at the first device (e.g., in a patient management user interface viewed by the therapist) and/or at the second device (e.g., in a patient user interface viewed by the patient). In some examples, the "indication" can be an explicit indication (e.g., a message informing the therapist or patient of a change made) or a non-explicit indication (e.g., enabling the therapist or patient to view an adjusted digital therapy program without specifically highlighting the change).

In some examples, the personalized recommendation is presented in the patient management user interface of the digital therapy platform at the first device. The patient management user interface may provide an AI feed with one or more personalized recommendations. In some examples, multiple patients are assigned to the therapist and the therapist can navigate the patient management user interface to view, approve, adjust, and/or manage personalized recommendations for each patient. The personalized recommendation may be presented at the first device prior to invoking the action.

Where the personalized recommendation is generated using a generative machine learning model, the method may include dynamically generating a prompt comprising at least some of the patient data and an instruction for generating the personalized recommendation. The prompt may then automatically be provided to the generative machine learning model (e.g., an LLM) to obtain the personalized recommendation. Prompt engineering may be employed to describe the task to the LLM, incorporating, for example, movement statistics and relevant past information from the patient's therapy history. This can result in feedback or recommendations that are more appropriate to the patient's situation and also motivational, acknowledging improvements and encouraging continued effort.

As mentioned, the method may include sending a personalized message to the patient. In some examples, the method includes receiving a follow-up question from the patient in natural language format, and generating, using an LLM, a response to the follow-up question. The response may then be transmitted to the patient.

In some examples, the digital therapy platform includes a patient management system that is responsible for generating personalized recommendations as described above, and a patient messaging system that is responsible for certain patient interactions, such as delivering personalized messages to the patient during or between sessions.

In some examples, the patient management system is responsible for patient interactions between sessions, while the patient messaging system is responsible for real-time patient interactions during sessions. The patient messaging system may thus in some cases be referred to as a "real-time patient messaging system."

In some examples, the patient uses a first device (e.g., a mobile phone with a digital therapy application installed thereon) to receive and respond to messages transmitted via the patient management system, and a second device (e.g., a dedicated tablet with a digital therapy application installed thereon) to receive and respond to messages transmitted via the patient messaging system.

Referring now to a patient messaging system, examples described herein provide a system that can offer more personalized, context-aware, and engaging feedback to patients, thereby improving the effectiveness of sessions. Examples of a digital therapy platform are engineered to facilitate an interactive session. Such digital therapy platforms provide functionality to engage with patients through automated and computer-generated messages, which are helpful in guiding, motivating, and supporting patients through their therapeutic exercises.

The digital therapy platform, according to some examples, is designed with the understanding that effective therapy extends beyond the mere execution of physical movements; it benefits from a continuous dialogue between the therapist and the patient. This dialogue includes instructions as well as corrections. The dialogue can also include encouragement and acknowledgment of progress. To provide this aspect of therapy in a digital environment, the digital therapy platform is equipped with communication modules capable of delivering timely and relevant messages at multiple instances throughout a session.

For example, the interaction may begin the moment a patient initiates a session, where the digital therapy platform greets the patient and sets the tone for the upcoming activities. Recognizing the importance of a strong start, in some examples, the digital therapy platform delivers an initial message that is both welcoming and invigorating, aiming to boost the patient's morale and readiness for the session. This initial interaction is helpful as it establishes a rapport with the patient, laying the groundwork for a trusting and responsive relationship.

As the session progresses, the digital therapy platform may continue to interact with the patient by providing real-time feedback after each exercise. This feedback is not a mere regurgitation of data but a synthesis based on the patient's performance, tailored to their specific therapeutic needs and goals. Such personalized communication may be rooted in computational algorithms performed by a system as described herein, which analyze the patient's movements and generate appropriate responses that guide the patient through the correct execution of exercises and also provide encouragement and constructive feedback.

The end of the session may be marked by an end-of-session message generated by the digital therapy platform. This message may serve as a review of the patient's performance throughout the session, highlighting achievements and areas for improvement. This message may not only provide a summary of the session but also set the stage for subsequent sessions, ensuring continuity in the patient's therapeutic journey.

In some examples, the patient messaging system and the patient management system may work together to generate and deliver insightful or helpful messages to the patient. For example, the patient messaging system and patient management system may share collected data to ensure that messages can be generated based on detailed contextual information of a patient's therapy journey.

In the realm of digital therapy, the integration of LLMs marks a departure from hardcoded systems. The limitations of hardcoded systems are manifold, primarily stemming from an inability to accommodate the intricate and diverse nature of human physiology and the corresponding therapeutic feedback helpful for effective treatment.

Referring to patient feedback, hardcoded systems may operate on a fixed set of predetermined rules that trigger specific feedback responses to particular movements or conditions detected during a session. This rigid framework is inherently constrained and may fail to capture the subtleties and complexities inherent in patient-specific therapeutic interactions. For example, a hardcoded system might be programmed to issue a generic prompt to "maintain a straight posture" whenever a deviation from an idealized spinal alignment is detected. However, this system may lack the nuanced understanding required to discern the underlying causes of such deviations, whether they be compensatory mechanisms due to underlying pain or the manifestation of a habitual posture misalignment (for example). Consequently, the feedback provided is often generic, lacking the personalized touch that is helpful for patient adherence and progress.

The technical impracticality of encoding every conceivable patient interaction into a hardcoded system is a challenge underscored by the vast array of variables present in physical therapy. Each patient's condition, recovery pace, and interaction with the therapy regimen introduce a multitude of factors that may be considered when generating feedback. The task of programming a system to account for every potential variable and outcome may be laborious or simply impractical, given the dynamic nature of physical therapy and the continuous evolution of best practices within the field.

The diversity of messages that a digital therapy system may be required to generate is considerable. Each patient's unique physical characteristics, therapeutic goals, and response to treatment would benefit from a bespoke approach to the delivery of feedback. A hardcoded system's static nature may render it incapable of synthesizing a patient's historical data, real-time performance, and overarching therapy objectives into a coherent and contextually relevant narrative.

Use of a generative machine learning model such as an LLM within a digital therapy platform offers a technical solution to challenges outlined in this disclosure. LLMs possess the capability to process extensive datasets, interpret the subtleties of a session, and produce feedback or recommendations that are tailored to the patient's immediate performance and cognizant of their broader therapeutic journey. This processing allows for an interaction that more closely resembles that of a human therapist, providing feedback that is both technically precise and imbued with the motivational and empathetic qualities essential for patient engagement.

According to some examples described herein, a digital therapy platform leverages the capabilities of one or more LLMs to analyze movement statistics and/or other patient data and generate personalized feedback for patients. This feedback is not static but is crafted using an LLM to provide tailored messages that consider the patient's performance, including nuances such as the interplay between different degrees of freedom or range of motion in movement.

Personalized messages may be delivered to the patient in real-time during a session or while the patient is not busy with a session. In some examples, such as where the patient is busy with a session, to maintain the interactive nature of the session, the personalized messages generated by the LLM can be converted into audio feedback using a text-to-speech algorithm. This allows for real-time auditory communication, enhancing the naturalness of the interaction and enabling the patient to engage in a dialogue with the system by asking questions and receiving responses in natural language.

The digital therapy platform, according to described examples, thus provides a technical solution that may transcend the limitations of conventional systems. By using AI-driven techniques, such as techniques leveraging the processing power of a generative machine learning model, and integrating patient-specific data, the digital therapy platform delivers feedback or recommendations that are both personalized and technical sound, thereby facilitating effective digital therapy.

Networked Computing Environment 100 (FIG. 1)

FIG. 1 is a diagrammatic representation of a networked computing environment 100 in which some examples of the present disclosure may be implemented or deployed. One or more servers in a server system 104 provide server-side functionality via a network 106 to a networked device, in the example form of a user device 108 that is accessed by a first user in the example form of a patient 110. A web client 112 (e.g., a browser) or a programmatic client 114 (e.g., an "app") may be hosted and executed on the user device 108. In some examples, the user device 108 executes further web clients or programmatic clients, such as the programmatic client 116 shown in broken lines in FIG. 1.

The one or more servers in the server system 104 also provide server-side functionality via the network 106 to a user device 118 of a second user in the example form of a therapist 120. For example, the therapist 120 is a physical therapist who assists the patient 110 with therapy via one or more digital channels. The networked computing environment 100 may thus include a device of a patient and a device of a therapist. Although not shown in FIG. 1, the user device 118 may include a web client or a programmatic client similar to the web client 112 or programmatic client 114 (or the programmatic client 116) of the user device 108.

An Application Programming Interface (API) server 126 and a web server 122 provide respective programmatic and web interfaces to components of the server system 104. An application server 124 hosts or provides a digital therapy platform 102, which may also be referred to as a digital therapy system, and which includes subsystems, components, modules, or applications.

The user device 108 and the user device 118 can each communicate with the application server 124, for example, via the web interface supported by the web server 122 or via the programmatic interface provided by the API server 126. It will be appreciated that, although a single user device 108 of the patient 110 and a single user device 118 of the therapist 120 are shown in FIG. 1, a plurality of other user devices may be communicatively coupled to the server system 104 in some examples. For example, multiple patients may use their respective user devices to access the digital therapy platform 102, and multiple therapists may use their respective user devices to access the digital therapy platform 102.

Further, while certain functions are described herein as being performed at either a user device (e.g., web client 112 or programmatic client 114) or the server system 104, the location of certain functionality either within a user device or the server system 104 may be a design choice. For example, it may be technically preferable to deploy particular technology and functionality within the server system 104 initially, but to migrate this technology and functionality to a programmatic client at a later stage (e.g., when the user device has sufficient processing capacity).

The application server 124 is communicatively coupled to one or more database servers 128, facilitating access to one or more information storage repositories (e.g., a database 130). In some examples, the database 130 includes storage devices that store information to be processed or transmitted by the digital therapy platform 102.

The application server 124 accesses application data (e.g., application data stored by the database servers 128 or database 130) to provide one or more applications to the user device 108 and the user device 118 (e.g., via a web interface 132 or an app interface 134).

The digital therapy platform 102 may provide a digital therapy application, or multiple digital therapy applications, to be accessible via the user device 108 or the user device 118. For example, the patient 110 accesses a user portal of the digital therapy application to utilize various functionality, such as consulting virtually with the therapist 120, receiving a customized digital therapy program, receiving details of exercises to perform, interacting with the digital therapy platform 102 (e.g., providing input and receiving feedback messages), and reviewing educational content, while the therapist 120 may access a therapist portal of the digital therapy application to utilize various functionality, such as consulting virtually with the patient 110, accessing a therapy workflow in a patient management user interface, tracking and managing patients.

Where multiple digital therapy applications are provided, different aspects of digital therapy may be provided via the respective applications. In some examples, a first application (e.g., the programmatic client 114) is a mobile application that provides an app interface (e.g., the app interface 134) for educational videos, cognitive behavioral therapy (CBT), and a communication channel with therapists, while a second application (e.g., the programmatic client 116) is a tablet application that provides access to exercises and an app interface (e.g., the app interface 136) for such purposes. The digital therapy application is referred to herein primarily as a single application for ease of reference and to facilitate understanding of aspects described herein. It will, however, be appreciated that, where this disclosure may refer to a single "digital therapy application" having certain functions, such functions may be performed by a single application or distributed across multiple applications. The digital therapy application, or applications, may be mobile applications, tablet applications, web applications, combinations thereof, or other types of applications.

To access the digital therapy application provided by the digital therapy platform 102, a user may create an account or access an existing account with a service provider associated with the server system 104 (e.g., a digital health services provider). The patient 110 or the therapist 120 can, in some examples, access the digital therapy application using a dedicated programmatic client (e.g., the programmatic client 114 and/or 116), in which case some functionality may be provided client-side, and other functionality may be provided server-side.

Data stored in the database 130 may include various motion data, exercise data, performance data, and user data, such as demographic information, clinical history, and records collected from the patients' user devices as well as through interactions with assigned therapists. It is noted that any biometric data or personally identifiable information (PII) is captured, collected, or stored upon user approval and deleted on user request. Further, such data may be used for very limited purposes and for those purposes authorized by a user. To ensure limited and authorized use of biometric information or PII, access to this data is restricted to authorized personnel only, if at all. In addition, appropriate technical and organizational measures are implemented to ensure the security and confidentiality of this sensitive information.

The server system 104 may include multiple of the databases 130. Data stored in the database 130 or databases 130 may originate from various data sources. The data sources may include structured data and/or unstructured data. Patient data of the patient 110 stored in the database 130 or databases 130 may include, for example, data describing a therapy goal of the patient, data describing a baseline condition of the patient, data describing changes in a condition of the patient, motion data of the patient, performance data of the patient related to one or more therapy sessions, or patient feedback data. Examples of the performance data include data relating to range of motion, pelvic floor muscle movement, exercise completion data, or movement accuracy.

The server system 104 may further host a machine learning system 138. The machine learning system 138 may be used to implement one or more aspects of a machine learning pipeline. For example, the machine learning system 138 may include components enabled to train models based on historic patient data, fine-tune models, or deploy models for inference. Various aspects of machine learning pipelines and other AI-related features are described elsewhere.

The machine learning system 138 may leverage one or more machine learning models to perform functions as described herein, such as generating personalized recommendations for the patient 110 (e.g., for review by the therapist 120) and/or generating personalized messages for the patient 110. The machine learning models may include generative machine learning models, such as one or more LLMs. In some examples, the machine learning system 138 thus leverages one or more internally and/or externally hosted LLMs, such as the LLM 140 depicted in FIG. 1.

An LLM is a machine learning model trained on vast amounts of data to enable it to process inputs and generate language and, in some cases, other types of content to perform a wide range of tasks. An LLM is able to perform these functions due to its large number of parameters (e.g., billions) enabling it to capture, for example, patterns in language.

In some examples, an LLM, which may be a foundation models such as GPT (Generative Pre-trained Transformer) or BERT (Bidirectional Encoder Representations from Transformers), serve as the core engine for natural language processing tasks within a digital therapy system. The machine learning system 138 leverages one or more LLMs to perform a variety of functions to support the operation of the digital therapy platform 102. These functions may include the generation of personalized recommendations to better manage patient therapy or personalized feedback for patients, the interpretation of patient input and queries, and the synthesis of complex medical data into comprehensible reports for healthcare providers.

Foundation LLMs may be pre-trained on vast datasets and possess a broad understanding of language and context. They are capable of generating human-like text and can be applied to a wide range of language tasks without further training. However, for specialized applications such as digital therapy, where the context and content are highly specific, there may be a need to fine-tune an LLM to better suit the particular requirements of the therapy domain.

In some examples, fine-tuned LLMs are adapted from foundation models through additional training on a targeted dataset that is specific to the therapy context. This fine-tuning process involves adjusting the model's parameters to optimize its performance for tasks such as understanding medical terminology, interpreting therapy-specific data, generating recommendations for consideration by a therapist, and/or generating patient-directed motivational messages that align with therapeutic goals. The fine-tuning process enhances the LLM's ability to provide accurate and relevant output within the specific context of digital therapy.

The machine learning system 138 may employ a combination of internally hosted LLMs for tasks that require rapid processing and data privacy, and externally hosted LLMs for tasks that can benefit from the scalability and computational power of cloud-based services. This hybrid approach can allow the digital therapy platform 102 to maintain a balance between performance, cost, and data security.

Furthermore, the machine learning system 138 is designed to be flexible and scalable, enabling the integration of new LLMs (or other generative machine learning models) as they become available or as the needs of the therapy platform evolve. This ensures that the digital therapy platform 102 can continuously improve its services to patients and healthcare providers.

In some examples, the machine learning system 138 is a dynamic and integrated part of the digital therapy platform 102, utilizing one or more foundation and/or fine-tuned LLMs to provide sophisticated language processing capabilities. For example, the LLM 140 enables the therapist 120 to dynamically adjust a digital therapy program while the patient 110 proceeds through their therapy journey and deliver personalized, context-aware, and clinically relevant interactions, thereby enhancing the overall effectiveness of digital therapy.

One or more of the application server 124, the database servers 128, the API server 126, the web server 122, the digital therapy platform 102, or part thereof, may each be implemented in a computer system, in whole or in part, as described below with respect to FIG. 18. In some examples, third-party applications can communicate with the application server 124 via the programmatic interface provided by the API server 126 (or via another channel). For example, a third-party application may support one or more features or functions on a website or platform hosted by a third party, or may perform certain methodologies and provide input or output information to the application server 124 for further processing or publication. For example, the application server 124 may utilize functionality of machine learning models that are hosted by servers external to the server system 104.

The network 106 may be any network that enables communication between or among machines, databases, and devices. Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof.

Figure 2:
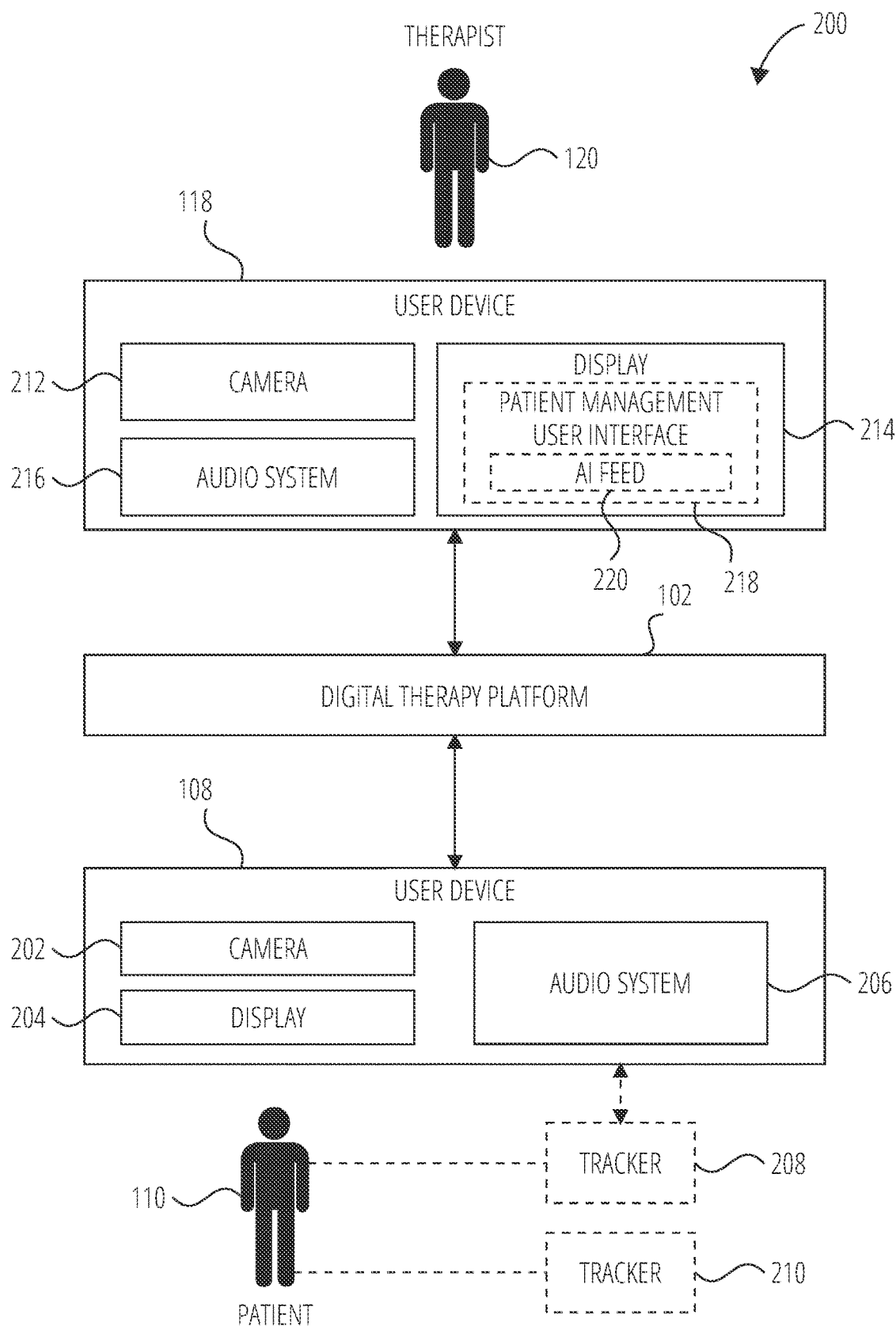
FIG. 2 diagrammatically illustrates interactions between a user device of a therapist, a cloud-based digital therapy platform, and a user device of a patient, according to some examples.

Interaction Diagram 200 (FIG. 2)

FIG. 2 shows an interaction diagram 200 depicting interactions between a user device of a therapist (e.g., a physical therapist), the digital therapy platform 102 of FIG. 1, and a user device of a patient, according to some examples. In FIG. 2, the user device 118 of the therapist 120 of FIG. 1 and the user device 108 of the patient 110 of FIG. 1 are shown for ease of reference. It will be appreciated that similar interactions may be performed with other user devices connected to the digital therapy platform 102. It will further be understood that only a few selected components of the user device 108 and the user device 118 are shown in FIG. 2 to describe certain functionality, and that the user device 108 and the user device 118 may include numerous other components.

As discussed with reference to FIG. 1, both the user device 108 and the user device 118 are computing devices that can communicate with the digital therapy platform 102 (e.g., by accessing a digital therapy application). The user device 108 and the user device 118 may, for example, be mobile phones, tablets, personal computers, or combinations thereof.

The user device 108 includes, or is connected to, a camera 202, a display 204, and an audio system 206. The user device 108 further includes at least one processor, at least one memory, and a communication module (not shown) for communicating with the digital therapy platform 102 and one or more other devices.

The camera 202 may capture images or video content of the patient 110 performing exercises to allow tracking of user motion via computer vision techniques. For example, identification of anatomical landmarks, measurement of distances, and tracking of body parts may be performed using any computer vision techniques known in the art and they all fall within the scope of the present disclosure. Such computer vision techniques are not described in this document in order not to obscure the inventive subject matter, but, to name a few non-limiting exemplary digital libraries and algorithms, TensorFlow Pose estimation, MediaPipe Pose, and BlazePose by Google™, and the algorithm described in "Reconstructing 3D Human Pose from 2D Image Landmarks" are some possible computer vision techniques to this end.

The camera 202 and other components of the user device 108 (e.g., microphone, loudspeaker, and communication modules) may also facilitate virtual consultations. The patient 110 may connect with the therapist 120 via the digital therapy platform 102, for example, to virtually consult with the therapist 120. The display 204 is used to provide a user interface of the digital therapy platform 102, such as a user interface of the digital therapy application.

The audio system 206 may, for example, include one or more microphones and one or more loudspeakers or modules for connecting to external microphones and/or loudspeakers. This enables the patient 110 to provide input to the digital therapy platform 102 in audio format and to receive audio messages from the digital therapy platform 102.

The patient 110 may, for example, enter patient data, such as demographic information, clinical history, and symptoms (e.g., identification of painful zones and pain levels), and the data is then transmitted to the digital therapy platform 102. The digital therapy platform 102 may generate (e.g., automatically or with assistance from the therapist 120) a digital therapy program and make it available to the patient 110. For example, the digital therapy platform 102 can be a physical therapy program that guides the patient 110 through an 8-week program or a 12-week program to treat or improve Lower Back Pain (LBP) or another MSK condition through targeted physical therapy (the actual duration may vary or be dynamic, for example, based on patient condition, engagement, or recovery trajectory).

As mentioned, in some examples, the camera 202 can be used as a tracking sensor. Alternatively, or additionally, the patient 110 may be equipped with trackers 208, 210 on or in their body while performing the exercises forming part of the digital therapy program, including those designed for musculoskeletal rehabilitation or pelvic-floor therapy (merely as examples). Each tracker 208, 210 may include at least one sensor, for example, an inertial measurement unit. The inertial measurement unit of each tracker 208, 210 may include one or more inertial sensors selected from, for example, an accelerometer, a gyroscope, or a magnetometer. Sensors may also include one or more force sensors. The inclusion of force sensors is particularly relevant for pelvic-floor therapy, where the measurement of exerted pressure during exercises can provide valuable feedback for the rehabilitation process.

Each tracker 208, 210 may further include at least one processor, at least one memory, and a wireless communications module for communicating with the user device 108. For example, each tracker 208, 210 may transmit advertisement packages, data packets with identification data, data packets with measurements of inertial sensors, data packets with directions computed by the tracker, or combinations thereof. Each tracker 208, 210 may also receive data packets from the user device 108, for example, with tracking instructions. The trackers 208, 210 and/or the user device 108 may run sensor fusion algorithms, for example, to improve accuracy or correct errors in measurements.

Each tracker 208, 210 is adapted to be arranged on or within the body of the patient 110 so that the measurements thereof can be processed by the user device 108 or at the digital therapy platform 102, thereby providing a motion tracking sequence of the person. The trackers 208, 210 may be attached to external body members of the person by means of an attaching device, such as straps, hook-and-loop fasteners, or other means. The trackers 208, 210 or parts thereof may be incorporated into smart watches or other wrist-worn devices. Additionally or alternatively, for therapies such as pelvic-floor therapy, internal sensors, such as intravaginal sensors, may be utilized to measure internal muscular activity and provide precise feedback on exercises specific to this therapy. In some examples, the user device 108 and the trackers 208, 210, including any internal sensors (e.g., a sensor device that is insertable into the pelvic cavity for monitoring during pelvic-floor therapy), form part of a motion tracking kit provided to the patient 110. Each tracker 208, 210, whether external or internal, may be powered by one or more batteries (e.g., a rechargeable battery).

The user device 108 may provide (or cause another device to provide) user-perceptible signals, such as exercise instructions or messages. For example, the display 204 and one or more loudspeakers of the audio system 206 may provide such user-perceptible signals. That is to say, the user device 108 may comprise one or more of visual output means, audio output means, vibrating means, or other means for providing user-perceptible signals in the form of sounds, vibration, animated graphics, etc.

For example, the display 204 of the user device 108 may show instructions and/or information to the patient 110 about the digital therapy program, such as predetermined movements that are to be performed by the patient 110, a list or representation of the body members that should have a tracker arranged thereon for a given exercise or motion tracking procedure, or results of the exercises performed by the patient 110. The user device 108 may thus provide a user interface to present instructions and/or information to the user and/or to receive inputs from the user. Any of these data can be transmitted to and/or received from another electronic device thanks to communicative couplings between the user device 118, the digital therapy platform 102, and the user device 108 (e.g., over the network 106 of FIG. 1). For example, the therapist 120 is able to receive the feedback at the user device 118 in a hospital (or other facility, such as an outpatient clinic, retirement home, or elderly care facility) so as to monitor the evolution or progress of the patient 110.

In some examples, one or more of the trackers 208, 210 may include a vital sign sensor. Examples of vital sign sensors include a respiration rate sensor, a body temperature sensor, a pulse rate sensor, or a combination of two or more thereof. In some examples, one or more of the trackers 208, 210, or the user device 108, also captures audio feedback via one or more audio sensors such that the audio feedback can be processed by the user device 108 or at the digital therapy platform 102 (e.g., to assist in determining the ease or difficulty experienced by the patient 110 in performing the exercises).

The therapist 120 can manage, edit, or track the digital therapy programs of one or various patients on the user device 118. For example, based on sensor measurements and user-reported feedback received with respect to the patient 110, the therapist 120 is able to monitor and adjust the digital therapy program by changing the difficulty of the movements or exercises, changing the number of repetitions thereof, prescribing new movements, and so forth. The patient 110 may also be provided with educational content (e.g., tailored educational content) and/or CBT via the digital therapy application.

The digital therapy platform 102 provides for bidirectional communication with patients, for example, through a secure chat functionality or a text messaging facility available when the digital therapy application is installed on the user device 118 and the user device 108. This may enable, for example, virtual consultations or text message-based "chats" between patients and therapists. The user device 118 also includes, or is connected to, a camera 212 and audio system 216, for example, to facilitate such communications. As discussed with reference to the user device 108, the user device 118 also includes a display 214, at least one processor, at least one memory, and a communication module (not shown) for communicating with the digital therapy platform 102 and one or more other devices.

A patient management user interface 218 may be provided to the therapist 120 via a user interface presented on the display 214 (e.g., a user interface of the digital therapy application). The patient management user interface 218 allows the therapist 120 to track, manage, and/or interact with various patients assigned to them in the context of the digital therapy platform 102.

For example, after authenticating into the digital therapy platform 102 (e.g., logging into the digital therapy application), the therapist 120 can access the patient management user interface 218 for their assigned patients (e.g., the patient 110) or for each assigned patient. The patient management user interface 218 may enable the therapist 120 to visualize baseline information, changes in patient data over time, including, for example, measured range of motion (e.g., using the trackers 208, 210 or computer vision techniques), self-reported pain ratings (e.g., a reported pain level after each session), utilization data, and/or fatigue levels. The patient management user interface 218 can also provide predicted risk alerts, next steps, tasks, and/or timeline views of exercise activity to assist the therapist 120.

The patient management user interface 218 may enable the therapist 120 to prescribe physical therapy interventions by selecting exercise regimens (these may be referred to as "prescriptions") and scheduling follow-ups. In some examples, the patient management user interface 218 is dynamically and automatically adjusted or updated to reflect the current state of the patient 110 based on the latest measurements and predictions.

The patient management user interface 218 may provide automatically-generated content. In some examples, the digital therapy platform 102 processes patient data from various sources and automatically generates recommendations that are personalized for each patient. The digital therapy platform 102 can leverage generative AI techniques to generate such personalized recommendations and then automatically surface them to the therapist 120 within the patient management user interface 218.

In some examples, the automatically-generated recommendations are provided in an AI feed 220 of the patient management user interface 218, as shown in FIG. 2. For example, the therapist 120 can access a patient profile of the patient 110 within the patient management user interface 218 to view and act on (e.g., approve, modify and approve, or reject) personalized recommendations generated for the patient 110 and displayed in the AI feed 220. In some examples, the patient management user interface 218 is provided by a patient management system of the digital therapy platform 102, examples of which are described below.

Figure 3:
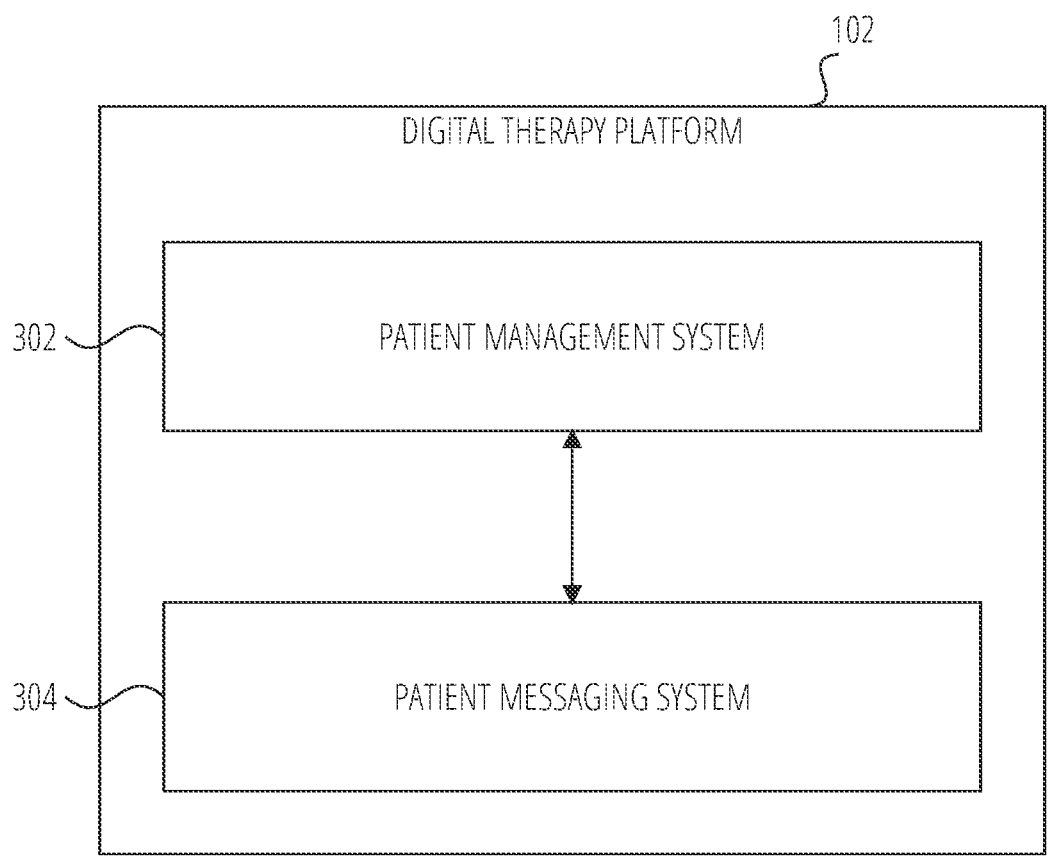
FIG. 3 is a block diagram illustrating a digital therapy platform that includes a patient management system and a patient messaging system, according to some examples.

Digital Therapy Platform 102 (FIG. 3)

FIG. 3 illustrates the digital therapy platform 102 of FIG. 1, according to some examples. In the case of FIG. 3, the digital therapy platform 102 includes a patient management system 302 and a patient messaging system 304. In some examples, through the combination of the patient management system 302 and the patient messaging system 304, the digital therapy platform 102 provides end-to-end, AI-powered digital therapy.

The patient management system 302 is configured to process patient data and detect patient events. For example, when a patient event (e.g., completion of a therapy session, arrival of a new chat message, or a lack of patient engagement for a predetermined number of days) occurs, the patient management system 302 automatically recommends an action through analysis of patient data (e.g., recent changes in patient data).

The patient management system 302 may follow clinical guidelines to recommend an action to a (human) therapist (via the user device 118). For example, the patient management system 302 may recommend to the therapist, within the AI feed 220, to adjust the digital therapy program to change the content of upcoming sessions, send a message to the patient, or intervene in some other way. The (human) therapist can then act efficiently, more quickly, and with greater context. For example, the AI feed 220 may include a description of why an action is being recommended (e.g., one or more reasons). The therapist can then save significant time as less human review of patient data is needed prior to implementing a remedial action. In other words, the therapist can quickly review the presented reasons for a personalized recommendation instead of having to work through a large amount of patient data.

In some examples, the patient management system 302 analyzes baseline patient data (e.g., individual characteristics, clinical conditions, patient needs, and/or goals) and sets an initial prescription (e.g., a starting protocol for the digital therapy program). The initial prescription can be assigned to the patient profile of the patient automatically or subject to therapist review/approval (e.g., within the patient management user interface 218). The patient management system 302 handles data from various data sources in order to generate the initial prescription. The data may include structured data and unstructured data.

The patient management system 302 can automatically monitor patient progress over time (e.g., by checking sensor data, patient feedback from therapy sessions, and therapist notes) and introduce tailored prescription adjustments. In some examples, the patient management system 302 generates recommended modifications for therapist review/approval (e.g., within the patient management user interface 218). For example, the patient management system 302 can automatically detect or predict that the patient is struggling with an exercise and recommend removal of that exercise from future sessions. As another example, the patient management system 302 can automatically detect or predict that the patient is performing well and recommend increasing a difficulty level of future sessions. Again, this saves significant time on the part of the therapist and facilitates scaling up of the digital therapy platform 102.

The patient management system 302 can also handle patient communications, or parts thereof. For example, the patient management system 302 may analyze patient data and program context and generate recommended messages for transmission to the patient. The recommended messages may be subject to therapist review/approval. Messages may be delivered to the patient proactively (e.g., in response to detecting that the patient is struggling with an exercise) or in response to receiving a message from the patient. Again, the patient management system 302 handles data from various data sources in order to generate messages. The data may include structured data and unstructured data.

In some examples, the patient management system 302 leverages rules-based techniques and/or AI-driven techniques to perform its functions. The patient management system 302 may utilize generative machine learning models, such as LLMs. In some examples, an LLM is fine-tuned on historic data of the digital therapy platform 102 (e.g., historic digital therapy programs, patient outcomes, and therapist-patient interactions) to improve the ability of the LLM to generate effective adjustments or recommendations.

The patient management system 302 thus provides digital therapy program management as well as patient support to improve the efficiency of the digital therapy platform 102. The patient messaging system 304 can supplement the patient management system 302 by handling at least some patient communications, as described in greater detail below.

In some examples, the patient messaging system 304 is responsible for in-session interactions with the patient while the patient management system 302 is responsible for other interactions, such as messages sent by the therapist to the patient between sessions. For example, the patient messaging system 304 may generate personalized messages that are delivered to the patient at certain points in time in a session, and may also automatically respond to patient queries during a session. The patient messaging system 304 can also, in some cases, be responsible for delivering messages originating from the patient management system 302. For example, where the patient management system 302 recommends sending a motivational message to the patient between sessions (e.g., in response to detecting a patient event resulting from the patient not attending any sessions for a predetermined number of days) and the recommendation is approved by the therapist, the motivational message can be transferred to the patient messaging system 304 for delivery or surfacing. However, in other cases, such motivational messages generated between sessions are delivered by the patient management system 302 and not by the patient messaging system 304.

Where the patient messaging system 304 interacts with the patient in real time during a therapy session, the patient messaging system 304 may generate and transmit messages rapidly, without requiring user input, and thus simulating the role of a human therapist who is working with and/or encouraging the patient in real time.

Merely as an example, in the context of digital physical therapy, functions may be performed by three entities: a human clinician/therapist, an "AI clinician," and an "AI physical therapist." The patient management system 302 may perform functions of the "AI clinician," processing patient data and providing personalized recommendations for review by the human clinician/therapist. The "AI" clinician can handle patient interactions between sessions. The patient messaging system 304 may perform functions of the "AI physical therapist," handling patient interactions (including real-time exercise instructions or cues, and real-time personalized messages) during sessions. In other words, the digital therapy platform 102 can include a first AI assistant that manages the digital therapy program of the patient and a second AI assistant that conducts the sessions with the patient. The second AI assistant can be a "real-time" assistant. These AI assistants may automatically communicate with each other, as described elsewhere herein. In this way, the human clinician/therapist can operate significantly more efficiently.

As described with reference to FIG. 1, a patient may utilize two applications and/or two devices. A first application (e.g., the programmatic client 114) may be a mobile application that provides an app interface (e.g., the app interface 134) for educational videos, cognitive behavioral therapy (CBT), and a communication channel with therapists, while a second application (e.g., the programmatic client 116) is a tablet application that provides access to exercises and an app interface (e.g., the app interface 136) for such purposes. In some examples, the patient management system 302 interacts with the patient via the first application (possibly accessed on a first device of the patient) and the patient messaging system 304 interacts with the patient via the second application (possibly accessed on a second device used by the patient).

Figure 4:
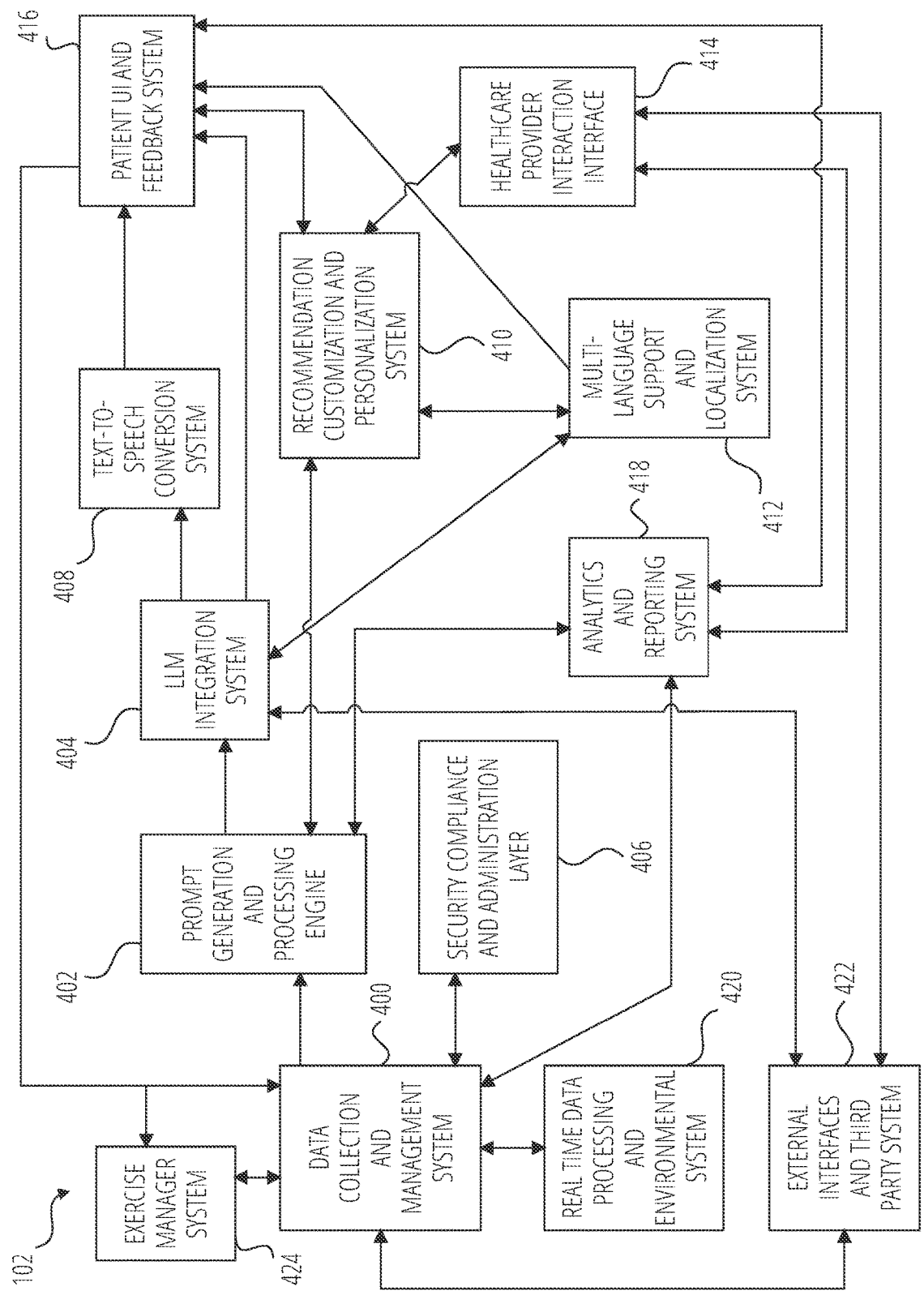
FIG. 4 is a flowchart depicting an architecture for a digital therapy platform that provides features of a patient messaging system, according to some examples, demonstrating the interconnectedness of various system components.

Digital Therapy Platform Architecture for Personalized Communications (FIG. 4)

Referring now to FIG. 4, a schematic diagram is shown of certain components of the digital therapy platform 102 of FIG. 1, according to some examples. FIG. 4 illustrates the interconnection and cooperation of various systems and subsystems to facilitate the generation and delivery of personalized messages to patients undergoing digital therapy. As mentioned elsewhere, in a server-client architecture, one or more components of the digital therapy platform 102 may be provided server-side, client-side, or both server-side and client-side. The systems and/or components shown in FIG. 3 (or a subset thereof) may provide a patient messaging system, such as the patient messaging system 304 of FIG. 3. As mentioned, in some examples, a patient messaging system (e.g., the patient messaging system 304) works with a patient management system (e.g., the patient management system 302) to provide an end-to-end digital therapy solution.

A data collection and management system 400 serves as a repository for patient-related data. The data collection and management system 400 may communicate with or include a multitude of sensors and data acquisition devices (e.g., the camera 202, audio system 206, tracker 208, and tracker 210) that capture real-time performance metrics during therapy sessions. The data collection and management system 400 may also store or access other patient data, such as data collected in an onboarding questionnaire that includes demographic, clinical, prescription, behavioral, and/or social data. The data collection and management system 400 is responsible for the aggregation, normalization, and storage of both real-time and historical patient data. It ensures that data integrity is maintained and that the data is readily accessible for processing by other systems within the platform. The data collection and management system 400 may communicate with an exercise manager system 424 to obtain real-time information regarding, for example, exercises or repetitions being performed by a patient during a session.

A prompt generation and processing engine 402 operates as a hub within the digital therapy platform 102 of FIG. 4, interfacing directly with the data collection and management system 400. The data collection and management system 400 is an assembly of hardware and software components designed to gather and organize a wide array of patient-specific data during therapy sessions. This data may encompass a variety of metrics, such as range of motion, exercise completion rates, and the accuracy of movements, all of which are helpful for assessing the patient's adherence to the prescribed therapy regimen and their overall progress.

Upon receiving this processed data, the prompt generation and processing engine 402 employs algorithms to interpret and analyze the incoming information. These algorithms are part of a larger, intelligent framework that is capable of understanding the nuances of physical therapy and the unique requirements of each patient. Functionality of the prompt generation and processing engine 402 implements the dynamic generation of structured prompts, which are crafted to be specific to the individual patient's current therapy session.

The prompt generation and processing engine 402 may include a rules-based logic processor. This processor includes a set of predefined rules, developed in close collaboration with medical professionals to ensure clinical accuracy and relevance. The rules are designed to evaluate the incoming data and prioritize it based on a hierarchy of clinical significance. For instance, if a patient demonstrates a marked improvement in their range of motion, this positive development would be flagged as a high-priority data point and subsequently highlighted in the generated prompts.

The prioritization process is not merely a binary operation but a decision-making protocol that takes into account the multifaceted nature of therapy data. It may consider factors such as the patient's historical performance, the specific goals of the current therapy session, and pertinent medical notes that may influence the direction of the therapy. By doing so, the prompt generation and processing engine 402 ensures that impactful information is distilled and presented in the prompts.

These prompts serve as the input for subsequent systems in the digital therapy platform, particularly an LLM integration system 404. The prompts are structured in a manner that facilitates an LLM's understanding and generation of personalized messages, which are then conveyed to the patient to encourage engagement and adherence to the therapy program. Through data collection, processing, and prompt generation, the digital therapy platform 102 may achieve a high level of personalization and clinical efficacy.

A security compliance and administration layer 406 provides a framework to protect sensitive patient data and ensure compliance with relevant healthcare regulations. The security compliance and administration layer 406 includes encryption protocols, secure data transmission mechanisms, and compliance monitoring tools. It also offers administrative functionalities, such as user access control and system configuration management, to maintain the integrity and security of the digital therapy platform 102.

The LLM integration system 404 is an interface that serves as the conduit between the prompt generation and processing engine 402 and the relevant LLM (e.g., LLM 140 of FIG. 1). The LLM integration system 404 thus facilitates communications with one or more AI models that are capable of natural language understanding and generation.

Upon receiving the structured prompts, which are composed of semantically rich and contextually relevant data points, the LLM integration system 404 initiates a secure and efficient data exchange protocol with one or more LLM. This protocol is designed to transmit the prompts to an LLM in a format that is optimized for AI processing, for example, leveraging both natural language and JavaScript Object Notation (JSON) (or similar structured data formats) to encapsulate the nuances of the therapy session data.

In some examples, the LLM 140, residing, for example, either on local servers or accessed via cloud-based services, receives the prompts through a dedicated API endpoint. The LLM 140 then employs pre-trained neural networks, which have been fine-tuned on corpuses of language data, to interpret the prompts and generate responses. These responses are crafted to be not only syntactically and grammatically correct but also empathetic and motivational, reflecting the therapeutic intent of the prompts.

The responses of the LLM 140 are then transmitted back to the LLM integration system 404, which may perform an initial validation check to ensure the integrity and appropriateness of the messages. This validation process may involve checking for compliance with predefined therapy guidelines and ensuring that the tone and content of the messages are suitable for patient consumption.

Once validated, the personalized messages are queued for conversion into audio format by a text-to-speech conversion system 408. The text-to-speech conversion system 408 is equipped with speech synthesis algorithms that are capable of transforming text into lifelike speech. The conversion process may take into account various factors such as intonation, cadence, and pronunciation to produce audio feedback that is as natural-sounding as possible.

The text-to-speech conversion system 408 is designed to support a range of voices and languages, allowing for customization according to patient preferences. The text-to-speech conversion system 408 also includes real-time processing capabilities, ensuring that the conversion from text to speech occurs with minimal latency. This maintains the flow of the therapy session and provides reinforcement or correction to the patient.

The resulting audio feedback is then streamed to the patient's interface. For example, the audio feedback can be delivered through speakers, headphones, or other audio output devices associated with the audio system 206 of the user device 108 of the patient 110 of FIG. 1 and FIG. 2. The delivery mechanism may be designed to be flexible, accommodating various patient environments, whether it be a home setting, a rehabilitation facility, or a mobile application.

The prompt generation and processing engine 402 may be responsible for tailoring the feedback to meet the individual preferences and needs of each patient. In some examples, a recommendation customization and personalization system 410 operates with the prompt generation and processing engine 402 to use patient profiles and adaptive algorithms to customize the feedback based on language preferences, feedback modality, and/or other personalization parameters.

A recommendation customization and personalization system 410 is responsible for tailoring the feedback to meet the individual preferences and needs of each patient. In some examples, the recommendation customization and personalization system 410 uses patient profiles and adaptive algorithms to customize the feedback based on language preferences, feedback modality, and/or other personalization parameters.

In some examples, to cater to a diverse patient population, a multi-language support and localization system 412 provides translation and localization services. The multi-language support and localization system 412 ensures that the platform is accessible to patients in their preferred language and that the feedback is culturally appropriate and regionally customized.

A healthcare provider interaction interface 414 facilitates the interaction between healthcare providers and the digital therapy platform 102. In some examples, providers can use the healthcare provider interaction interface 414 to review generated feedback, make adjustments, and provide clinical input to enhance the therapeutic experience for the patient. A healthcare provider may, for example, be a physical therapist assigned to a particular patient (e.g., the therapist 120 of FIG. 1 and FIG. 2).

A patient UI and feedback system 416 constitutes the interface layer of the digital therapy platform 102 of FIG. 4, directly interacting with the user device of the patient. This system is designed to present personalized motivational messages in an accessible and engaging way. User interfaces are rendered on output devices, such as the user device 108 of FIG. 1 and FIG. 2. However, it is noted that output devices may range from conventional computer screens to mobile devices, wearable technology, or specialized medical equipment displays, depending on the patient's needs and the therapy environment.

In some examples, the patient UI and feedback system 416 is further engineered to manage the delivery of feedback in multiple formats. For example, the patient UI and feedback system 416 transitions between text and audio modalities, providing patients with the flexibility to receive feedback in the format that best suits their current activity or personal preference. For instance, a patient engaged in a physical therapy exercise may find audio feedback more convenient, as it allows them to maintain focus on their movements without the need to divert their gaze to a screen.

In some examples, the user interface presented at a user device prioritizes ease of use and minimizes cognitive load. For example, the user interface employs navigation schemes, clear visual cues, and responsive design principles to ensure that patients of all ages and technological proficiencies can interact with the digital therapy platform 102 without difficulty. The user interface may also be customizable, allowing for adjustments in font size, color schemes, and other accessibility settings to accommodate patients with visual or auditory impairments.

In some examples, feedback delivery is orchestrated by a feedback management engine within the patient UI and feedback system 416. This engine is responsible for queuing feedback messages from the recommendation customization and personalization system 410, scheduling their presentation, and ensuring that they are delivered in synchronization with the flow of a therapy session. The patient UI and feedback system 416 may take into account the real-time context of the session, delivering motivational messages at the most impactful moments, such as immediately following an exercise or at the conclusion of a session.

The feedback management engine of the patient UI and feedback system 416 may also incorporate logic to handle patient responses or interactions with the feedback. For example, if a patient acknowledges a message or asks a follow-up question, the patient UI and feedback system 416 is equipped to capture this input and, if necessary, operate with the recommendation customization and personalization system 410 to trigger an additional response or action via the prompt generation and processing engine 402, such as providing further clarification via the LLM (facilitated by the LLM integration system 404) or alerting a healthcare provider. In some examples, patient messages that are received by the patient UI and feedback system 416 are provided to the data collection and management system 400 for storage or processing. The patient messages received by the patient UI and feedback system 416 may also be transmitted to the exercise manager system 424. For example, the patient may provide an instruction, such as a verbal instruction to skip a particular exercise, causing the exercise manager system 424 to update a current exercise session accordingly, in real time.

The patient UI and feedback system 416 serves as a primary touchpoint for patients. It is designed with an understanding of the therapeutic context and patient needs, ensuring that the delivery of personalized motivational messages is timely and effective. Further, it is designed to contribute positively to the patient's therapy experience.

As mentioned, in some examples, a patient management system (e.g., the patient management system 302) can also generate messages to be delivered to the patient. For example, the patient management system may analyze a patient's performance trajectory and generate a recommendation to a therapist to transmit, to the patient, a message. If approved, this message is then provided to the patient UI and feedback system 416 to present to the patient. In such cases, the personalized message can be presented between sessions (e.g., not necessarily in-session). In this way, a patient messaging system (e.g., the patient messaging system 304) provided using components of FIG. 4 may operate with a patient management system to improve the patient's holistic therapy experience. However, in other examples, the patient management system may generate and transmit messages independently of the patient messaging system.

An analytics and reporting system 418 processes data collected during therapy sessions, transforming this data into actionable insights that can significantly impact the therapeutic process. In some examples, the analytics and reporting system 418 employs data analytics techniques to process real-time and historical patient data, identifying performance indicators, trends, and patterns. It may generate reports and visualizations that succinctly summarize the patient's progress, adherence to the therapy regimen, and response to treatment. These reports are not only informative but are also designed to be intuitive, allowing for quick interpretation and decision-making by both patients and healthcare providers.

To facilitate a collaborative approach to patient care, the analytics and reporting system 418 may provide input to the healthcare provider interaction interface 414. To this end, the healthcare provider interaction interface 414 acts as a gateway for healthcare providers to access the analytics reports and visualizations, enabling them to monitor their patients' progress, adjust treatment plans, and provide personalized guidance based on empirical data. In some examples, the healthcare provider interaction interface 414 is designed to be user-friendly, ensuring that providers can easily navigate through the analytics information and extract the insights they need to optimize patient care. In some examples, the healthcare provider interaction interface 414 acts as a gateway between the patient management system (e.g., the patient management system 302) accessed by a therapist and the patient messaging system (e.g., the patient messaging system 304) provided by components shown in FIG. 3.

The analytics and reporting system 418 may also be communicatively coupled to the patient UI and feedback system 416. This coupling allows the analytics and reporting system 418 to present various analytics information directly to the patients via the patient UI and feedback system 416. Patients can thus engage with their own therapy data, gaining a better understanding of their progress, challenges, and achievements. This level of transparency and patient involvement is helpful for fostering a sense of ownership and empowerment in the therapy process.

The user interface, as part of the patient UI and feedback system 416, presents analytics information in a manner that is accessible and meaningful to patients. It may include features such as progress trackers, graphical representations of therapy milestones, and personalized feedback based on analytics findings. By presenting this information in a clear and engaging format, the patient UI and feedback system 416 encourages patients to take an active role in their therapy, leading to increased motivation and adherence.

In some examples, the analytics and reporting system 418 thus provides both healthcare providers and patients with the tools they need to understand therapy outcomes and make informed decisions. Its integration with the healthcare provider interaction interface 414 and the patient UI and feedback system 416 ensures that the insights derived from therapy data are effectively communicated and utilized to enhance the overall therapy experience.

As further shown in FIG. 4, a real time data processing and environmental system 420 processes live data inputs and integrates environmental factors that may impact the therapy session. In some examples, the real time data processing and environmental system 420 ensures that the feedback remains contextually relevant and that any changes in the therapy environment are accounted for in real-time. The real time data processing and environmental system 420 may be configured for the analysis of data collected from sensors, wearables, or computer vision systems that monitor the patient's movements and physiological responses. This data includes, but is not limited to, joint angles, muscle activation levels, movement velocity, and exercise completion rates. By processing this data in real-time, the real time data processing and environmental system 420 can enable the digital therapy platform 102 of FIG. 4 to provide real-time feedback to the patient, allowing for immediate adjustments to be made to their exercise form or intensity, which may be crucial for preventing injury and ensuring the exercises are performed correctly. The real time data processing and environmental system 420 may also be notified of any real-time changes in patient exercise, e.g., via the exercise manager system 424 that communicates such data to the data collection and management system 400.

In some examples, in addition to performance data, an environmental data component of the real time data processing and environmental system 420 captures and integrates environmental factors that may affect the therapy session. These factors could include the room temperature, lighting conditions, noise levels, and even the time of day. For example, if the room is too hot, it may affect the patient's endurance and performance; if the lighting is poor, it may impact the patient's ability to perform exercises with proper form; and if there is significant background noise, it may distract the patient and reduce the effectiveness of audio feedback.

In some examples, the real time data processing and environmental system 420 is equipped with algorithms that can adapt the feedback based on these environmental factors. For instance, if the real time data processing and environmental system 420 detects that the patient is performing exercises at a time when they typically have low energy levels, the feedback of the recommendation customization and personalization system 410 can be adjusted to cause the prompt generation and processing engine 402 to request messages that are more encouraging and supportive to help boost the patient's motivation.

Furthermore, the real time data processing and environmental system 420 is designed to be dynamic, with the ability to learn from each session and improve its understanding of how environmental factors impact individual patients. This learning capability allows the digital therapy platform 102 to provide increasingly personalized feedback that accounts for the unique preferences and sensitivities of each patient.

By ensuring that the feedback remains contextually relevant and accounts for changes in the therapy environment in real-time, the real time data processing and environmental system 420 plays a role in maintaining the efficacy and personalization of the digital therapy sessions. The real time data processing and environmental system 420 may thus assist in providing an adaptive, responsive, and patient-centered therapeutic experience.

An external interfaces and third party system 422 is a component of the digital therapy platform 102 of FIG. 4, serving as a gateway for integrating external data sources, healthcare systems, third-party services, or combinations thereof. The external interfaces and third party system 422 may be engineered to facilitate interoperability between the digital therapy platform 102 and various external entities, thereby enriching the capabilities of the digital therapy platform 102 and extending its functionality beyond its core offerings.

For example, through the external interfaces and third party system 422, the digital therapy platform 102 can connect to a multitude of external data sources, such as electronic health records, medical databases, and patient health applications. By accessing these sources, the digital therapy platform 102 can import patient data, including medical history, treatment plans, and biometric information, which can be used to enhance the personalization and accuracy of the therapy sessions.

In addition to data sources, the external interfaces and third party system 422 may enable the digital therapy platform 102 to interface with healthcare systems, such as hospital information systems and practice management software. This integration may allow for a two-way exchange of information, where therapy data generated by the platform can be shared with healthcare providers, and updates from the providers can be reflected in the digital therapy platform 102.

Third-party services may include analytics tools, content providers, or specialized medical applications that offer additional features such as advanced exercise libraries, nutritional guidance, or mental health support. By interfacing with these services, the digital therapy platform 102 may offer a more comprehensive therapy experience that addresses the multifaceted needs of patients.

Figure 5:
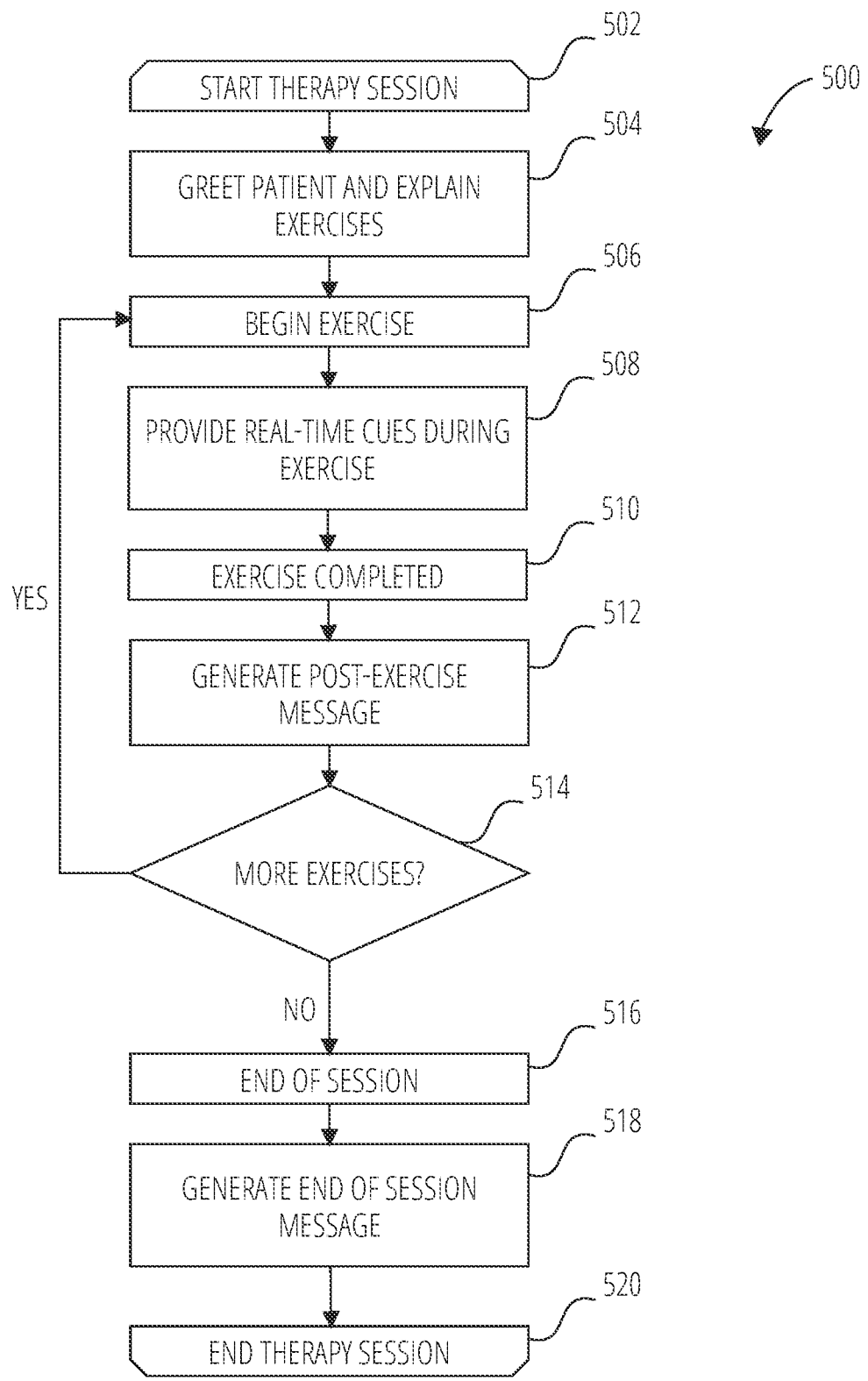
FIG. 5 is a flowchart outlining operations in a therapy session in a digital therapy platform, according to some examples.

Digital Therapy Session (FIG. 5)

FIG. 5 illustrates a method 500 to conduct a digital therapy session, according to some examples. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

By way of introduction, the method 500, as may be performed by the digital therapy platform 102 using components shown in FIG. 4, seeks to enhance the patient's experience by providing timely and contextually relevant AI-generated messages that serve as touchpoints throughout a therapy session. These messages may be delivered at three junctures: the beginning of the session, after the completion of each exercise, and at the session's conclusion. However, it will be appreciated that, in other examples, messages may be delivered at different times or in different sequences.

Referring specifically to the method 500, at the onset of the therapy session, the digital therapy platform 102 generates a welcoming message that is personalized to the patient's profile, taking into account factors such as their progress in the therapy program and the specific time of day. This initial interaction sets a positive and encouraging tone, aiming to motivate the patient and prepare them mentally for the session ahead.

The therapy session may comprise performance of a plurality of exercises. Following each exercise, the digital therapy platform 102 conducts an analysis of the patient's performance using algorithms that assess a variety of metrics, such as range of motion, pelvic area movements or forces, and/or the accuracy of movements. Based on this analysis, the digital therapy platform 102 crafts a post-exercise message that provides personalized feedback. This feedback is informative, giving the patient insight into their performance, and also, where relevant, motivational, highlighting their achievements and areas of improvement in a manner that encourages perseverance and dedication.

As the session draws to a close, the digital therapy platform 102 synthesizes data from the entire session to generate a concluding message. This message serves as a summary of the patient's performance throughout the session, reinforcing positive behaviors and accomplishments while also setting goals and expectations for future sessions. In some examples, it is designed to leave the patient with a sense of achievement and a clear understanding of their progress on their therapeutic journey.

The digital therapy platform 102, through its intelligent use of AI messaging, creates a supportive environment that mirrors the interaction a patient would have with a human therapist. By providing real-time, adaptive feedback, the system ensures that each therapy session is a personalized and engaging experience, fostering an atmosphere conducive to recovery and rehabilitation.

Referring now specifically to the flowchart in FIG. 5, according to some examples, the method 500 includes starting a therapy session at opening loop element 502. The digital therapy platform 102 initiates a new session when the patient logs in, opts to start, or when a scheduled session time arrives. The digital therapy platform 102 loads the patient's profile (e.g., as part of the digital therapy application described above), including scheduled exercises and historical data from previous sessions.

At operation 504, the digital therapy platform 102 engages in an initial patient interaction and instructional phase of the therapy session. As the session commences, the digital therapy platform 102 activates a personalized communication protocol, generating a welcoming message that is tailored to the patient's identity and current context. This message is not merely a generic greeting; it is a thoughtful composition that incorporates the patient's name, acknowledging their presence and participation. Additionally, the digital therapy platform 102 intelligently considers contextual factors such as the time of day for example offering a bright "Good morning" or a calming "Good evening" and the patient's journey within the therapy program, recognizing milestones or encouraging continued progress.

Following the personalized greeting, the digital therapy platform 102 transitions to an educational mode, where it provides a detailed and understandable explanation of the exercises that are slated for the session. This instructional content is designed to be clear and succinct, ensuring that the patient comprehensively understands the activities they are about to undertake. To cater to diverse learning preferences and accessibility needs, the digital therapy platform 102 employs a variety of instructional mediums. Visual learners may benefit from illustrative aids such as diagrams or animated sequences that demonstrate the exercises, while auditory learners may prefer spoken instructions delivered through the text-to-speech conversion system 408 and the patient UI and feedback system 416. For patients 110 who favor reading or require written instructions to supplement their understanding, the digital therapy platform 102 can generate descriptive text. The choice of instructional medium is determined by the patient's pre-set preferences and the technological capabilities of the digital therapy platform 102, ensuring that each patient receives information in the most effective and comfortable format for them.

The method 500 initiates the exercise regimen at operation 506. This stage marks the transition from preparatory activities to the active engagement of the patient in their prescribed therapeutic exercises. As the patient embarks on the first exercise, the digital therapy platform 102 serves as an interactive guide, providing real-time instructions to ensure that the patient performs each movement with precision and care.

The digital therapy platform 102, equipped with monitoring capabilities, digitally captures data regarding the patient's movements (and, in some cases, other data, such as vital signs). Utilizing an array of sensors or computer vision technology, the digital therapy platform 102 captures a detailed account of the patient's kinematics, providing a comprehensive analysis of each motion. This technology is not merely for observation; it is an integral part of a feedback loop that ensures the patient's adherence to the correct form and technique.

As the patient progresses through the exercise, the digital therapy platform 102 analyzes each movement for accuracy and consistency. Should the patient deviate from the prescribed form, the digital therapy platform 102 may intervene. The digital therapy platform 102 may do so by offering corrective cues, which are designed to be intuitive and easily actionable, allowing the patient to adjust their movements in real-time. This immediate or real-time feedback is helpful for preventing potential injuries and ensuring that the therapeutic benefits of the exercise are fully realized.

Specifically, in some examples, the method 500 includes providing real-time, personalized cues during exercise at operation 508. As the patient performs the exercise, the digital therapy platform 102 analyzes the movement or other data in real-time. If deviations from the correct form are detected, the digital therapy platform 102 provides cues tailored to the patient's immediate needs to correct their posture or movement. These personalized cues can facilitate an interactive conversation between the "digital therapist" provided by the digital therapy platform 102 and the patient, enhancing the adaptability of the session to the patient's capabilities and responses. For example, the digital therapist might observe and comment, "You're struggling a bit with the upward part of the movement as you are losing your balance." If the patient acknowledges the difficulty, responding with "Indeed, but I don't seem to be able to do it!" the digital therapist can then offer actionable advice, such as, "Just focus on keeping your knees in place and rise slowly." The communication is designed to be actionable, providing the patient with specific, real-time guidance that can be immediately implemented to improve performance and ensure safety. Additionally, the system is equipped to handle requests from the patient, such as asking the digital therapist to skip an exercise due to pain. In such cases, the digital therapist can respond with understanding and adapt the session accordingly, either by suggesting an alternative exercise or by providing reassurance and instructions for managing discomfort. As mentioned above, for example, the exercise manager system 424 may be integrated with other components of the digital therapy platform 102 to allow for real-time adjustments to exercise sessions. This level of personalized and actionable interaction aims to create a supportive and responsive digital therapy environment.

According to some examples, the method 500 includes automatically determining that an exercise is completed at operation 510. Once the patient completes the exercise, the system processes the performance data to determine the quality of the exercise execution, such as the range of motion achieved and the accuracy of movements. For example, the digital therapy platform 102 uses the described sensor integration that enables it to monitor and analyze the patient's movements in real time. When the patient performs an exercise, the digital therapy platform 102 utilizes motion tracking technology, such as the sensors described above and/or or computer vision, to capture detailed data on the patient's movements. This data may include the speed, acceleration, and trajectory of limbs, as well as the overall posture and alignment of the body during the exercise. Upon the completion of an exercise, the system automatically detects this event using criteria such as the cessation of movement, the achievement of a target range of motion, or the completion of the expected number of repetitions.

According to some examples, the method 500 includes generating a post-exercise message at operation 512. For example, the digital therapy platform 102 may use performance data to generate a post-exercise message. This message includes personalized feedback on the patient's performance, highlighting achievements like improved range of motion or a high percentage of correct movements. The message is crafted to be motivational and encouraging, using positive reinforcement techniques.

At decision operation 514, the digital therapy platform 102 determines whether the therapy session includes further exercises scheduled for the physical therapy session. If more exercises are planned, the digital therapy platform 102 proceeds to guide the patient to the next exercise at operation 506. If not, the digital therapy platform 102 transitions to the end-of-session phase.

Following a determination, at decision operation 514, that no further exercises are scheduled for the physical therapy session, the digital therapy platform 102 ends the session at operation 516. At the culmination of the therapy session, the digital therapy platform 102 engages in a process of data compilation and synthesis. This process is not merely an aggregation of statistics but a strategic assembly of insights drawn from the patient's exertions during the session.

The digital therapy platform 102 evaluates the patient's performance, distilling the essence of their efforts into a coherent end-of-session message which is generated at operation 518. This message serves as a comprehensive overview, providing the patient with a clear picture of their performance, including progress made towards their therapy goals. It is a reflection of the patient's journey through the session, capturing moments of strength, instances of improvement, and areas that may require further attention. The ability of the digital therapy platform 102 to personalize this end of session message uses the analytics technologies described in further technical detail herein of the patient's therapeutic needs.

Moreover, the end-of-session message includes motivational elements, designed to motivate the patient to persist with their therapy regimen. It is a blend of commendation and encouragement, acknowledging the patient's hard work and dedication. The message may highlight specific accomplishments, such as achieving a new personal best in range of motion or maintaining a consistent pattern of correct movements, which are significant milestones in the patient's therapy journey.

In some examples, the message also serves as a bridge to future sessions, providing the patient with a sense of continuity and progression. It reinforces the patient's overall trajectory of improvement, celebrating the cumulative successes while also setting the stage for subsequent therapy sessions. This forward-looking perspective helps maintain the patient's focus and motivation, ensuring that they remain engaged and committed to their long-term therapy goals.

Thus, in some examples, the end-of-session message crafted by the digital therapy platform 102 is a multifaceted communication tool that encapsulates the patient's session performance, fosters a positive outlook on their therapy journey, and encourages steadfast participation in their prescribed rehabilitation program.

According to some examples, the method 500 includes ending the therapy session at closing loop element 520. The digital therapy platform 102 officially ends the session, logs the session data (e.g., using the data collection and management system 400) for future reference, and may schedule the next session based on the patient's therapy plan. The patient may then log out or be logged out (e.g., of a digital therapy application as described above), or the system shuts down until the next scheduled session.

Figure 6:
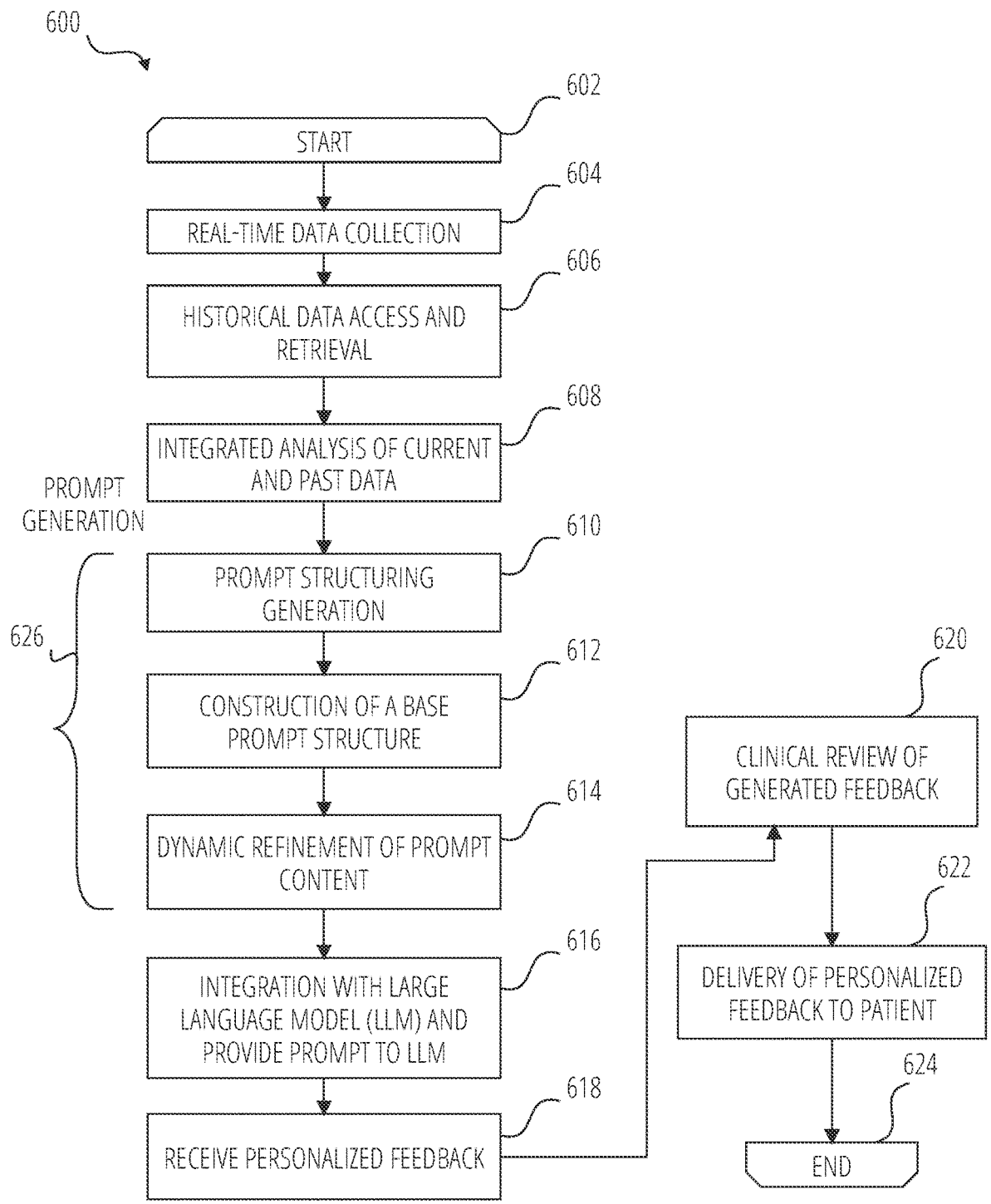
FIG. 6 is a flowchart outlining a process for generating personalized interactions in a digital therapy platform, according to some examples.

Automatically Generating Personalized Interactions (FIG. 6)

FIG. 6 is a flowchart illustrating a method 600, according to some examples, to automatically generate personalized interactions for a patient. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

The method 600, as may be performed by the digital therapy platform 102 using components shown in FIG. 4, commences at opening loop element 602.

Real-Time Data Collection (Operation 604)

The method 600 includes real-time (or near real-time) data collection at operation 604. In some examples, within the architecture of the digital therapy platform 102, as depicted in FIG. 4, the data collection and management system 400 accesses one or multiple sensors and motion tracking devices (e.g., tracker 208, tracker 210, and/or camera 202). These devices may be strategically deployed to capture a broad spectrum of biomechanical data from patients as they perform prescribed therapeutic exercises.

Data collected or analyzed by the sensors or motion tracking devices may include, for example, joint angles, muscle activation, forces due to lengthening or contraction of body parts, and movement velocity (or a subset thereof). Joint angles may be measured to ensure the patient's movements align with the prescribed therapeutic range of motion. This data is used for confirming proper exercise execution and for tracking the patient's progress within their therapy program. Muscle activation may be monitored via electromyography sensors, which provide insights into the patient's muscle engagement during therapy sessions. This information is used for evaluating the effectiveness of the exercises and for detecting any compensatory strategies employed by the patient. Movement velocity is tracked to assess the speed and fluidity with which the patient performs exercises. This metric is indicative of the patient's level of control and the ability to execute exercises with the intended intensity.

The real time data processing and environmental system 420 ensures that the collected data is analyzed, enabling near real-time feedback to the patient. This analysis allows for on-the-fly adjustments to the therapy session, optimizing the therapeutic experience. Concurrently, the data collection and management system 400 records environmental factors (based on data from the real time data processing and environmental system 420) that may affect the therapy session. These factors may be captured by environmental sensors integrated into the therapy equipment or session environment. For example, equipment settings, such as resistance levels on therapy machines, may be recorded to contextualize the patient's performance data. This information is used to tailor the difficulty of exercises to the patient's current capabilities. Further, a spatial arrangement of therapy equipment and the patient's position within the room may also be documented. This data may be used for understanding how the environment might affect the patient's movements and for ensuring safety during the session.

The data collection and management system 400 receives the information described above, or a subset thereof, from the real time data processing and environmental system 420 and/or the exercise manager system 424 and aggregates this information and incorporates it into the patient's therapy profile. This comprehensive approach to data collection ensures that the feedback provided by the platform is based on the patient's physical performance and considers the therapy environment.

By integrating real-time biomechanical data with environmental factors, the method 600 may provide a detailed understanding of the patient's therapy session. This enables the digital therapy platform 102 to deliver feedback that is precise, personalized, and contextually relevant, enhancing the effectiveness of the therapy sessions.

Historical Data Retrieval (Operation 606)

At operation 606, the data collection and management system 400 of the digital therapy platform 102 engages in the retrieval of historical data. The operation 606 is performed to inform the current therapy session with insights from the patient's past interactions with the digital therapy platform 102.

The data collection and management system 400 may initiate a query to a secure database (e.g., database 130) that is compliant with the Health Insurance Portability and Accountability Act (HIPAA), ensuring that patient data privacy is maintained. This database may serve as a repository for historical data, which may be used for the comprehensive analysis of the patient's therapy journey.

The historical data retrieved may include past performance metrics, which provide a record of the patient's progress over time. These metrics may be helpful for understanding long-term trends in the patient's recovery or improvement and for adjusting current therapy protocols accordingly.

Therapy adherence records may also be accessed, offering a view into the patient's engagement with a therapy program. These records help in identifying patterns of compliance or non-compliance, which can be indicative of the need for modifications to the therapy regimen or additional patient support.

In some examples, previous feedback responses are fetched from the database as well. These responses shed light on how the patient has reacted to past feedback, which can inform the tailoring of new feedback to better resonate with the patient's preferences and motivational triggers. In some examples, the digital therapy platform 102 may, alternatively or additionally, retrieve depersonalized or statistical historical data that does not necessarily include any patient-specific data. For example, the data collection and management system 400 may retrieve data indicative of the average performance of patients in a particular exercise, typical improvement trajectories, or the probability of a patient discontinuing therapy at a particular point in time. In this context, "historical data" or "historical performance data" may thus be specific to a given patient or may be statistical data drawn from a number of patient data points.

In some examples, the data is structured in a manner that facilitates hierarchical analysis. For example, the data may be stored in JSON format or a similar structured data format, which is adept at maintaining the dependencies and relationships between various data points. This structured approach allows for complex queries that can extract nuanced insights from the patient's therapy history.

In some examples, by maintaining this structured, hierarchical data, the digital therapy platform 102 is equipped to perform in-depth analyses that consider the interplay of various factors affecting the patient's therapy outcomes. The historical context enriches the real-time data collected during current sessions, enabling the platform to provide feedback that is personalized as well as rooted in the patient's therapy narrative.

Integrated Analysis (Operation 608)

In some examples, the digital therapy platform 102 uses only one of real-time data and historical data to generate a particular message. However, in the method 500, both real-time data and historical data are used. At operation 608 of the method 600, components of the digital therapy platform 102, such as the data collection and management system 400 and the analytics and reporting system 418, undertake an integrated analysis of both current (e.g., real-time or in-session) and historical data. This integration may be used for the generation of a comprehensive feedback loop that informs the therapy process.

Algorithms of the analytics and reporting system 418 are employed to scrutinize the real-time data collected during the therapy session. These algorithms perform an analysis, extracting insights into the patient's current performance. For example, they can detect deviations from expected movement patterns, which may indicate an incorrect exercise execution or an area where the patient is struggling. Additionally, the algorithms assess improvements in the patient's range of motion, which is an indicator of progress in physical therapy.

Concurrently, the data collection and management system 400 may process historical data to discern long-term trends in the patient's therapy journey. This historical analysis may be performed, for instance, to map out the patient's recovery trajectory, providing a broader perspective on their overall progress. It also aids in automatically identifying recurring challenges or patterns of behavior that the patient has faced throughout their therapy. Understanding these patterns enables generation of suitable messages and/or tailoring future therapy sessions to address persistent issues effectively. In some examples, the historical analysis may be enriched by the use of an LLM to scan through therapists' notes and message-based conversations with the patient. The LLM may be trained to identify key motivational factors, such as a factor referred to as the "big why," e.g., the patient's desire to play with grandchildren or run a marathon. Such a motivational factor is then used as a parameter in the generation of personalized prompts. Additionally or alternatively, the digital therapy platform 102 may employ predictive analytics to assess the likelihood of a patient discontinuing therapy due to, for example, a lack of motivation. By feeding comprehensive patient data into machine learning models, the digital therapy platform 102 can predict the risk of patient dropout and proactively adjust the prompts (and thus messages) to re-engage the patient and address their motivational needs. The integration of real-time analysis with sophisticated feature engineering and AI-driven predictions allows the digital therapy platform 102 to provide feedback that is not only responsive to the current session but also anticipates future patient needs.

By leveraging both immediate and historical insights, the digital therapy platform 102 can provide feedback that is both reactive to the present session and proactive in considering the patient's therapy history (or more general non-patient-specific data based on historical statistics, which may impact upon the given patient). This dual analysis ensures that the feedback is both relevant to the current context and grounded in the patient's unique therapy narrative.

Prompt Generation 626: Structuring (Operation 610)

The method 600 incorporates a prompt structuring generation process at operation 610. This process may be executed by the prompt generation and processing engine 402 of FIG. 4. The prompt generation and processing engine 402 receives the output of operation 608 and synthesizes a multitude of data inputs, both real-time and historical, to construct prompts that are tailored to the patient's current therapeutic context.

The prompt generation and processing engine 402 may utilize a combination of rule-based systems and one or more machine learning models to evaluate and interpret the significance of various data points.

For example, rule-based systems may be grounded in predefined clinical guidelines established by healthcare professionals and implement several "priority rules." These guidelines serve as a framework for the prompt generation and processing engine 402 to identify and prioritize data points that are clinically relevant to the patient's therapy. For example, the prompt generation and processing engine 402 may prioritize data indicating a significant deviation in the patient's range of motion, which could suggest a potential issue that needs to be addressed in the feedback. The rules-based systems may operate on a set of predefined rules or conditions that are crafted by healthcare professionals. For example:

Clinical guidelines: The rules may be based on clinical guidelines that define what constitutes significant improvements or concerning patterns in a patient's therapy data.

Thresholds: Rules may set thresholds for certain metrics, such as a minimum range of motion, beyond which a data point is flagged as noteworthy.

Sequencing: Such rules may dictate the order in which data points are evaluated, ensuring that certain information, like sudden changes in pain levels, is considered first.

Conditional logic: The rules may use if-then-else logic to determine the relevance of data. For instance, if a patient's adherence rate drops below a certain percentage, the rule-based system may prioritize this data for inclusion in the prompt.

The priority rules of a rules engine in the prompt generation and processing engine 402 may seek to ensure that the most clinically relevant and impactful information is highlighted in the LLM-generated feedback to the patient. Because these rules may be established based on clinical expertise and therapy objectives, they may take into account factors such as the significance of certain therapy metrics, the patient's progress and goals, and the context of the current therapy session.

For instance, if a patient demonstrates a notable improvement in their range of motion, the priority rules may dictate that this achievement should be emphasized in the prompt to the LLM 140 of FIG. 1, resulting in feedback that acknowledges and reinforces this positive development. Conversely, if the patient experiences a setback, such as a decrease in the percentage of correct movements, the priority rules may guide the prompt to address this issue in a constructive and supportive manner.

In parallel or alternatively, one or more machine learning models (e.g., the LLM 140 of FIG. 1) accessed by the prompt generation and processing engine 402 provide a dynamic and adaptive approach to data evaluation. Such a model may be trained on datasets that encompass diverse therapy scenarios and patient responses. Through this training, the model develops the ability to discern patterns and correlations within the data that may not be immediately apparent. The machine learning model may, for example, identify subtle improvements in the patient's performance or predict potential challenges based on historical trends. Machine learning models may offer a dynamic and adaptive approach to data evaluation.

In this context, a machine learning model may be trained on historical data and can uncover complex patterns and relationships within the data. For example:

Pattern recognition: Machine learning algorithms may identify patterns in data that may not be explicitly defined by rules. For instance, they might detect that a patient's performance improves significantly when they exercise at a certain time of day.

Predictive analysis: A model may predict future trends based on historical data, such as the likelihood of a patient skipping their next session, and prioritize prompts accordingly.

Personalization: A model may tailor the evaluation process to the individual patient by learning from their unique data, leading to highly personalized prompts.

Adaptation: As more data is collected, a model may adapt and refine its analysis, identifying new significant data points that were not previously considered by the rule-based systems In some examples, the integration of rule-based systems and machine learning models allows the prompt generation and processing engine 402 to conduct a comprehensive analysis of the data. This analysis may take into account both the immediate data from the current therapy session and the patient's historical data, which includes, for example, past performance metrics, therapy adherence records, and previous feedback responses. By considering this breadth of information, the prompt generation and processing engine 402 may ensure that the generated prompts are reflective of the patient's entire therapy journey or at least a significant part thereof.

In some examples, the integration of these two systems allows for a robust and comprehensive analysis of data. The rule-based systems may provide a stable and interpretable framework for data evaluation, ensuring that the prompts adhere to established clinical standards. Meanwhile, the machine learning models bring flexibility and depth to the analysis, allowing the system to adapt to each patient's unique therapy journey.

In some examples, the prompt generation and processing engine 402 may first use rule-based logic to filter and sort data points based on clinical importance. Then, one or more machine learning models may analyze the filtered data to identify less obvious trends or to predict the patient's future response to therapy. The results from both systems are then synthesized to prioritize the data points that will form the basis of the structured prompt.

In some examples, once the data points have been evaluated and prioritized, the prompt generation and processing engine 402 proceeds to structure the prompts. The structuring process involves organizing the selected data points into a coherent and logical sequence that can be effectively interpreted by a generative machine learning model such as an LLM (e.g., the LLM 140). The prompts may be designed to be semantically rich and contextually relevant, providing the LLM with the necessary information to generate personalized messages.

In some examples, the prompt generation and processing engine 402 also takes into account patient-specific therapy goals when structuring the prompts. These goals may be defined in collaboration with the patient and their healthcare provider (e.g., the therapist 120 of FIG. 1) and are reflective of the desired outcomes of the therapy. By aligning the prompt structure with these goals, the prompt generation and processing engine 402 ensures that pertinent information is conveyed to an LLM, which in turn influences the content and tone of the feedback provided to the patient.

Prompt Generation 626: Construction of Base Prompt Structure (Operation 612)

The method 600 further encompasses a process for constructing a foundational or base prompt structure at operation 612, as executed by the prompt generation and processing engine 402. The prompt generation and processing engine 402 is tasked with the function of formulating the base structure of prompts that will subsequently guide the generation of personalized feedback for patients undergoing digital therapy.

In some examples, the construction of the base prompt structure begins with the generation of a scaffold. The scaffold serves as the architectural framework for the prompt, ensuring that it is built upon a solid foundation of essential data points. These data points are selected for their relevance and significance to the patient's therapeutic journey.

In some examples, the prompt generation and processing engine 402 integrates recent improvements in the patient's condition, such as measurable advancements in range of motion or successful completion of prescribed exercises. These positive indicators not only reflect the patient's progress but also serve to reinforce the efficacy of the therapy regimen.

Concurrently, the prompt generation and processing engine 402 may identify areas that may need further attention. These may include specific exercises where the patient's form or technique requires refinement or particular aspects of the therapy protocol that the patient finds challenging. By incorporating these data points into the scaffold, the engine ensures that the resulting prompt will direct the LLM to generate feedback that is targeted and actionable, addressing the patient's immediate needs for improvement.

Furthermore, the prompt generation and processing engine 402 may discern motivational triggers from the patient's historical data. These triggers may be elements that have been shown to resonate with the patient, fostering engagement and motivation. They may include previous milestones achieved, personal goals articulated by the patient, or positive reinforcements that have elicited a strong response in past interactions.

Once the scaffold is established, the prompt generation and processing engine 402 employs programmatic techniques to embed the selected data points into a structured prompt. This process seeks to ensure that each element is placed within the prompt in a manner that maintains a logical flow. The structured prompt is thus a coherent narrative that integrates clinical data with motivational elements, providing the LLM with a comprehensive and contextually rich basis for feedback generation.

In some examples, the programmatic embedding of these elements is carried out with awareness of clinical relevance. The prompt generation and processing engine 402 leverages its rule-based systems and/or machine learning capabilities to ensure that the structured prompt aligns with established clinical guidelines and therapeutic best practices. This alignment seeks to ensure that the feedback generated by the LLM is pertinent and timely and adheres to standards of clinical care. The prompt generation and processing engine 402 may be configured to follow a modular approach, dynamically selecting prompt sections that are relevant to a particular scenario based on predetermined rules. For example, to trigger a welcome message at the start of a session, the prompt generation and processing engine 402 may utilize one type of scaffold or prompt structure, while another type of scaffold or prompt structure is utilized to trigger an end-of-session message.

Thus, the method 600, through the prompt generation and processing engine 402, facilitates the creation of structured prompts that drive personalized, data-driven, and clinically grounded feedback mechanisms. In some examples, these prompts enable the digital therapy platform 102 to deliver feedback that is both meaningful and motivational, ultimately contributing to improved patient outcomes and enhanced therapy experiences.

By way of example, the scaffold for the prompt, as constructed by the prompt generation and processing engine 402, may be a structured framework that includes one or more of the following:

Scaffolding: Structural Definition for Prompts
    User prompt: A direct address to the patient that may include their name or a personalized greeting to engage them at the beginning of the feedback.
    Session context: Information about the specific scenario or exercise that the feedback is addressing, including any relevant context such as the time of day, the session number, or the particular challenges faced during the exercise.
    Performance feedback: A summary of the patient's performance, which may include both positive aspects and areas for improvement. This section is data-driven, reflecting the patient's actions during the session.
    Motivational content: Statements or phrases designed to encourage the patient, which may draw on their past achievements, current efforts, or future goals to foster motivation and adherence to the therapy program.
    Constructive guidance: Specific advice or instructions for the patient to consider for future exercises, which may include corrective actions or tips to enhance their performance.
    Progress acknowledgment: Recognition of any progress made by the patient, whether it is related to their range of motion, the correctness of movements, or adherence to the therapy regimen.
    Empathetic support: Expressions of understanding or empathy that acknowledge the patient's experience, such as recognizing the effort it takes to perform exercises or the frustration that may come with technical issues.
    Closing encouragement: A positive and forward-looking statement that aims to leave the patient feeling confident and ready to continue their therapy journey.
    Signature element: An optional closing that may include the name of the digital therapy system or the signature of a healthcare provider, adding a layer of personalization and trust to the prompt.

Programmatic Embedding: Dynamic Elements for Personalization
    Variable placeholders: Designated spots within the prompt structure for inserting patient-specific data, such as performance metrics or personalized achievements.
    Conditional logic: Embedded instructions within the prompt that tailor the content based on the patient's responses, or the data collected during the session.
    Adaptive recommendations: Suggestions that are automatically adjusted based on the patient's performance data, ensuring that the guidance is relevant and actionable.
    Tone modifiers: elements that adjust the tone of the feedback to match the patient's emotional state or the context of the therapy session, such as offering more encouragement after a challenging exercise.

In some examples, the scaffold may thus not be a static entity but a dynamic construct that is generated anew for each prompt, taking into account the latest data and the patient's evolving therapy journey. It is designed to be flexible enough to accommodate a wide range of patient scenarios while maintaining a structure that ensures consistency and clinical relevance in the feedback generated by the LLM.

Prompt Generation 626: Refinement (Operation 614)

In accordance with some examples, the method 600 may include a process for the dynamic refinement of prompt content at operation 614. In such cases, the method 600 includes the integration, by the LLM integration system 404, of an LLM that has been fine-tuned to comprehend and generate therapy-specific feedback. The fine-tuning of an LLM may include training the model on a dataset comprising examples of therapy sessions, patient interactions, and associated feedback. This dataset is curated to represent the diverse scenarios encountered in physical therapy, including various patient conditions, therapy goals, and response patterns. The fine-tuning process adapts the LLM to the specific linguistic and clinical nuances of the therapy context, enhancing its ability to generate relevant and supportive feedback.

The fine-tuned LLM is capable of receiving and processing the structured prompts generated by the prompt generation and processing engine 402 and inputted to the LLM by the LLM integration system 404. These prompts are constructed to include essential data points such as recent patient improvements, areas requiring attention, and motivational triggers identified from the patient's historical data. The prompts are embedded with variable placeholders and conditional logic to ensure that the feedback is tailored to the individual patient's therapy session.

Integration with LLM (Operation 616)

The process of integrating with an LLM and providing a prompt to the LLM, as depicted in operation 616, involves the transmission of a prompt or a refined prompt, which encapsulates, for example, the patient's performance data and therapeutic context, to the LLM. The LLM 140 of FIG. 1 is used as an example in the description below.

Upon receiving the refined prompt, the LLM 140 initiates a processing operation. It interprets the prompt, analyzing the embedded data points and contextual information to understand the patient's current therapeutic state. The LLM 140 then leverages its language generation capabilities to craft a personalized motivational message. This message is not a mere regurgitation of the data but a thoughtful synthesis that is tailored to the patient's specific therapeutic context.

The generated message is designed to be both informative and motivational, providing the patient with valuable insights into their performance while also encouraging continued effort and progress. By integrating the LLM 140 into the feedback message generation process, the digital therapy platform 102 is able to deliver real-time, personalized feedback that enhances the effectiveness and engagement of therapy sessions.

Receipt of Feedback Message (Operation 618)

At operation 618 of the method 600, the digital therapy platform 102 receives the personalized feedback that has been generated by the LLM 140. This feedback may be a message that is both technically accurate and emotionally supportive, designed to mirror the interaction a patient would typically have with a human therapist.

The feedback message generated by the LLM 140 is based on the structured prompts provided to it, which may encapsulate the patient's performance data and therapeutic context. The LLM 140 interprets these prompts and crafts a personalized motivational message that is tailored to the patient's specific context.

In some examples, the prompt is designed such that the feedback is not just technically accurate, providing precise information based on the patient's performance and/or progress, but it also carries an emotional support component. The LLM 140 may be prompted and/or fine-tuned to generate feedback that is emotionally supportive, providing encouragement, motivation, and/or empathy. This mirrors the interaction a patient would have with a human therapist, who not just instructs and corrects, but also provides emotional support and encouragement. This human-like interaction fosters a more engaging and effective therapeutic experience for the patient.

Customization and Personalization of Messages (as Part of Operation 618)

In some examples, the recommendation customization and personalization system 410 also works with the prompt generation and processing engine 402, and thus also with LLM 140, to apply natural language generation techniques to interpret the structured prompts and create feedback messages. These techniques leverage the LLM's understanding of grammar, syntax, and therapy-specific terminology to produce messages that are both personalized to the patient's performance and contextually aware of the therapy session's nuances. The natural language generation process ensures that the feedback is linguistically natural, mirroring the empathetic and supportive communication style of a human physical therapist.

In some examples, the feedback messages generated by the LLM 140 are designed to be actionable and engaging. They provide the patient with clear insights into their performance, highlighting achievements and offering constructive guidance on areas for improvement. The messages also incorporate motivational elements that encourage the patient to continue their efforts, reinforcing the therapeutic relationship and fostering a positive mindset towards recovery.

Multi-Language Support and Localization of Messages (as Part of Operation 618)

The digital therapy platform 102, as depicted in FIG. 4, is equipped with a multi-language support and localization system 412 that plays a role in ensuring the accessibility and inclusivity of the therapy experience. The multi-language support and localization system 412 is adept at providing multilingual support and localization for the output generated by an LLM 140, thereby catering to a diverse patient population with varying language preferences and cultural backgrounds.

Once the LLM 140 has generated the output, the multi-language support and localization system 412 may also receive this content, should a patient's profile indicate that translation and/or localization may be needed. The multi-language support and localization system 412 operates to translate and localize the output, ensuring that the language used is not only accurate but also resonates with the patient's cultural context. The translation process involves language models that can handle the nuances and idiomatic expressions of different languages, providing translations that are both linguistically precise and culturally sensitive.

The localization aspect of the multi-language support and localization system 412 adapts the content to reflect local customs, healthcare practices, and patient expectations within different regions or communities. This ensures that the messages feel familiar and relevant to the patient's own experience.

Where relevant, after the translation and localization processes are complete, the patient UI and feedback system 416 operates to deliver final output to the patient, as described in further detail below. The patient UI and feedback system 416 is the patient-facing component of the digital therapy platform 102, responsible for presenting the LLM-generated or LLM-originated messages in a user-friendly and accessible manner. It ensures that the feedback is delivered through the appropriate channels, whether it be text displayed on a screen, audio messages, or other multimedia formats that the patient prefers. The patient UI and feedback system 416 is designed with a focus on user experience, ensuring that the translated and localized messages are presented in a clear and engaging format. It accommodates the patient's language settings and preferences, allowing for a personalized experience where the patient feels supported and understood in their own language.

Validation and Adaptation (Operation 620)

In some examples, the method 600 further includes a feedback validation and adaptation operation, for example, performed by or via the healthcare provider interaction interface 414. This operation involves reviewing the LLM-generated feedback to ensure it aligns with clinical guidelines and therapeutic best practices. The feedback may be adjusted by healthcare providers or the digital therapy platform 102 itself to refine its content, tone, or delivery based on the patient's real-time responses or changes in their condition.

According to some examples, the method 600 includes clinical review of generated feedback at operation 620. The healthcare provider interaction interface 414 allows healthcare providers (such as the therapist 120 of FIG. 1) to assess the LLM-generated feedback for accuracy, empathy, and motivational impact. For example, providers can make manual adjustments to the feedback, leveraging their clinical expertise to enhance the message before it reaches the patient.

Delivery of Messages/Feedback (Operation 622)

The method 600 includes, at operation 622, the delivery of personalized feedback to the patient. This delivery is executed by the patient UI and feedback system 416, operating in conjunction with the text-to-speech conversion system 408, the recommendation customization and personalization system 410, and/or the multi-language support and localization system 412 to the extent required. The personalized feedback is generated to be both informative and supportive, taking into account the therapeutic needs and progress of each patient.

In some examples, the text-to-speech conversion system 408 transforms the text-based feedback into audio. The text-to-speech conversion system 408 deploys audio algorithms to ensure that the synthesized speech is clear, natural, and easy to understand, thereby closely mimicking human speech patterns. The conversion process may consider various linguistic nuances, including intonation, pacing, and emphasis, to deliver feedback that is engaging and easy for the patient to follow.

Once the feedback is converted into audio, the patient UI and feedback system 416 manages the presentation of this feedback to the patient via a user interface, such as a user interface presented at the user device 108 of the patient 110 of FIG. 1. The user interface may be an interface of a digital therapy application as described herein. In some examples, the user interface seeks to ensure that the feedback is delivered in a manner that is most conducive to the patient's current state, whether during an exercise session or when reviewing their progress post-session.

In some examples, the user interface is equipped with features that allow for the feedback to be delivered in multiple modalities. For patients who prefer or require visual feedback, the text version of the feedback may be displayed on the interface. For those who are engaged in exercises or who may have visual impairments, the audio feedback provides a convenient and accessible alternative.

In some examples, the delivery of feedback through the user interface is not a one-way communication. It may be designed to be interactive, allowing patients to provide their input, ask questions, or express concerns. This interactivity aims to maintain an open dialogue between the patient and the digital therapy platform 102, ensuring that the feedback loop is truly complete. The LLM may be utilized to generate rapid and human-like responses, for example, to follow-up queries or user comments.

The patient UI and feedback system 416 also includes mechanisms for alerting the patient to new feedback, such as visual notifications or auditory cues. This ensures that the patient is aware of the feedback in a timely manner and can incorporate the guidance into their ongoing therapy regimen.

The method 600 concludes at closing loop element 624.

Prompt Examples for Generating Personalized Patient Messages

In some examples, the prompt generation process is designed to create multiple types of prompts for LLM processing. For personalized message generation, this process may include the generation of a scenario descriptor, a system prompt, and a user prompt, each serving a specific purpose in the context of the therapy session. For example:

Scenario descriptor: This element sets out a particular area or situation within the therapy session that requires attention. It provides a high-level overview of the scenario, such as the patient skipping an exercise due to technical issues or pain across multiple sessions. The scenario descriptor is used to inform the system prompt and user prompt by outlining the context in which they will be generated. Examples of scenario descriptors are listed below, where examples 1 to 4 are designed for "end of exercise" (in-session) messages, examples 5-8 are designed for "before the start of a session" messages, and examples 9-11 are designed for "end of session" (after session) messages:

1. The patient is near the start of the session and is exhibiting good performance.
2. The patient is near the middle of the session and is exhibiting poor performance.
3. This is the patient's first time on the platform and the patient is exhibiting good performance.
4. The patient has skipped this exercise before, but not this time.
5. Today's date is December 31st.
6. The patient has not attended a session in the past two weeks.
7. It is the patient's birthday today. Further, this is the patient's final session towards their weekly goal and new exercises will be performed.
8. This is the patient's first session ever on the platform.
9. The patient's pain level appears to be reducing over time.
10. The patient is struggling with several exercises.
11. The patient has skipped exercises before, but did not skip any today.

System prompt: The system prompt provides an LLM with persona and context information relating to the scenario described. It may instruct the LLM to adopt the role of a highly motivational, empathic, and detail-oriented AI physical therapist. The system prompt may include relevant context such as the patient's potential reasons for skipping an exercise and the importance of session metrics like the percentage of correct repetitions. It also guides the LLM on the tone and content of the message, ensuring that it is appropriate and sensitive to the patient's condition. In some examples, the system prompt also specifies an output format, style or word count desired.

User prompt: The user prompt may provide more specifics regarding the scenario, including a summary of the patient's performance and any notable trends or patterns. The user prompt is designed to elicit a detailed and personalized response from the LLM via the LLM integration system 404, which directly addresses the patient's performance and encourages them, for example, for the next exercise and the rest of the session.

Non-limiting examples of such prompts, including example LLM-generated responses, are provided in Tables 1 to 3 below. The prompt in Table 1 is designed for generating an "end of exercise" (in-session) message, the prompt in Table 2 is designed for generating a "before the start of a session" message, and the prompt in Table 3 is designed for generating an "end of session" (after session) message.

TABLE 1

Example of a prompt and an LLM-generated response thereto

| | |
|---|---|
| Scenario descriptor | The patient is near the middle of the session and is exhibiting poor performance. |
| System prompt | You are a highly motivational, empathic, and detail-oriented AI Physical Therapist. After your patient completes an exercise in a session, your job is to carefully analyze their performance in that exercise using a summary you are provided with. Based on this analysis, craft a highly-personalized message in at most 50 words that describes their performance and motivates them for the next exercise and the rest of the session.<br>Relevant context and aspects you are attentive to:<br>Any interesting trends or patterns in repetition outcome sequence (e.g., more wrong movements in the first reps, alternating correct and wrong movements, among others).<br>The causes of wrong movements.<br>Whether the exercise is the first in the session.<br>Taking into account what happened in the previous sessions. |
| User prompt | Summary:<br>The patient just performed a set of the elbow flexion exercise. Their max range of motion in this exercise in the last few sessions (oldest to newest) was 112° and their all-time highest range of motion in previous sessions was 112°. In today's session it was 112°. Their percentage of correct movements in this exercise in last few sessions (oldest to newest) was 100% and their all-time highest percentage of correct movements in previous sessions was 100%. In today's session it was 30%. The outcome of each repetition within this exercise set (first to last) was [shoulder_flexion, torso_side_bend, arm_abduction, shoulder_flexion, torso_side_bend, arm_abduction, arm_abduction, correct, correct, correct] (where the wrong movements are associated with their particular causes). |
| Example of LLM-generated response that can be output to the patient | Stellar consistency in your range of motion, but today's correct movements dipped. Let's focus on avoiding those shoulder and torso compensations. Remember, every rep is a step forward. Ready to refine and conquer the next set? Your dedication is key, and I'm here to support you! |

TABLE 2

Example of a prompt and an LLM-generated response thereto

| | |
|---|---|
| Scenario descriptor | It is the patient's birthday today. Further, this is the patient's final session towards their weekly goal and new exercises will be performed. |
| System prompt | You are a highly motivational, empathic, and detail-oriented AI Physical Therapist that accompanies a patient through Physical Therapy sessions while their main Physical Therapist remotely supervises them. Upon the start of your patient's physical therapy session, your job is to motivate them for the session by crafting a highly-personalized message in at most 50 words based on a summary of information you are provided with.<br>Relevant context:<br>There is a weekly goal that expresses how many sessions the patient is supposed to perform in a week.<br>The goal is only deemed as met at the end of the session.<br>Should the main Therapist introduce new exercises or advance the patient to a new stage in the treatment protocol, you should make the patient aware of it and celebrate it.<br>When appropriate, you take into account the present day (e.g. if it's a US holiday or any special day).<br>The patient is supposed to do sessions every week and failing to do so should be acknowledged. |

TABLE 2-continued

Example of a prompt and an LLM-generated response thereto

| | |
|---|---|
| User prompt | Summary:<br>It's 7:31am, Friday, 9/21 and the patient is about to start their 2nd session this week with the weekly goal set by the therapist at 2 sessions. Their therapist has prescribed new exercises for this session. It's the patient's birthday today. |
| Example of LLM-generated response that can be output to the patient | Happy Birthday! What a great way to celebrate by investing in your health. Today, we're introducing new exercises to keep you progressing. Let's make this second session of the week count and hit your goal together! |

TABLE 3

Example of a prompt and an LLM-generated response thereto

| | |
|---|---|
| Scenario descriptor | The patient is struggling with several exercises |
| System prompt | You are the most inspirational, reflective and empathic AI Physical Therapy system that guides a patient through Physical Therapy sessions while their (human) Physical Therapist remotely manages their program. Upon the end of the physical therapy session, your job is to wrap it up and motivate the patient for the next session by crafting a highly-personalized and positive message in around 100 words based upon a summary of information you are provided with. |
| User prompt | Summary:<br>The patient just finished the session.<br>The following is the track record of today's session exercise sets (where the word 'skipped' means the patient chose to skip the exercise due to a particular reason, which is always undesirable):<br>elbow flexion (good performance)<br>shoulder flexion (optimal performance)<br>torso extension (fair performance)<br>elbow flexion (poor performance)<br>shoulder flexion (poor performance)<br>torso extension (fair performance)<br>The patient's self-reported pain level (from 1 to 5) in the last few sessions was (oldest to newest) 2, 3, 4. In today's session it was 4.<br>The patient's self-reported fatigue level (from 1 to 5) in the last few sessions was (oldest to newest) 1, 2, 3. In today's session it was 3.<br>The following is the patient's self-reported satisfaction with the product in the last few sessions (oldest to newest) from 1 to 5 stars, where scores below 5 are accompanied by the reported issue(s): 3, 4 (pain/fatigue), 4 (tech_issues), 5. In today's session it was 4 (tech_issues).<br>Physical Therapy weeks run from Monday to Sunday. Today is Sunday and so far the patient performed 2 session(s) this week. The weekly goal set by the therapist was 2 session(s) until Sunday. The patient's weekly goal attainment in the last few weeks has been 100%, 100%, 100%. |
| Example of LLM-generated response that can be output to the patient | You've powered through another session, and I must say, your dedication is truly admirable. Your elbow and shoulder flexions started strong today, which is fantastic. I did notice some challenges during the later sets, and it's important to listen to your body. Your consistent effort, even on tougher days, is key to progress. I've made a note about the technical issues you encountered, and I'm sorry for any inconvenience caused. Congratulations on meeting your weekly goal once again - that's a perfect streak! Let's keep this momentum going and aim for another successful week ahead. Rest well, and I'll be here to support you in your next session. |

These examples illustrate how the prompt generation process creates a nuanced and empathetic interaction between the digital therapy platform 102 and the patient, addressing specific challenges and encouraging continued participation in the therapy program.

Figure 7:
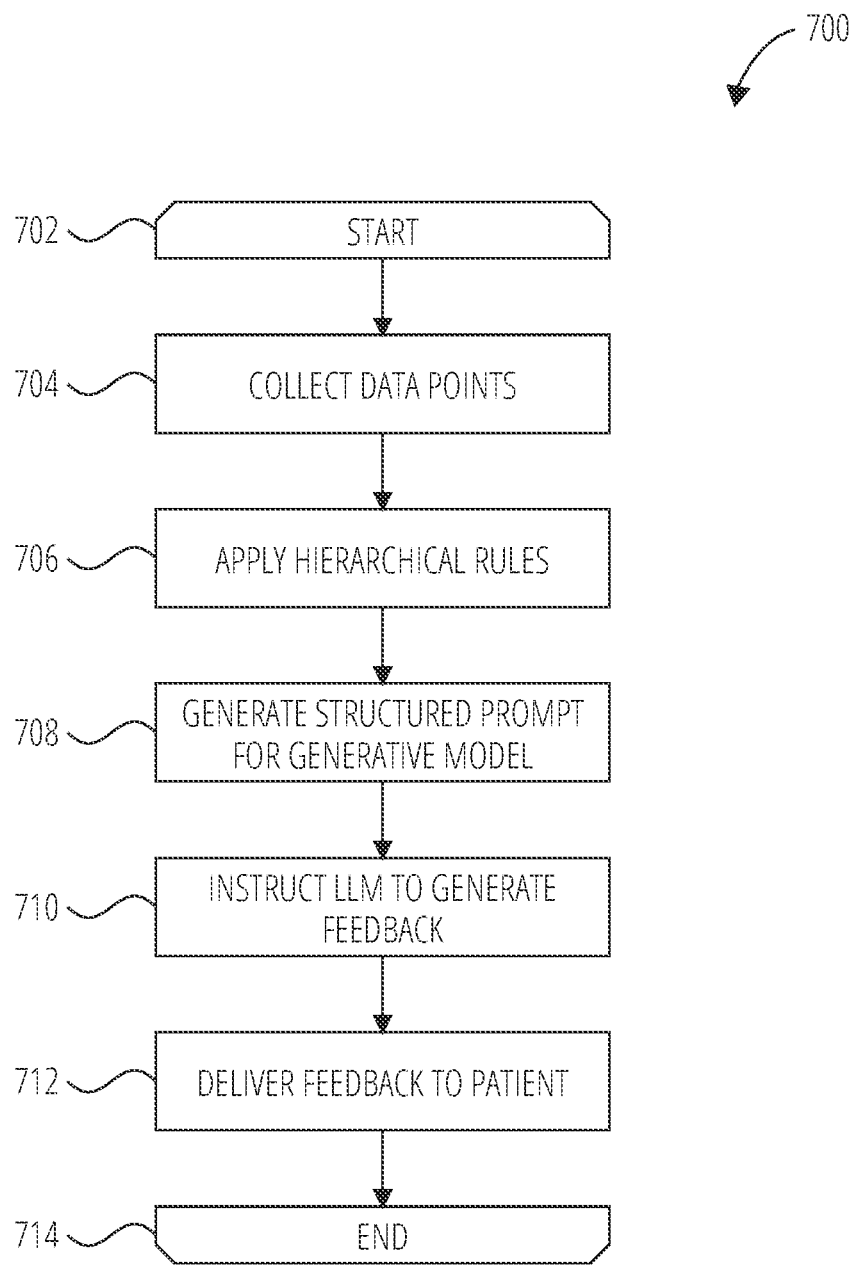
FIG. 7 is a flowchart illustrating a digital therapy platform feedback generation process, according to some examples.

Digital Therapy System Feedback Generation Process (FIG. 7)

The method 700, as illustrated in FIG. 7, represents a method for enhancing patient engagement and therapy effectiveness through the use of real-time, personalized feedback, according to some examples. This method 700 provides a technical solution to the problem of providing dynamic and contextually relevant feedback in digital therapy sessions, which is a significant improvement over static, hardcoded feedback systems.

Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

The method 700, as may be performed by the digital therapy platform 102 using components shown in FIG. 4, commences at opening loop element 702 and proceeds to operation 704, where the digital therapy platform 102 systematically gathers real-time performance data from patients during therapy sessions (e.g., with the data collection and management system 400). This data collection is a technical step, involving the use of sensors and motion tracking technologies to accurately measure and record various performance metrics. The data points collected may include, but are not limited to, joint angles, muscle activation levels, and movement velocity, which are used for assessing the patient's adherence to the prescribed therapy regimen and their overall progress.

Subsequent to data collection at operation 704 and at operation 706, the digital therapy platform 102 utilizes a rules-based logic processor, which applies a set of predefined rules developed in collaboration with medical professionals to ensure clinical accuracy and relevance. These rules evaluate the incoming data and prioritize it based on a hierarchy of clinical significance, ensuring that the most impactful information is distilled and presented in the generated prompts. This operation addresses the technical challenge of data overload and prioritization, enhancing the relevance and effectiveness of the feedback.

At operation 708, the prompt generation and processing engine 402 commences the creation of a structured prompt that is specifically designed to guide a generative machine learning model, such as the LLM 140, in crafting contextually relevant feedback. The LLM 140 is used as an example in the description below. The prompt generation and processing engine 402 employs programmatic techniques to embed the selected data points into a structured prompt, maintaining a logical flow and ensuring that the prompt is semantically rich and contextually relevant. This structured approach is a technical solution to the problem of generating varied and personalized feedback, overcoming the limitations of hardcoded systems.

At operation 710, the digital therapy platform 102 communicates the structured prompt to the LLM 140. The LLM 140, which may in some cases be fine-tuned on therapy-specific datasets, interprets the prompt, and generates a personalized message (e.g., similarly to the aforementioned examples). This operation leverages the advanced natural language processing capabilities of the LLM 140 to produce feedback that is both technically precise and imbued with motivational and/or empathetic qualities essential for patient engagement.

Operation 712 is where the personalized feedback is delivered to the patient through a user interface, such as an interface provided by the digital therapy application at the user device 108 of FIG. 1. The patient UI and feedback system 416 ensures that the feedback is presented in a patient-preferred format, whether it be text, audio, or a combination thereof. This operation addresses the technical challenge of feedback accessibility and personalization, providing patients with feedback that is accessible and adds to the naturalness of the interaction. The method 700 concludes at closing loop element 714.

The flowchart in FIG. 7 thus depicts a method 700 that includes the integration of real-time data and hierarchical rules in the generation of prompts. This process is a technical solution that addresses the challenges of providing personalized, context-aware, and clinically relevant feedback in digital therapy sessions. It represents a significant technical advancement over existing systems, offering a more adaptive, personalized, and engaging experience for patients undergoing therapy.

Figure 8:
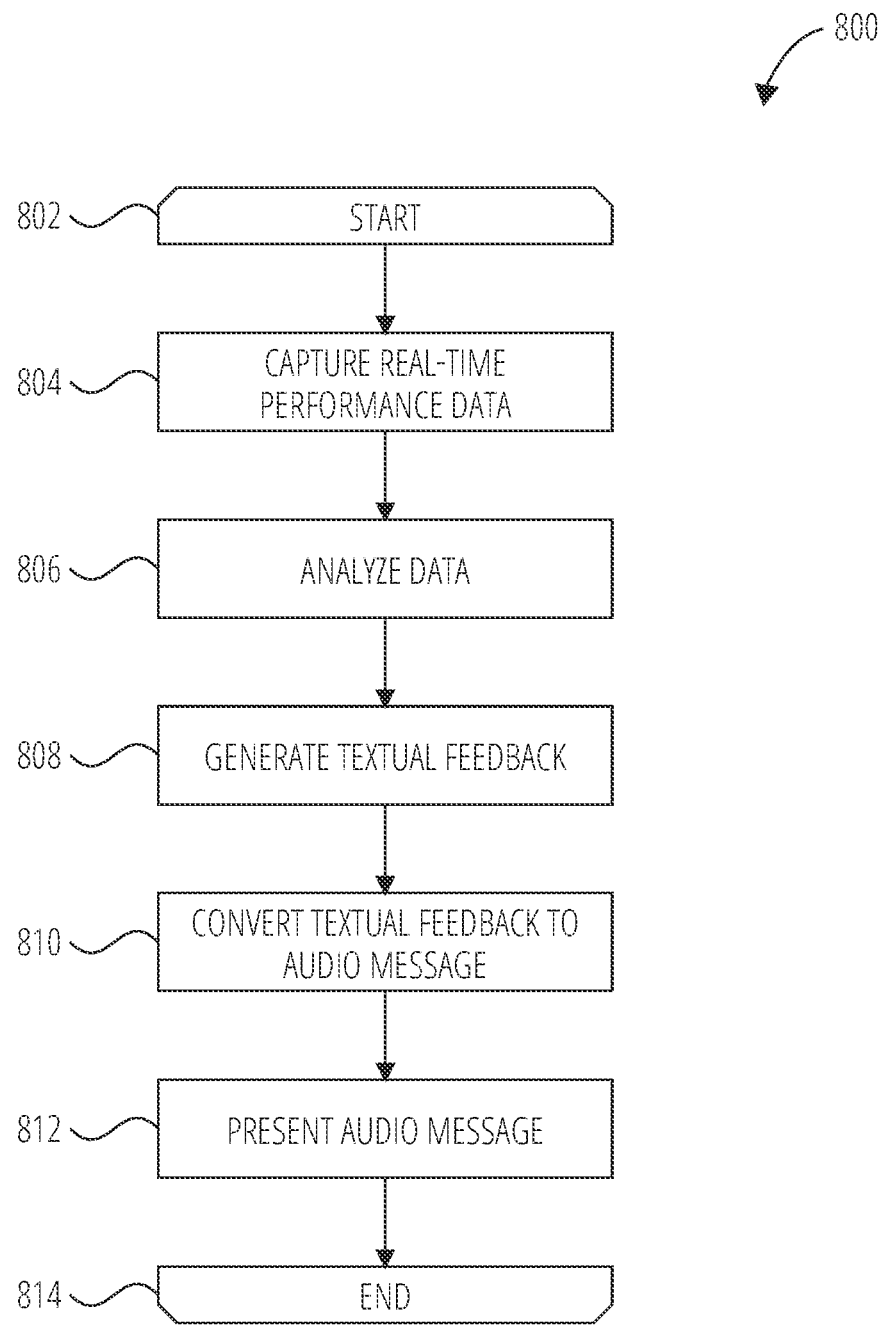
FIG. 8 is a flowchart of a real-time audio feedback process for digital therapy, according to some examples.

Real-Time Audio Feedback Process for Digital Therapy (FIG. 8)

FIG. 8 is a flowchart outlining a method 700 to deliver real-time, personalized audio feedback to patients engaged in digital therapy sessions, according to some examples. The method 800 presents a technical solution to the challenge of providing immediate and contextually relevant feedback, which is crucial for maintaining patient engagement and optimizing the therapeutic impact of each session.

Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

The method 800, as may be performed by the digital therapy platform 102 using components shown in FIG. 4, starts at opening loop element 802 and proceeds to operation 804, where the digital therapy platform 102 systematically acquires real-time performance data from patients. This operation may include the deployment of advanced sensors and motion tracking technologies that capture high-fidelity data in real-time. The data encompasses a range of metrics, such as one or more of joint angles, muscle activation levels, and movement velocity, which are useful for generating accurate and personalized feedback.

Upon completion of data collection, the digital therapy platform 102 progresses to operation 806. Here, the digital therapy platform 102, equipped with algorithms of the analytics and reporting system 418, performs an analysis of the collected data. This phase represents a technical advancement in data processing, as it involves the use of machine learning techniques to extract meaningful insights from complex datasets.

The analytics and reporting system 418 processes both quantitative and qualitative data points, utilizing advanced analytics to discern patterns and correlations that inform the patient's adherence to the therapy regimen. This operation transforms raw data into actionable feedback, which is essential for guiding patients through their therapy sessions with precision.

At operation 808, a multi-layered structured prompt is crafted. This prompt includes:

Quantitative analysis: A detailed breakdown of biomechanical performance, providing technical insights into the patient's movements.

Qualitative assessment: An evaluation of patient engagement and response, including feedback and reported challenges.

Contextual information: A synthesis of the patient's therapy journey, considering progress and/or therapy plan adjustments.

These layers of information are synthesized into a coherent narrative, forming a structured prompt that guides the LLM in generating personalized feedback. The algorithms then synthesize this multi-dimensional data into a coherent narrative, which is formatted as a structured prompt ready to be processed by a generative model, such as the LLM 140. The LLM 140 is used as an example in the description below. This prompt is not merely a collection of data points but a dynamic and contextually informed blueprint that guides the LLM 140 in generating personalized, empathetic, and clinically relevant feedback for the patient.

The structured prompt is designed to be semantically rich and contextually detailed, ensuring that the LLM 140 can accurately interpret the patient's current therapeutic state and generate feedback that is both technically precise and emotionally resonant. This feedback aims to motivate and guide the patient through their therapy journey, providing them with real-time insights and support that are tailored to their individual therapy experience.

In this case, the feedback from the LLM 140 is textual feedback. Operation 810 involves the use of the text-to-speech conversion system 408 that transforms the LLM-generated textual feedback into audio feedback substantially in real-time. This conversion is a technical solution to the problem of delivering feedback in a modality that is most accessible to the patient during therapy sessions. The system is designed to produce natural-sounding speech that mimics human intonation and cadence, enhancing the patient's experience by providing feedback that is both understandable and engaging.

The final operation, operation 812, is where the audio feedback is delivered to the patient through a user interface of the patient UI and feedback system 416 that is optimized for accessibility and ease of use. This operation is technically significant as it ensures that the feedback is presented in a timely manner, thereby maintaining the continuity and flow of the therapy session.

The method 800 concludes at closing loop element 814. The method 800 for digital therapy, as outlined in FIG. 8, is a technical process that integrates real-time data collection, advanced data analysis, and sophisticated text-to-speech conversion to deliver personalized audio feedback. This process addresses the technical challenges associated with providing immediate, context-aware, and clinically relevant feedback in a digital therapy environment. It represents a significant technical improvement over existing systems, offering a more adaptive, personalized, and engaging experience for patients undergoing therapy.

Figure 9:
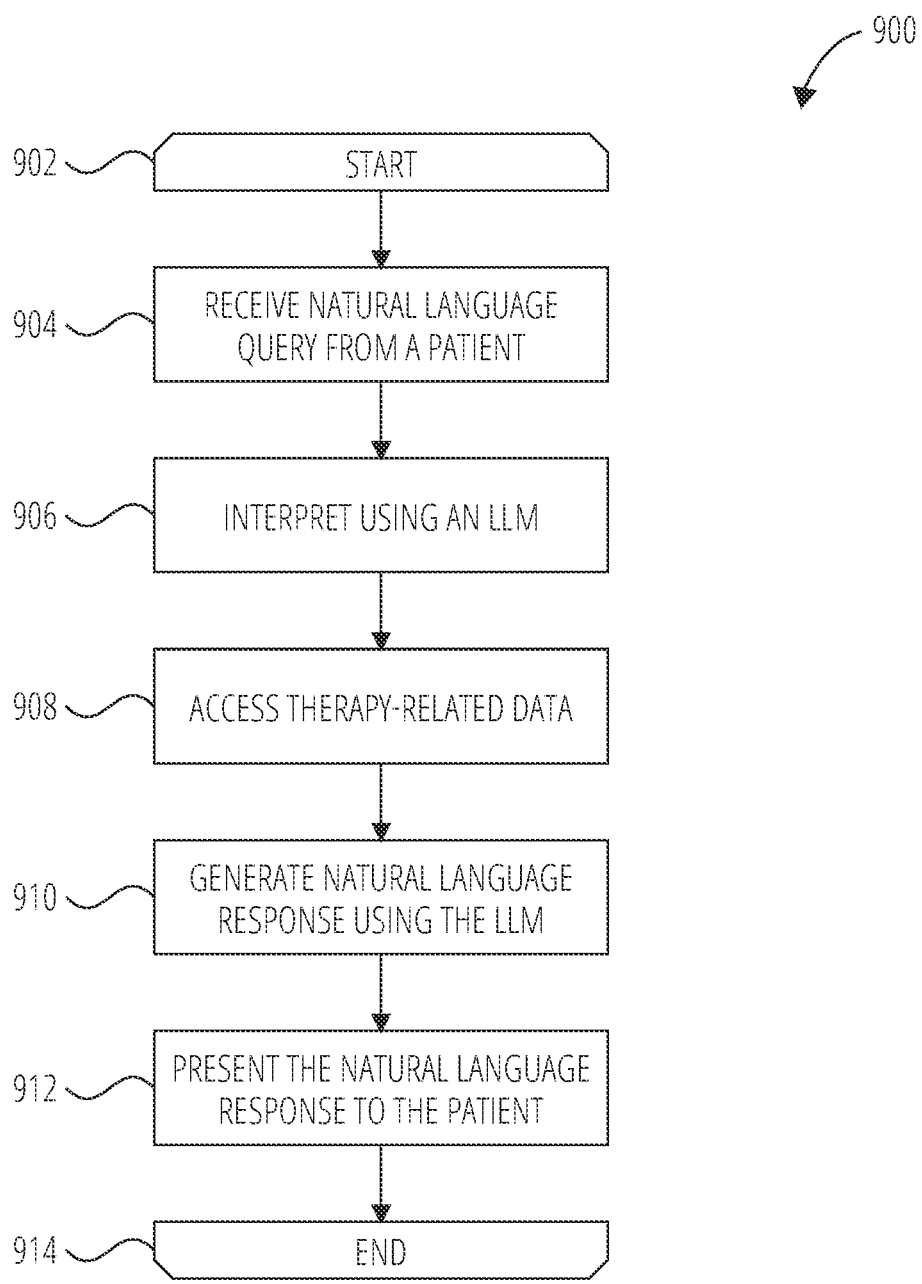
FIG. 9 is a flowchart illustrating an adaptive conversational interface flow, which includes a process for handling natural language queries from a patient, according to some examples.

Adaptive Conversational Interface Flow (FIG. 9)

FIG. 9 is a flowchart showing a method 900 for managing natural language interactions between a patient and the digital therapy platform 102, according to some examples. This method 900 is a technical solution to the challenge of facilitating real-time, interactive communication in a digital therapy context, significantly enhancing the patient's experience by providing a platform for intuitive and natural dialogue.

Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

The method 900, as may be performed by the digital therapy platform 102 using components shown in FIG. 4, commences at opening loop element 902 and proceeds to operation 904, where the digital therapy platform 102 begins to receive and interpret natural language input from one or more patients. This operation is technically significant as it involves the deployment of advanced natural language processing capabilities that allow the platform to understand and process patient queries in a manner akin to human conversation.

Following the receipt of a query, the method 900 advances to operation 906. Here, the digital therapy platform 102 employs an LLM, such as the LLM 140, to process the patient's input. The LLM 140 is used as an example in the description below. The LLM 140 processes the queries, considering the specific nuances of the therapy session and the patient's historical interactions with the platform, to derive accurate interpretations of the patient's intent.

The method 900 then transitions to operation 908, to retrieve pertinent data from the comprehensive data repository (e.g., database 130) of the digital therapy platform 102. The data accessed may include detailed therapy regimens, performance metrics, and historical patient data. This operation seeks to ensure that the responses generated by the LLM 140 are contextually informed and grounded in the patient's therapy history, providing a level of personalization that mirrors the care a human therapist would offer.

Operation 910 is the next phase in the method 900. Here, the digital therapy platform 102 leverages the capabilities of the LLM 140 to formulate responses that are empathetic and supportive. The LLM 140 crafts responses that are technically accurate yet include the warmth and understanding characteristic of human therapeutic interactions. This operation is a technical solution to the problem of creating AI-generated communication that is both clinically relevant and emotionally resonant.

Operation 912 involves the presentation of the LLM-generated responses to the patient through a user interface of the patient UI and feedback system 416 that is optimized for clarity and ease of use. This operation is technically significant as it ensures that the responses are delivered in a timely and accessible manner, tailored to the patient's preferences and the therapeutic context.

The method 900 concludes at closing loop element 914. The method 900, as depicted in FIG. 9, is a technical process that integrates advanced natural language processing, LLM interpretation, and data retrieval to handle natural language queries from patients within a digital therapy platform 102. This process addresses the technical challenges associated with providing real-time, context-aware, and empathetic responses in a digital therapy environment. It represents a significant technical improvement over existing systems, offering a more adaptive, personalized, and engaging conversational experience for patients undergoing therapy.

Figure 10:
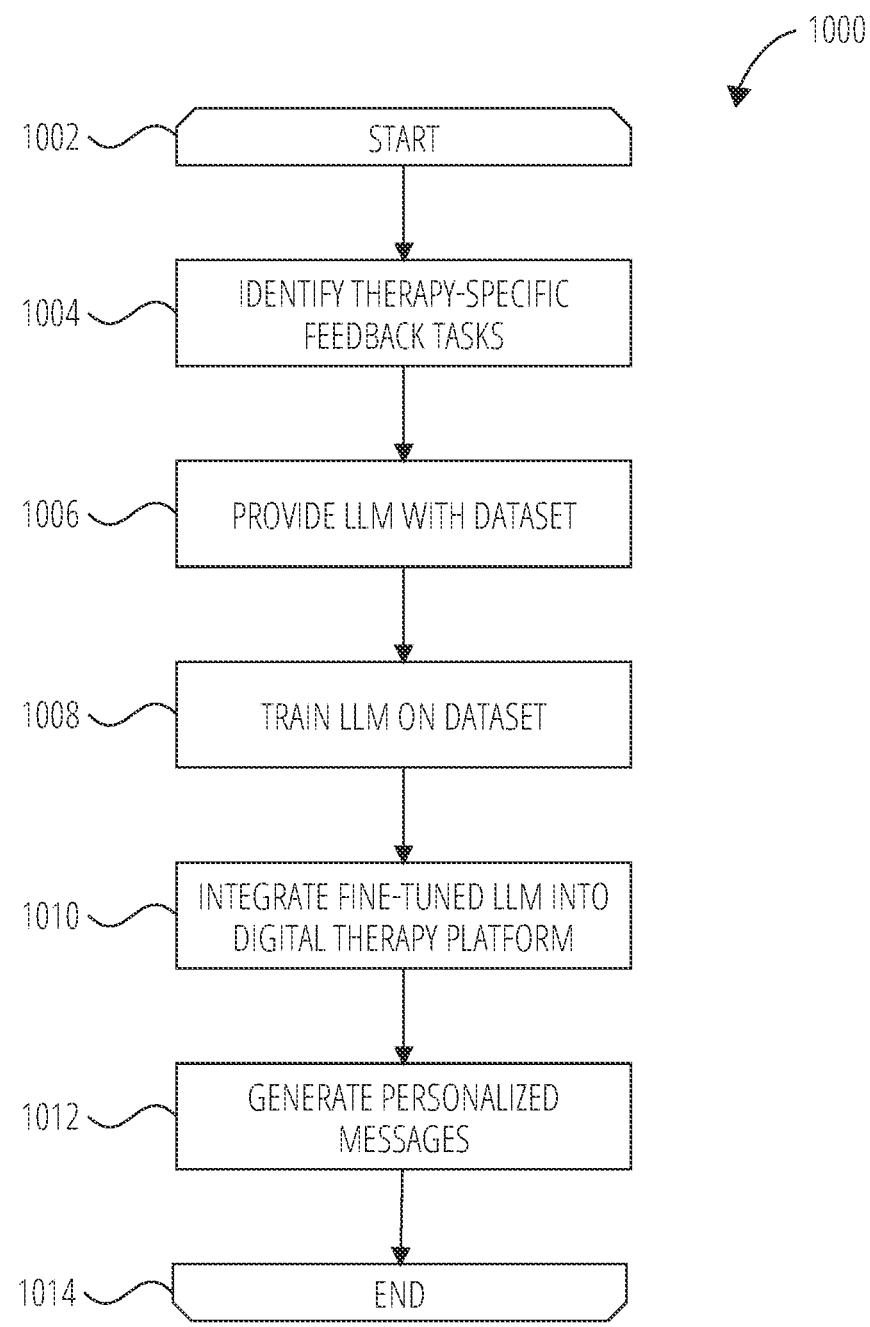
FIG. 10 is a flowchart for fine-tuning a large language model (LLM) for personalized communication in a digital therapy platform, according to some examples.

Fine-Tuning an LLM for Personalized Communication in a Digital Therapy System (FIG. 10)

Referring to FIG. 10, a flowchart for a method 1000 of fine-tuning an LLM (e.g., an LLM 140) for personalized communications in a digital therapy platform is presented. The LLM 140 is used as an example in the description below.

Although the example method 1000 depicts a particular sequence of operations, the sequence may be altered without departing from the scope of the present disclosure. For example, some of the operations depicted may be performed in parallel or in a different sequence that does not materially affect the function of the method 1000. In other examples, different components of an example device or system that implements the method 1000 may perform functions at substantially the same time or in a specific sequence.

As mentioned, the LLM 140 can be a foundation LLM, and it may be desirable to fine-tune the foundation LLM to better suit particular requirements of the therapy domain.

The method 1000 begins at opening loop element 1002, marking the initiation of the fine-tuning process. This operation may involve the digital therapy platform 102 loading the LLM 140, which may be hosted internally or accessed via cloud-based services. The LLM 140 is a sophisticated AI model capable of understanding and generating natural language text, making it a valuable tool for generating personalized feedback in the digital therapy system.

The method 1000 then moves to operation 1004, where the digital therapy platform 102 identifies specific feedback tasks that are relevant to the therapy sessions. These tasks may include the generation of personalized messages, the interpretation of patient queries, and the synthesis of complex medical data into comprehensible reports.

Next, the method 1000 transitions to operation 1006, which includes providing the LLM 140 with a dataset that is relevant to the identified therapy-specific feedback tasks. The dataset may include historical patient data, therapy session records, examples of personalized messages, examples of user queries and suitable feedback, and other relevant information. By providing the LLM 140 with this dataset, the digital therapy platform 102 ensures that the LLM 140 has access to the data needed to generate accurate and personalized feedback.

At operation 1008, the digital therapy platform 102 fine-tunes the LLM 140 by training it on the provided dataset. The training process involves adjusting the LLM's parameters to optimize its performance for the feedback tasks. This fine-tuning process enhances the LLM's ability to provide accurate and relevant responses within the specific context of digital therapy.

In this case, fine-tuning thus involves providing the LLM 140 with a smaller, more domain-specific dataset to alter its parameters. Other examples of fine-tuning are mentioned elsewhere in the present disclosure.

At operation 1010, the fine-tuned LLM 140 is integrated into the digital therapy platform 102. The integration process ensures that the LLM 140 is seamlessly incorporated into the platform's feedback generation process, enabling the platform to leverage the LLM's capabilities to deliver personalized, real-time feedback to patients.

Operation 1012 involves the LLM 140 generating personalized messages based, for example, on the patient's performance data and therapeutic context. These messages are not just technically accurate but also emotionally supportive, mirroring the interaction a patient would have with a human therapist. The generation of these personalized messages using a fine-tuned model enhances the effectiveness of the therapy sessions, contributing to a more engaging and productive therapy experience for the patient. The method 1000 concludes at closing loop element 1014.

Thus, the method 1000, depicted in FIG. 10, provides a process for fine-tuning an LLM for a digital therapy platform 102. It illustrates the sequence of activities from the identification of therapy-specific feedback tasks to the generation of personalized messages, and how the LLM is integrated into the digital therapy platform 102. Further details regarding certain aspects of model training are provided below with reference to FIG. 17.

Figure 11:
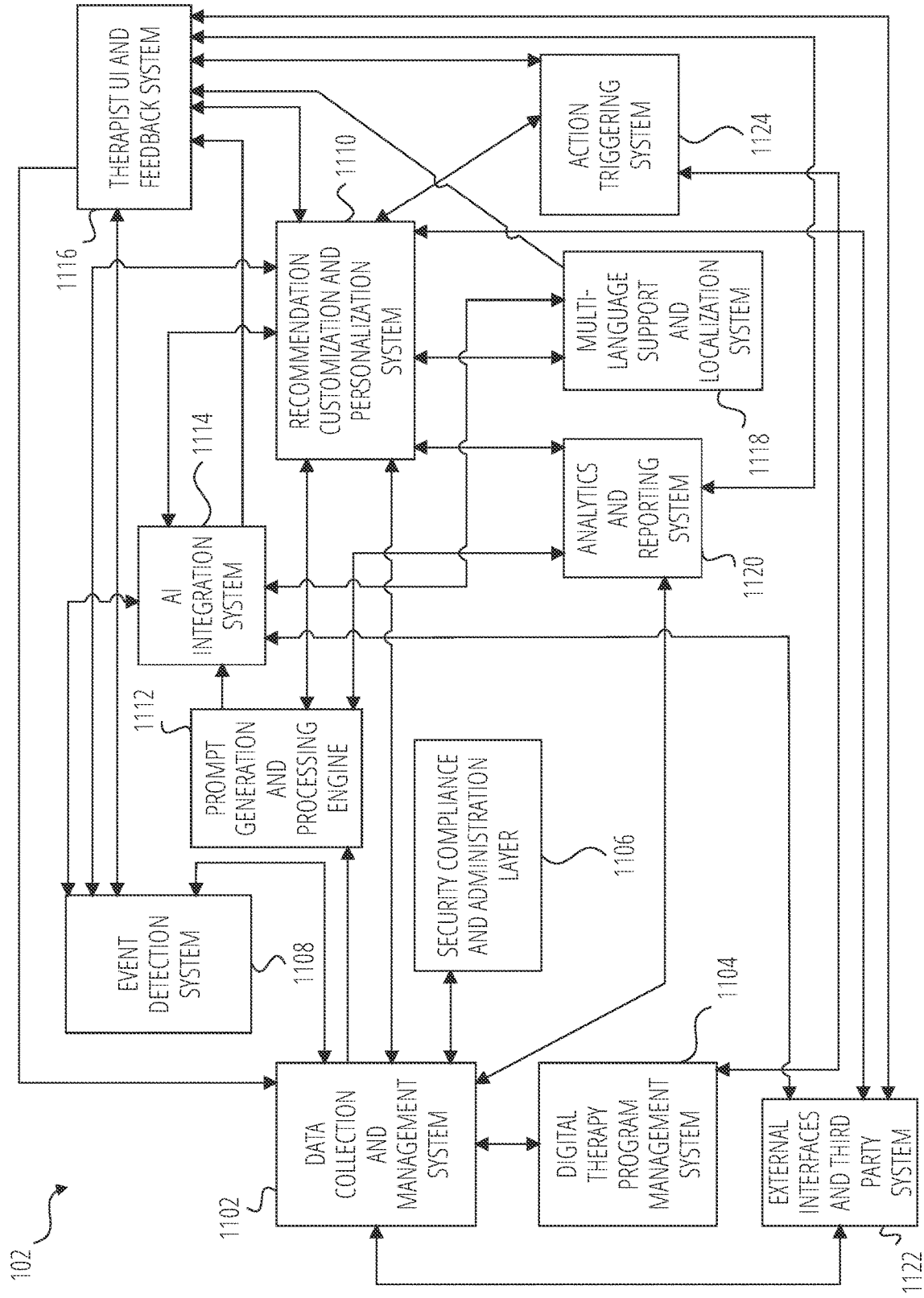
FIG. 11 is a flowchart depicting an architecture for a digital therapy platform that provides features of a patient management system, according to some examples, demonstrating the interconnectedness of various system components.

Digital Therapy Platform Architecture for Personalized Recommendations (FIG. 11)

Referring now to FIG. 11, a schematic diagram is shown of certain components of the digital therapy platform 102 of FIG. 1, according to some examples. FIG. 11 illustrates the interconnection and cooperation of various systems and subsystems to facilitate the generation and delivery of personalized recommendations. As mentioned elsewhere, in a server-client architecture, one or more components of the digital therapy platform 102 may be provided server-side, client-side, or both server-side and client-side. The systems and/or components shown in FIG. 11 (or a subset thereof) may provide a patient management system, such as the patient management system 302 of FIG. 3.

As mentioned, in some examples, the patient management system (e.g., the patient management system 302) works with a patient messaging system (e.g., the patient messaging system 304, which may be provided using components of FIG. 4) to provide an end-to-end digital therapy solution.

The architecture shown in FIG. 11 is designed to facilitate personalized digital therapy by generating recommendations and triggering actions that adjust patient profiles. The digital therapy platform 102 integrates various systems and subsystems to collect patient data, detect patient events, generate personalized recommendations (e.g., using machine learning models), trigger corresponding actions, and adjust patient profiles to reflect these actions.

A data collection and management system 1102 aggregates and manages a plurality of data sources associated with patient profiles. The data collection and management system 1102 is responsible for collecting structured and/or unstructured patient data, which may include therapy goals, baseline conditions, changes in patient conditions, motion data, patient feedback data, clinical notes, and performance data related to therapy sessions. The patient data may include details of some or all communications between a therapist and a patient, including, for example, a messaging history.

The data collection and management system 1102 may communicate with or include a multitude of sensors, data acquisition devices, and patient engagement interfaces that capture a wide range of patient data. In this regard, reference can be made to FIG. 2 which describes examples of sensor data and/or motion tracking data that can be collected. The data collection and management system 1102 may be responsible for the aggregation, normalization, and storage of both real-time and historical patient data, ensuring that data integrity is maintained and that the data is readily accessible for processing by other systems within the digital therapy platform 102. The data collection and management system 1102 thus serves as a repository for comprehensive patient-related data.

In some examples, the data collection and management system 1102 communicates with a digital therapy program management system 1104 to obtain information regarding, for example, a patient's digital therapy program. This can include information regarding exercises or repetitions that the patient has performed or is scheduled to perform. Alternatively or additionally, this can include information regarding other therapy activities, such as CBT, that the patient has performed or is scheduled to perform. As mentioned, the aforementioned program information can be referred to as the "prescription" of the patient.

The digital therapy program management system 1104 may be responsible for managing the creation, adjustment, and administration of digital therapy programs tailored to individual patient needs. The digital therapy program management system 1104 may utilize data from the data collection and management system 1102 to inform therapy program decisions and ensure that each patient receives a customized treatment plan. In some examples, and as described further below, the digital therapy program management system 1104 can receive custom or adapted treatment plans generated via a recommendation customization and personalization system 1110 of the digital therapy platform 102.

A security compliance and administration layer 1106 provides a framework to protect sensitive patient data and ensure compliance with relevant healthcare regulations. The security compliance and administration layer 1106 includes encryption protocols, secure data transmission mechanisms, and compliance monitoring tools. It also offers administrative functionalities, such as user access control and system configuration management, to maintain the integrity and security of the digital therapy platform 102.

An event detection system 1108 is responsible for monitoring patient data to identify significant events or changes in a patient's therapy journey. These can be referred to as "patient events." In some examples, a predetermined number of patient events are defined within the digital therapy platform 102, and the event detection system 1108 is configured to detect them. These patient events trigger generation of personalized recommendations or adjustments to a therapy program.

For example, patient data may be updated to indicate that a therapy kit has been delivered to a new patient. The event detection system 1108 detects that the therapy kit has been delivered and triggers generation (or instructs another component to trigger generation) of a new digital therapy program or an onboarding session for that patient within the digital therapy platform 102. As another example, if, based on patient session records accessible via the data collection and management system 1102, the event detection system 1108 detects that a patient has skipped two therapy sessions, the event detection system 1108 may trigger generation (or instruct another component to trigger generation) of a personalized message for the patient.

The event detection system 1108 can thus interface with data collection and management system 1102 to monitor patient data. The event detection system 1108 may employ rules-based techniques and/or machine learning algorithms to interpret and analyze the patient data. The event detection system 1108 can communicate with an AI integration system 1114 to utilize machine learning models trained for event detection. In some examples, the event detection system 1108 is designed to evaluate incoming patient data and prioritize it based on clinical significance and patient-specific factors, such as individual health goals and therapy progress.

In some examples, the event detection system 1108 communicates a notification of a patient event to the recommendation customization and personalization system 1110. Upon detecting a patient event, the recommendation customization and personalization system 1110 is configured to generate a recommendation that is personalized to a specific patient's profile. This recommendation may include a suggested digital therapy program, a modification to an existing therapy program, a personalized message intended for transmission to the patient, or other recommendations, depending on the implementation and digital therapy context.

The recommendation customization and personalization system 1110 may analyze the patient data in the data collection and management system 1102 to generate recommendations that are tailored to the individual characteristics, clinical conditions, and particular needs of each patient. The recommendation customization and personalization system 1110 may utilize rules-based techniques and/or machine learning algorithms to interpret and analyze the patient data. In some examples, the recommendation customization and personalization system 1110 uses a generative machine learning model such as an LLM (e.g., the LLM 140) to generate a personalized recommendation. The recommendation customization and personalization system 1110 may also interface with the AI integration system 1114 to generate its recommendations.

The recommendation customization and personalization system 1110 can process various data sources, including both structured and unstructured data, to generate the personalized recommendation. For example, the recommendation customization and personalization system 1110 may provide an LLM with both structured data with patient performance metrics from a data table and unstructured data with therapist notes, as part of a prompt instructing the LLM to generate a recommendation.

In some examples, the recommendation customization and personalization system 1110 is designed to evaluate patient data and prioritize it based on clinical significance and patient-specific factors, such as individual health goals and therapy progress. For example, the recommendation customization and personalization system 1110 may detect that a patient has missed two therapy sessions after struggling with exercises during a preceding session. Based on this information, the recommendation customization and personalization system 1110 may automatically identify that the priority is to adjust the digital therapy program of the patient to include easier exercises and to notify the patient of the adjustments. Such a recommendation may then be prioritized over other possible recommendations, such as generating a message informing the patient of their deteriorating condition.

The recommendations generated by recommendation customization and personalization system 1110 serve as input for other systems in the digital therapy platform 102, such as a therapist UI and feedback system 1116 and an action triggering system 1124. The therapist UI and feedback system 1116 is designed to facilitate a therapist's understanding and review of the AI-generated recommendations, which are then conveyed to the therapist to assist in patient care decisions. Through data collection, event detection, and recommendation generation, the digital therapy platform 102 of FIG. 11 achieves a high level of personalization and clinical efficacy.

Where the generation of a personalized recommendation involves a prompt transmitted to a machine learning model, the digital therapy platform 102 may leverage a prompt generation and processing engine 1112 to construct structured and effective prompts. The prompts may be structured to guide the generation of personalized recommendations. The prompt generation and processing engine 1112 is configured to integrate patient data and event information to create prompts that are semantically rich and contextually relevant for processing via the AI integration system 1114. As described with reference to other examples above, the prompt generation and processing engine 1112 may utilize one or more scaffolding or prompt structures to ensure effective recommendation generation.

Referring again to the therapist UI and feedback system 1116, the therapist UI and feedback system 1116 presents generated recommendations to the therapist in a patient management user interface. For example, the therapist UI and feedback system 1116 may be a subsystem of the patient management system 302 of FIG. 3 that causes presentation of recommendations in the AI feed 220 of the patient management user interface 218 of FIG. 2. This interface allows therapists to review recommendations, which are based on the processing of patient data (e.g., using machine learning models). Therapists can act efficiently and with context, understanding why a suggested action is being recommended.

In some examples, the therapist UI and feedback system 1116 serves as the conduit between the event detection system 1108 and the recommendation customization and personalization system 1110 on the one hand, and a human therapist (e.g., the therapist 120), on the other hand. The therapist UI and feedback system 1116 can be designed to present recommendations in a user-friendly and actionable format. The therapist UI and feedback system 1116 can also serve as a conduit between the action triggering system 1124 and the therapist, as is described further below.

In some examples, upon receiving a recommendation, which is composed of data-driven and contextually relevant insights, the therapist UI and feedback system 1116 allows a therapist to review, approve, modify, or reject the suggestions. In this way, the therapist retains control over the decision-making process, leveraging the AI's capabilities while maintaining clinical oversight. In some cases (e.g., for non-critical functions or simple actions), a recommendation may be automatically actioned via the action triggering system 1124 without requiring therapist approval. The recommendation and/or action can nonetheless be presented via the therapist UI and feedback system 1116.

In some examples, to cater to a diverse patient population, a multi-language support and localization system 1118 provides translation and localization services. The multi-language support and localization system 1118 ensures that the platform is accessible to therapists in their preferred language and that language in recommendations is culturally appropriate and regionally customized.

An analytics and reporting system 1120 processes data collected during therapy sessions, as well as data relating to recommendations and triggered actions, transforming this data into actionable insights that can significantly impact the therapeutic process. In some examples, the analytics and reporting system 1120 employs data analytics techniques to process patient data, identifying performance indicators, trends, and patterns. It may generate reports and visualizations that succinctly summarize the patient's progress, adherence to the therapy regimen, and response to treatment. These reports are informative and also designed to be intuitive, allowing for quick interpretation and decision-making by both patients and healthcare providers.

The analytics and reporting system 1120 can work with the therapist UI and feedback system 1116 to allow the therapist to access analytics reports and visualizations, enabling them to monitor their patients' progress, adjust treatment plans, and provide personalized guidance based on empirical data. Data generated by the analytics and reporting system 1120 can be stored via the data collection and management system 1102 for subsequent use.

An external interfaces and third party system 1122 is a component of the digital therapy platform 102 of FIG. 11, serving as a gateway for integrating external data sources, healthcare systems, third-party services, or combinations thereof. The external interfaces and third party system 1122 may be engineered to facilitate interoperability between the digital therapy platform 102 and various external entities, thereby enriching the capabilities of the digital therapy platform 102 and extending its functionality beyond its core offerings.

For example, through the external interfaces and third party system 1122, the digital therapy platform 102 can connect to a multitude of external data sources, such as electronic health records, medical databases, and patient health applications. By accessing these sources, the digital therapy platform 102 can import patient data, including medical history, treatment plans, and biometric information, which can be used to enhance the personalization and accuracy of the therapy sessions. In some examples, such data can be presented to the therapist in the therapist UI and feedback system 1116. Furthermore, such data can be integrated into the patient data of the data collection and management system 1102 and used to detect patient events and/or generate personalized recommendations.

In addition to data sources, the external interfaces and third party system 1122 may enable the digital therapy platform 102 to interface with healthcare systems, such as hospital information systems and practice management software. This integration may allow for a two-way exchange of information, where therapy data generated by the platform can be shared with healthcare providers, and updates from the providers can be reflected in the digital therapy platform 102.

As mentioned, a personalized recommendation generated by the digital therapy platform 102 (e.g., using the recommendation customization and personalization system 1110) can lead to the invoking of an action within the digital therapy platform 102. The action triggering system 1124 is responsible for initiating actions within the digital therapy platform 102 based on, or based partially on, such recommendations. Some actions may be subject to therapist approval via the therapist UI and feedback system 1116. In some cases, the therapist may modify a recommendation and trigger an action based on the modified recommendation (e.g., the recommendation customization and personalization system 1110 uses the LLM 140 to generate a proposed message, which is then edited by the therapist, and approved for transmission to the patient, thus triggering the action).

The action triggering system 1124 may be configured to ensure that appropriate interventions are executed, such as adjusting therapy programs or sending personalized messages to patients. In some examples, the action triggering system 1124 interfaces with other components of the digital therapy platform 102 to ensure that actions are implemented. For example, to adjust a digital therapy program (e.g., to increase exercise difficulty or to replace one type of exercise with another based on an AI-generated recommendation), the action triggering system 1124 can send an instruction to the digital therapy program management system 1104 to update the patient profile to reflect the adjusted digital therapy program.

As another example, to cause delivery of a personalized message based on a recommendation generated by the recommendation customization and personalization system 1110, the action triggering system 1124 can send an instruction to the patient UI and feedback system 416 of FIG. 4 to deliver the message to a device of the patient. In another example, the digital therapy platform 100 of FIG. 11 includes its own, dedicated patient UI and feedback system to deliver messages to a device of the patient and to receive messages from the patient. A patient management system (e.g., the patient management system 304) may thus exchange messages with a patient independently of a "real-time" patient messaging system (e.g., the patient messaging system 304).

The action triggering system 1124 also communicates with the therapist UI and feedback system 1116. For example, the action triggering system 1124 may provide, in the patient management user interface 218, confirmation to the therapist of a trigger or completed action.

In this way, the patient profile is updated to reflect the action that was invoked within the digital therapy platform 102. In some examples, both the patient and the therapist receive an indication of the invoked action. For example, where a personalized message that was generated by the LLM 140 is sent, the personalized message is visible to both the patient (e.g., via the user interface at the user device 108) and to the therapist (e.g., via the user interface at the user device 118).

The digital therapy platform 102, as described with reference to FIG. 11, provides a comprehensive solution for personalized digital therapy. By leveraging features such as advanced machine learning models and integrating a wide array of patient data, the digital therapy platform 102 supports therapists in delivering personalized, efficient, and effective care, ultimately contributing to improved patient outcomes and enhanced engagement in the therapeutic process. Examples of the digital therapy platform 102 can thus provide a technical solution that overcomes limitations of traditional therapy management approaches.

In some examples, the digital therapy platform 102 may include components from both FIG. 4 and FIG. 11. In some examples, at least some of the components or systems shown in FIG. 4 or FIG. 11 are configured to communicate with each other to implement aspects described herein.

There may also be overlap between the architectures of FIG. 4 and FIG. 11. For example, a single component may provide functionality utilized by the patient management system 302 based on the architecture of FIG. 11 as well as functionality utilized by the patient messaging system 304 based on the architecture of FIG. 4. One or more of the components may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 12:
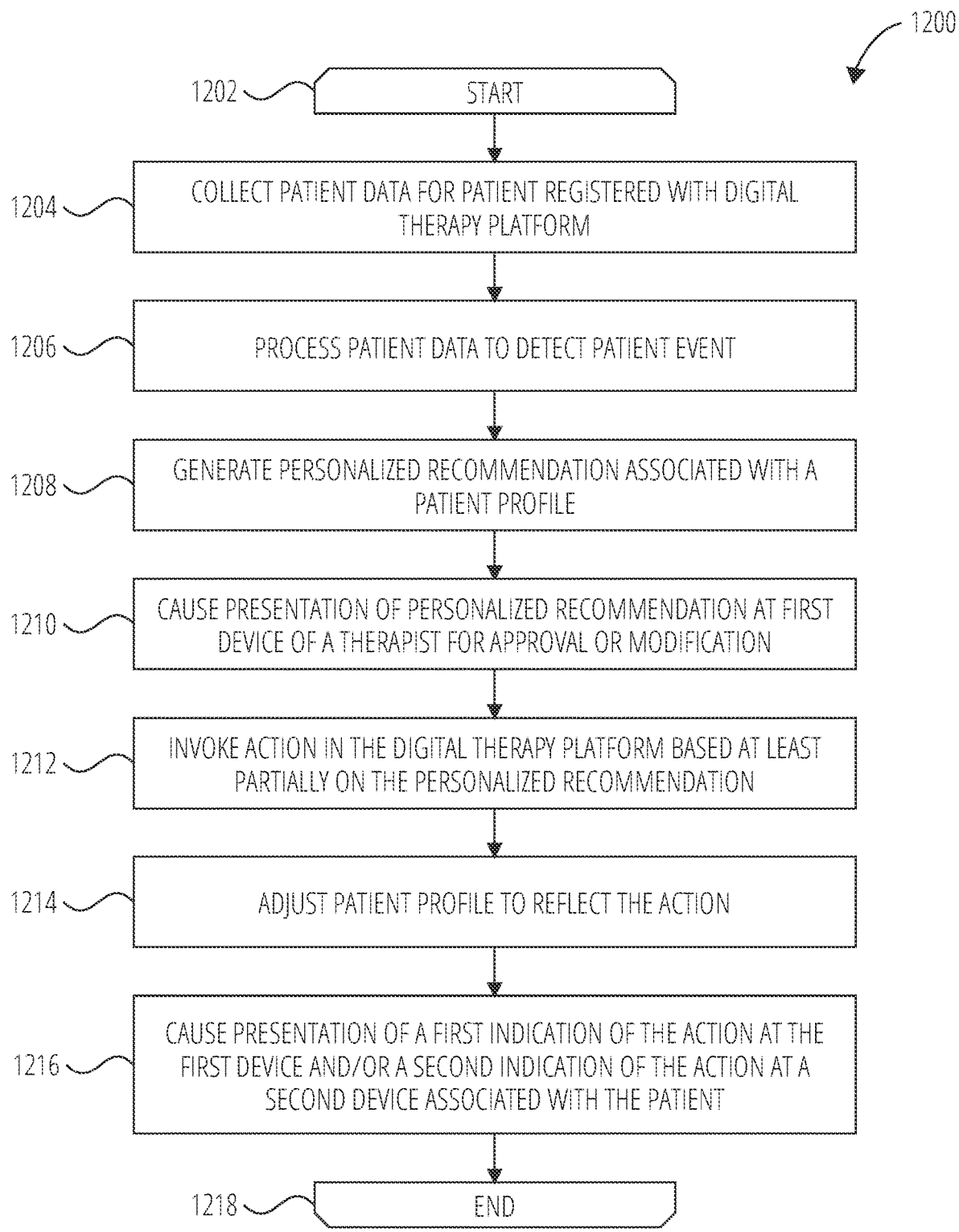
FIG. 12 is a flowchart illustrating a process for generating personalized recommendations in a digital therapy platform, according to some examples.

Personalized Recommendation Generation in a Digital Therapy Platform (FIG. 12)

FIG. 12 illustrates a method 1200 for generating personalized recommendations in a digital therapy platform, according to some examples. The method 1200, as may be performed by the digital therapy platform 102, seeks to enhance a therapist's ability to provide personalized care by generating AI-powered recommendations based on patient data. These recommendations are delivered to therapists at certain junctures to facilitate informed decision-making and therapy adjustments.

Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

The method 1200 commences at opening loop element 1202 and proceeds to operation 1204, where the digital therapy platform 102 collects patient data from a plurality of data sources associated with a patient profile (e.g., using the data collection and management system 1102). As mentioned, structured and unstructured data may be collected from various sources such as electronic health records, motion tracking systems, wearable devices, and patient self-reports.

The digital therapy platform 102 continuously processes and monitors the patient data. For example, the digital therapy platform 102 can check for the occurrence of one of a plurality of predefined patient events, such as an onboarding event, completion of a therapy session, or a missed therapy session. The data collection and management system 1102 may interact with the digital therapy program management system 1104 to obtain data regarding the patient's digital therapy program. At operation 1206 the digital therapy platform 102 detects a patient event (e.g., using the event detection system 1108).

In response to detecting the patient event, the digital therapy platform 102 generates a personalized recommendation associated with the patient profile of the patient (operation 1208). For example, the recommendation customization and personalization system 1110 can operate with the AI integration system 1114 to utilize machine learning models (e.g., the LLM 140) to process the patient data and generate a personalized recommendation. For example, the recommendation may include suggested modifications to the digital therapy program or personalized messages proposed for delivery to the patient.

The digital therapy platform 102 may define certain correspondences between patient events and personalized recommendation types. For example, the digital therapy platform 102 may define (e.g., in the database 130) that a patient event relating to a missed session corresponds to a personalized recommendation of type "recommend personalized message." As another example, the digital therapy platform 102 may define that a patient event relating to a patient struggling with exercises corresponds to a personalized recommendation of type "recommend adjusted program." In such cases, the recommendation customization and personalization system 1110 automatically proceeds with the generation of a recommendation according to this predetermined correspondence.

However, in other cases, the recommendation customization and personalization system 1110 may generate a personalized recommendation without being provided with such a correspondence. For example, the LLM 140 may be prompted to recommend the most suitable intervention without limiting the instruction to a specific type of intervention.

In some examples, the recommendation customization and personalization system 1110 automatically generates one or more reasons for the personalized recommendation. In some cases (e.g., where therapist approval is needed for a certain action) the method 1200 proceeds to operation 1210 where the personalized recommendation is presented to the therapist. For example, the therapist 120 of FIG. 2 may access the digital therapy application to view the patient profile of the patient. The digital therapy platform 102 then surfaces the personalized recommendation in a user interface (e.g., the patient management user interface 218). The therapist can be enabled to modify the personalized recommendation, approve the personalized recommendation as is, or reject the personalized recommendation.

At operation 1212, an action is invoked in the digital therapy platform 102 based at least partially on the personalized recommendation. For example, the action triggering system 1124 may receive an approval message via the therapist UI and feedback system 1116 and invoke an action based on the personalized recommendation (e.g., cause delivery of a message to the patient based on an approved message suggestion or adjust the digital therapy program based on a suggested modification). In some cases, the therapist approval of the personalized recommendation is subject to a modification. For example, the therapist reviews the personalized recommendation generated via the recommendation customization and personalization system 1110 and the AI integration system 1114 and edits the recommendation prior to approving it. In such cases, the action is invoked in the digital therapy platform 102 based on the modified personalized recommendation.

The method 1200 proceeds to operation 1214, where the digital therapy platform 102 automatically adjusts the patient profile of the patient to reflect the action taken. This adjustment ensures that the patient profile is up-to-date and accurately represents the current state of the patient's therapy journey. For example, the adjustment may ensure that a message history is up-to-date or that the digital therapy program management system 1104 is updated to reflect an adjusted set of exercises prescribed for the patient.

At operation 1216, the method 1200 includes causing presentation of an indication of the action. An indication of the action can be presented at one or both of a therapist device (e.g., the user device 118) and a patient device (e.g., the user device 108). For example, where the action involves an adjustment of prescribed exercises, this adjustment is made visible to both the therapist (e.g., in the patient management user interface 218 via the therapist UI and feedback system 1116) and the patient (e.g., when the patient views their upcoming session plan in the digital therapy application, or via the patient UI and feedback system 416). The indication provides visibility into the actions taken and supports the ongoing management of the therapy process. The indication may be explicit, such as a message drawing the attention of the therapist or patient to an adjustment, or non-explicit, such as session plan that includes the adjustment but does not necessarily highlight it to the patient. The method 1200 concludes at closing loop element 1218.

The digital therapy platform 102, through its intelligent use of AI-generated recommendations, can thus create a supportive environment that resembles the interaction and guidance a patient would have with only a human therapist. By providing adaptive and personalized recommendations, the system ensures that therapy sessions are proactively managed in a personalized and engaging manner, fostering an atmosphere conducive to recovery and rehabilitation.

The recommendation customization and personalization system 1110 may thus synthesize complex patient data into actionable recommendations for therapists. The recommendation customization and personalization system 1110 can employ one or a combination of rule-based logic and machine learning models, including large language models (LLMs), to interpret data points. In some examples, the recommendation customization and personalization system 1110 works with the prompt generation and processing engine 1112 to generate prompts that lead to personalized recommendations.

Referring to rule-based logic, rule-based systems within the digital therapy platform 102 can be grounded in predefined clinical guidelines established by healthcare professionals. These guidelines can serve as a framework for identifying and prioritizing data points that are clinically relevant to the patient's therapy. For example, the event detection system 1108 and/or the recommendation customization and personalization system 1110 may prioritize data indicating a significant change in the patient's condition or adherence to the therapy program, which could suggest a need for adjustment in the digital therapy program.

The rules-based systems may operate on a set of predefined rules or conditions that are crafted by healthcare professionals. For example:

Clinical guidelines: The rules may be based on clinical guidelines that define what constitutes significant improvements or concerning patterns in a patient's therapy data.

Thresholds: Rules may set thresholds for certain metrics, such as the number of sessions missed by a patient, beyond which a data point is flagged as noteworthy.

Sequencing: Such rules may dictate the order in which data points are evaluated, ensuring that certain information, like sudden changes in reported pain levels, is considered first.

Conditional logic: The rules may use if-then-else logic to determine the relevance of data. For instance, if a patient's adherence rate drops below a certain percentage, the rule-based system may prioritize this data for determining a patient event or a recommended action.

Referring now to machine learning models, these can be utilized by the event detection system 1108 and/or the recommendation customization and personalization system 1110 for a dynamic and adaptive approach to data evaluation. These models may be trained on datasets encompassing diverse therapy scenarios and patient responses, allowing them to discern patterns and correlations within the data. For example:

Pattern recognition: Algorithms may identify patterns in data that are not explicitly defined by rules, such as correlations between patient engagement and therapy outcomes.

Predictive analysis: Models may predict future trends based on historical data, such as the likelihood of a patient experiencing a setback, and prioritize recommendations accordingly.

Personalization: Models tailor the evaluation process to the individual patient by learning from their unique data, leading to highly personalized recommendations.

Adaptation: As more data is collected, models may adapt and refine their analysis, potentially identifying new significant data points that were not previously considered by rule-based systems.

As mentioned, in some examples, the recommendation customization and personalization system 1110 may work with the prompt generation and processing engine 1112 and the AI integration system 1114 to utilize prompt engineering and LLM technology for recommendation generation. For example, once data points have been evaluated and prioritized, the prompt generation and processing engine 1112 can proceed to structure a prompt. This process may involve structuring the selected data points into a coherent and logical sequence that can be effectively interpreted by an LLM. Prompts can be designed to be semantically rich and contextually relevant, providing the LLM with the necessary information to generate personalized recommendations.

The digital therapy platform 102 may also take into account patient-specific therapy goals when structuring the prompts. For example, these goals, defined in collaboration with the patient and their healthcare provider, are reflective of the desired outcomes of the therapy. By aligning the prompt structure with these goals, the digital therapy platform 102 can ensure that pertinent information is conveyed to the LLM, influencing the content and direction of the recommendations provided to the therapist.

In some examples, to obtain a personalized recommendation, a base prompt structure is utilized that includes a scaffold of essential data points, such as recent patient data changes, areas requiring attention, and motivational triggers identified from the patient's historical data. The prompt generation and processing engine 1112 can employ programmatic techniques to embed these data points into a structured prompt, ensuring that each element is placed within the prompt in a manner that maintains a logical flow. The AI integration system 1114 may receive the structured prompt and input it into the LLM. The LLM processes the prompt, analyzing the embedded data points and contextual information to understand the patient's current therapeutic state and generate a personalized recommendation.

In some examples, the personalized recommendations generated by the LLM are designed to be actionable and engaging, providing therapists with clear insights into the patient's condition and suggested interventions. These recommendations can also incorporate motivational elements that encourage the therapist to consider the patient's emotional and psychological needs in the therapy management process. As mentioned, the therapist UI and feedback system 1116 can be used by the therapist to validate and/or adapt LLM-generated recommendations for clinical accuracy and/or appropriateness. In this way, a robust framework is provided for generating personalized recommendations. In some examples, the digital therapy platform 102 can leverage the combined strengths of rule-based logic and machine learning models to deliver a sophisticated and adaptive recommendation system that enhances the quality of patient care.

Prompt Example for Generating Personalized Recommendations

In some examples, the prompt generation process is designed to create multiple types of prompts for LLM processing. This process includes the generation of a scenario descriptor, a system prompt, and a user prompt, each serving a specific purpose in the context of the therapy session. For example:

Event descriptor: This element informs the LLM of the patient event that triggered the generation process. For example, the event descriptor outlines a significant occurrence or pattern within the patient's therapy journey that requires attention. It provides a high-level overview of the event, such as a patient's lack of engagement or a notable change in their condition. The event descriptor is used to inform the system prompt and user prompt by providing context for the recommendation to be generated. Examples of event descriptors are listed below:

1. Patient consistently exceeded therapy goals in recent sessions.
2. Patient has missed multiple sessions.
3. Patient reports increased discomfort following specific exercises.
4. Patient expresses high satisfaction with therapy progress.
5. Patient's range of motion has plateaued, suggesting a need for program reassessment.
6. Patient has completed the initial therapy program and is ready for advancement.
7. Patient is approaching the end of their prescribed therapy timeline.
8. Patient inquires about the effectiveness of their current therapy regimen.
9. Patient experiences technical difficulties with digital therapy tools.
10. Patient provides feedback requesting more variety in their exercise program.

System prompt: The system prompt equips the LLM with the persona and context information related to the event described. It may instruct the LLM to adopt the role of an AI-powered therapy management assistant, providing clinically relevant and data-driven recommendations. The system prompt includes context such as the patient's therapy history, compliance data, and any relevant patient-reported outcomes. It guides the LLM on the tone and content of the recommendation, ensuring that it is aligned with the patient's therapy goals and the therapist's clinical judgment. The system prompt may also specify the desired format or structure of the recommendation output. In some examples, the system prompt may prompt the LLM to generate a specific recommendation type based on a predetermined correspondence between a patient event and a recommendation type.

User prompt: The user prompt provides detailed specifics regarding the event, including relevant or potentially relevant patient data for analysis. The user prompt is designed to elicit a comprehensive and personalized recommendation from the LLM, which directly addresses the patient's therapy management needs and supports the therapist in decision-making. The recommendation may include suggestions for therapy plan adjustments, patient engagement strategies, or additional assessments required.

The recommendation customization and personalization system 1110 and the prompt generation and processing engine 1112 can work together to generate the prompt in this structured format without any therapist input or other user input.

Tables 4 and 5 below provide non-limiting examples of event descriptors, system prompts, and user prompts designed to generate personalized recommendations for therapist review. By utilizing this structured approach, the digital therapy platform ensures that the recommendations generated by the LLM are informed, relevant, and actionable, providing therapists with valuable insights to optimize patient care.

TABLE 4

Example of a prompt and an LLM-generated response thereto

| | |
|---|---|
| Event descriptor | Patient has missed multiple sessions. |
| System prompt | You are an AI-powered therapy management assistant tasked with analyzing patient engagement data as well as any other patient data that could influence patient engagement with a program. Analyze the data and generate a recommendation that addresses potential barriers to engagement and suggests strategies to re-engage the patient. If your recommendation is to engage with the patient, include your proposed chat message to the patient. Include at least one reason for your recommendation. |

TABLE 4-continued

Example of a prompt and an LLM-generated response thereto

| | |
|---|---|
| User prompt | Patient ID 12345 has missed two consecutive weeks of therapy sessions. Previous attendance was consistent, with positive progress reports. Patient has not communicated specific reasons for absence. Review patient's history below and generate a recommendation for the therapist to encourage re-engagement.<br>Patient history data:<br>Attendance data: [ . . . ]<br>Exercise completion data: [ . . . ]<br>Pain levels: [ . . . ]<br>Review of Patient ID 12345's history indicates a previously high level of engagement but a recent drop in engagement level. It is unclear why adherence has dropped. It would be beneficial to reach out to the patient to understand any barriers they are facing and offer flexible scheduling options. I recommend a personalized encouragement message acknowledging their past progress and the importance of continuity in therapy. |
| Example of LLM-generated response that can be output to the patient | Proposed message:<br>"I hope this message finds you well. I've noticed that it's been a little while since your last session with us, and I wanted to check in to see how everything is going. You've been doing an incredible job, and your dedication has been truly inspiring. I understand that life can get busy, and sometimes it's challenging to maintain our routines.<br>Is there anything in particular that's been making it difficult for you to attend your therapy sessions? Whether it's scheduling conflicts, physical discomfort, or anything else on your mind, I'm here to listen and help you overcome any hurdles. Your health and well-being are our top priority, and we're committed to supporting you every step of the way.<br>If you're finding it hard to come in for your sessions, we can explore flexible scheduling options that fit better with your lifestyle. Remember, every step forward is progress, and we're here to celebrate each one with you.<br>Let's work together to keep the momentum going. When you're ready, let's discuss how we can tailor your therapy plan to get you back on track in a way that feels manageable and positive for you.<br>Please don't hesitate to reach out to me directly through this chat. Looking forward to hearing from you soon!" |

In the example of Table 4, once the LLM returns the example output, the personalized recommendation (chat message) can be presented to the therapist via the therapist UI and feedback system 1116 for approval, together with the LLM's additional comments (reasons for the recommendation). This allows the therapist to engage with the patient much more efficiently, e.g., by reducing the amount of information the therapist needs to review before interacting with the patient.

TABLE 5

Example of a prompt and an LLM-generated response thereto

| | |
|---|---|
| Event descriptor | Patient reports increased discomfort following specific exercises. |
| System prompt | You are an AI-powered therapy management assistant tasked with analyzing patient feedback and performance data. Analyze the data and generate a recommendation that addresses the patient's reported discomfort and suggests alternatives that may alleviate the issue. If your recommendation involves changing an exercise, specify the exercise to be replaced and the proposed alternative. |
| User prompt | Patient ID 12345 has reported increased discomfort following the completion of "Weighted Lunges." The patient has a history of knee sensitivity, and recent session data indicates a spike in reported pain levels post-exercise. Review the patient's history and generate a recommendation for the therapist to modify the patient's exercise program.<br>Patient history data:<br>Exercise completion data: [ . . . ]<br>Pain levels: [ . . . ]<br>Sensitivity data: [ . . . ] |

TABLE 5-continued

Example of a prompt and an LLM-generated response thereto

| | |
|---|---|
| Example of LLM-generated response that can be output to the patient | Proposed change: Switch "Weighted Lunges" with "Static Wall Sits" for subsequent sessions. Reasons: Based on Patient ID 12345's feedback and history of knee sensitivity, it is recommended to replace the "Weighted Lunges" exercise with "Static Wall Sits." This alternative exercise is designed to strengthen the same muscle groups while minimizing the strain on the knees. It is important to ensure that the patient's discomfort is addressed to prevent potential injury and to maintain engagement with the therapy program. |

In the example of Table 5, once the LLM returns the example output, the personalized recommendation (change to digital therapy program) can be presented to the therapist via the therapist UI and feedback system 1116 for approval, together with the LLM's additional comments (reasons for the recommendation). This allows the therapist to easily review, edit, and approve or reject the personalized recommendation. This also saves the therapist time in that less information review is needed.

Figure 13:
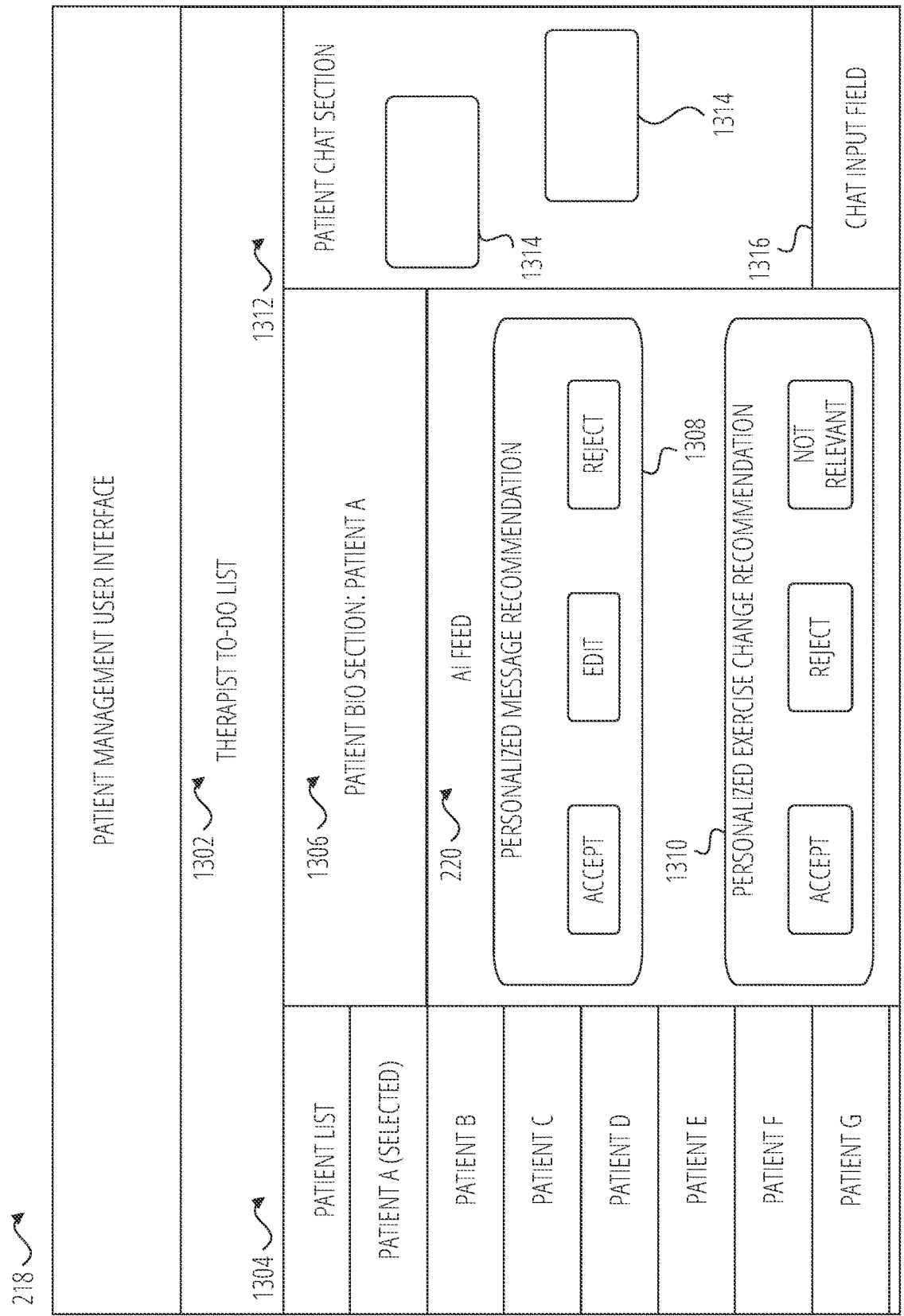
FIG. 13 is a user interface diagram illustrating a patient management user interface, according to some examples.

Patient Management User Interface (FIG. 13)

FIG. 13 is a user interface diagram illustrating the patient management user interface 218 of FIG. 2, according to some examples. The patient management user interface 218 is designed to incorporate the AI feed 220 that furnishes therapists with personalized recommendations and enables them to trigger actions based on such personalized recommendations.

In FIG. 13, a to-do list tab 1302 of a therapist is shown. The patient management user interface 218 is shown to include multiple sections within the to-do list tab 1302: a patient list 1304, patient bio section 1306, the AI feed 220, and a patient chat section 1312.

The patient list 1304 lists the patients that are currently assigned to the therapist. This list acts as a gateway to each patient's specific data and recommended actions, facilitating an orderly approach to daily tasks or patient management. In the case of FIG. 13, the therapist has selected "Patient A." Accordingly, the patient bio section 1306 provides a snapshot of details of Patient A, such as their demographic and clinical information. For example, the patient bio section 1306 may provide details about the age of Patient A, their injuries or therapy goals, and their digital therapy program (e.g., session plan).

The AI feed 220 is a dynamic repository that presents AI-generated personalized recommendations. For example, the digital therapy platform 102 may continuously monitor the patient data of Patient A and, in response to detecting a patient event, automatically generate a recommendation and surface it within the AI feed 220 for review. In the example of FIG. 13, the AI feed 220 includes a personalized message recommendation 1308 and a personalized exercise change recommendation 1310, each specifically generated for Patient A based on AI-driven analysis of the patient data of Patient A (e.g., from the data collection and management system 1102).

The personalized message recommendation 1308 is a contextually relevant message that the therapist can send to the patient, aiming to enhance engagement, provide specific guidance to Patient A, or respond to a specific query of Patient A. The patient management user interface 218 includes buttons allowing the therapist to accept, edit, or reject the personalized message recommendation 1308.

The personalized exercise change recommendation 1310 is an AI-recommended modification to the digital therapy program (e.g., exercise regimen) of Patient A. The personalized exercise change recommendation 1310 could involve adjusting the intensity, duration, or type of exercises based on the patient's progress and feedback. The patient management user interface 218 includes buttons allowing the therapist to accept or reject the recommendation, or to flag it as "not relevant." If flagged as "not relevant," the flag can be used as additional context or for further training of machine learning models to allow for improved future recommendations.

As an example, the personalized exercise change recommendation 1310 may indicate that Patient A has skipped the "Side Planks" exercise multiple times due to pain, and recommend replacing "Side Planks" with "Regular Planks" for the next session. If the therapist accepts the personalized recommendation, the patient profile is automatically updated to reflect the action of adjusting the digital therapy program. As another example, the personalized exercise change recommendation 1310 may recommend that the "Hip Flexion with Knee Bend" be excluded from future sessions given that Patient A consistently struggles with or complains about the exercise. In this way, the digital therapy program of a patient can be efficiently personalized or optimized through AI-driven analysis.

In some examples, the AI feed 220 is a dynamic section of the patient management user interface 218. For example, if the therapist does not act on a specific recommendation within a predetermined period of time, that recommendation may be replaced by a new or prioritized recommendation in response to detection of a new patient event by the digital therapy platform 102.

The patient chat section 1312 is a communication section where therapists can view and engage in conversations with patients in a secure manner. It contains messages 1314 that reflect ongoing dialogue and a chat input field 1316 for composing and sending new messages.

The patient management user interface 218 is designed to be interactive and responsive, with sections providing real-time updates. For example, when a therapist acts on a recommendation in the AI feed 220, the patient bio section 1306 can be automatically updated to reflect a change in the patient profile, or the patient chat section 1312 can be automatically updated to show a new message transmitted to the patient by the digital therapy platform 102.

In some examples, the patient management user interface 218 also integrates a dashboard that displays key performance metrics and analytics. For example, the analytics and reporting system 1120 may integrate with the therapist UI and feedback system 1116 to provide such data within the patient management user interface 218. This data visualiza- Personalized Recommendation Process for Adaptive Digital Therapy Program (FIG. 14)

Figure 14:
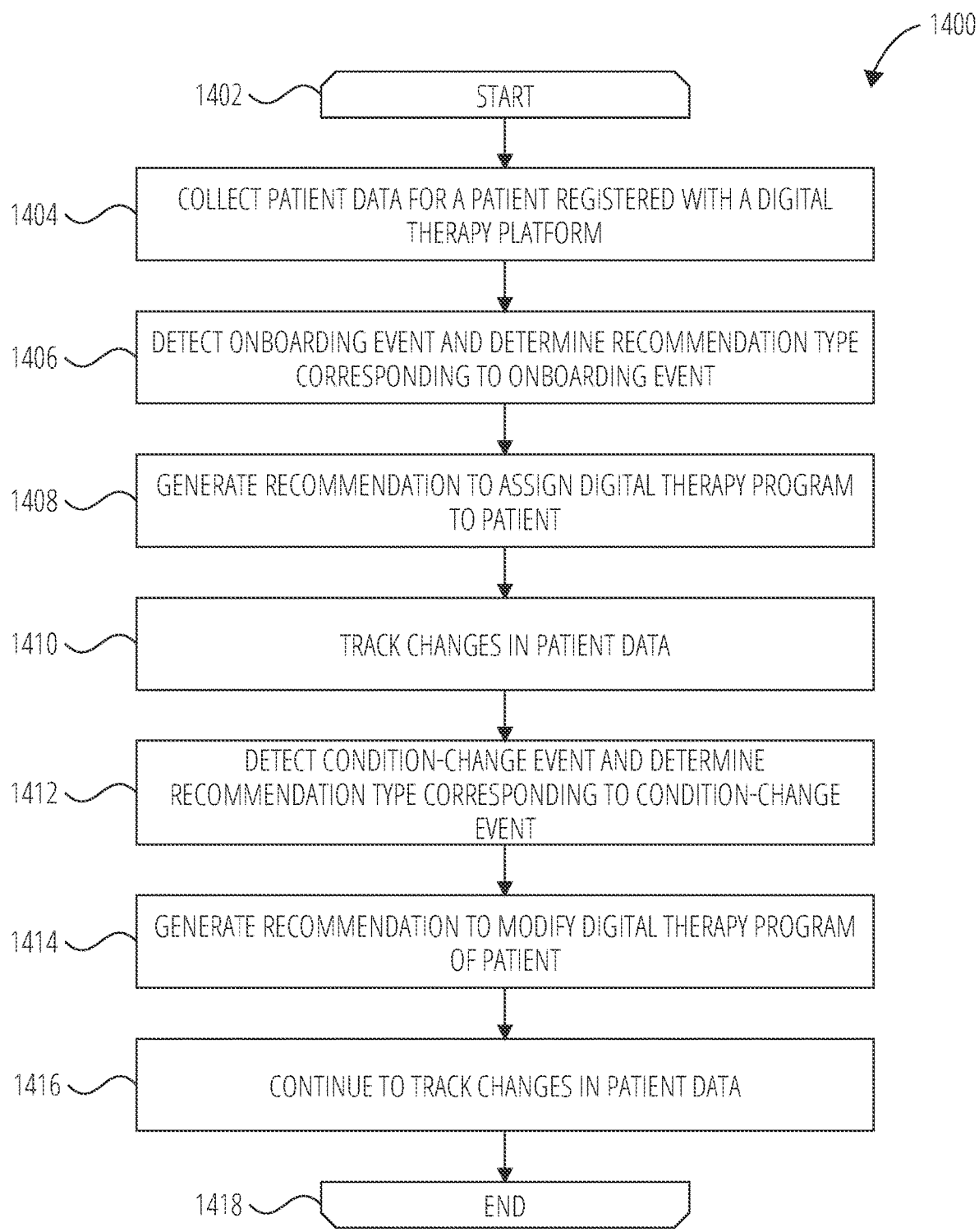
FIG. 14 is a flowchart illustrating a process for generating personalized recommendations to establish and modify a digital therapy program within a digital therapy platform, according to some examples.

FIG. 14 illustrates a method 1400 for generating personalized recommendations to establish and modify a digital therapy program within a digital therapy platform, according to some examples. The method 1400, as may be performed by the digital therapy platform 102 using components shown in FIG. 11, provides a technical solution to the challenge of personalizing and intelligently adapting therapy programs based on patient-specific data and events, which is a significant improvement over static therapy assignment systems.

Although the example method 1400 depicts a particular sequence of operations, the sequence may be altered without departing from the scope of the present disclosure. For example, some of the operations depicted may be performed in parallel or in a different sequence that does not materially affect the function of the method 1400. In other examples, different components of an example device or system that implements the method 1400 may perform functions at substantially the same time or in a specific sequence.

The method 1400 commences at opening loop element 1402, and proceeds to operation 1404, where the digital therapy platform 102 collects patient data for a patient registered with a digital therapy platform. The digital therapy platform 102 may collect and continuously or periodically update comprehensive patient information, which can include, for example, medical history, motion data, health status, personal therapy goals, or patient feedback data.

The digital therapy platform 102 may perform initial data collection (e.g., using the data collection and management system 1102) for creating a baseline patient profile. The baseline patient profile can provide an indication of the type of digital therapy program that would be suitable or beneficial for the patient. As will be described below, the digital therapy platform 102 can then update the patient data over time such that the patient profile reflects the patient's therapy journey (e.g., their performance and adherence).

At operation 1406, the digital therapy platform 102 detects an onboarding event (e.g., using the event detection system 1108) and determines a recommendation type corresponding to the onboarding event. The onboarding event may, for example, be detected based on the patient registering on the digital therapy platform 102 and providing certain required information and/or receiving a therapy kit. In the example of FIG. 14, the digital therapy platform 102 detects that an initial digital therapy program should be recommended for the patient in response to the onboarding event. For example, the event detection system 1108 can access the database 130 of FIG. 1 via the data collection and management system 1102 to identify the correspondence to be used to link the patient event to the recommendation to be generated.

The method 1400 proceeds to operation 1408, where the digital therapy platform 102 then analyzes the patient data (e.g., the baseline patient profile) and generates a personalized recommendation that includes a proposed initial digital therapy program (e.g., recommended exercises, session durations, session frequency, or the like). In some examples, the personalized recommendation generated using the recommendation customization and personalization system 1110 is presented for therapist approval or modification via the therapist UI and feedback system 1116 prior to assignment thereof to the patient profile, as described elsewhere herein. However, in other examples, the initial digital therapy program can be automatically assigned to the patient profile via the action triggering system 1124 in a fully automated process.

Regardless of whether therapist approval is needed, once assigned or finalized, the patient profile is updated by the digital therapy platform 102 (e.g., via the action triggering system 1124 and the digital therapy program management system 1104) to include details of the patient's new digital therapy program. The patient then commences with the digital therapy program. The patient uses their computing device (e.g., the user device 108) and, in some cases, one or more sensors (e.g., trackers 208 and 210) to allow the digital therapy platform 102 to monitor the patient and collect patient data.

Data collected or analyzed by the sensors or motion tracking devices associated with the patient profile may include, for example, joint angles, muscle activation, forces due to lengthening or contraction of body parts, and movement velocity (or a subset thereof). Joint angles may be measured to ensure the patient's movements align with the prescribed therapeutic range of motion. This data is used for confirming proper exercise execution and for tracking the patient's progress within their therapy program. Muscle activation may be monitored via electromyography sensors, which provide insights into the patient's muscle engagement during therapy sessions. This information is used for evaluating the effectiveness of the exercises and for detecting any compensatory strategies employed by the patient. Movement velocity is tracked to assess the speed and fluidity with which the patient performs exercises. This metric is indicative of the patient's level of control and the ability to execute exercises with the intended intensity.

The digital therapy platform 102 tracks changes in the patient data of the patient over time (operation 1410). For example, as the patient completes sessions and/or communicates with the therapist via the digital therapy platform 102, the digital therapy platform 102 monitors the updated patient data and checks for new patient events. This may include improvements, setbacks, changes in patient engagement or health status, patient queries, etc. Such events may be assessed against predetermined thresholds stored in the database 130.

In some examples, the patient data is updated over time to include performance data of the patient related to one or more therapy sessions of the assigned digital therapy program. The digital therapy platform 102 then detects a further patient event based on the updated performance data. For example, and as shown in FIG. 14, the digital therapy platform 102 detects a condition-change event (operation 1412) that may indicate a significant improvement or a significant deterioration in the physical condition of the patient.

In response to detecting the further patient event, the digital therapy platform 102 generates a further personalized recommendation. For example, and as shown in FIG. 14 at operation 1414, the digital therapy platform 102 generates a further recommendation to modify the digital therapy program of the patient based on the condition-change event. As an example, if the digital therapy platform 102 detects that the patient has shown significant improvements and is completing most exercises with ease, the further personalized recommendation can be a recommendation to increase program difficulty. As another example, if the digital therapy platform 102 detects that the patient has deteriorated and is increasingly struggling with exercises, the further personalized recommendation can be a recommendation to replace current exercises with easier exercise. In some examples, this recommendation is based on the latest patient data and the nature of the condition-change event, ensuring that the therapy program remains responsive to the patient's evolving needs.

Again, the further recommendation can be presented at a therapist device via the therapist UI and feedback system 1116 for approval, modification, or rejection. If approved, the patient profile is automatically updated and the patient carries out exercises according to a modified digital therapy program in future sessions.

As shown in FIG. 14, the method 1400 can involve continuing to track changes in or updates to the patient data (operation 1416), thereby maintaining, by the digital therapy platform 102, an ongoing assessment of patient progress and adapting the therapy program as necessary. The method 1400 concludes at closing loop element 1418, for example, when the patient has completed their therapy journey (e.g., all sessions have been completed and/or the patient has reached a therapy or rehabilitation goal).

The flowchart in FIG. 14 thus illustrates a method 1400 that integrates patient data collection, event detection, and the generation of tailored recommendations to manage and personalize digital therapy programs effectively. This process provides a technical solution to challenges associated with adapting therapy programs proactively, offering a more individualized, data-driven, and flexible approach to digital therapy. It represents a significant technical advancement over conventional therapy management systems, enhancing the personalization and efficacy of digital therapy interventions for patients through the use of technology.

Figure 15:
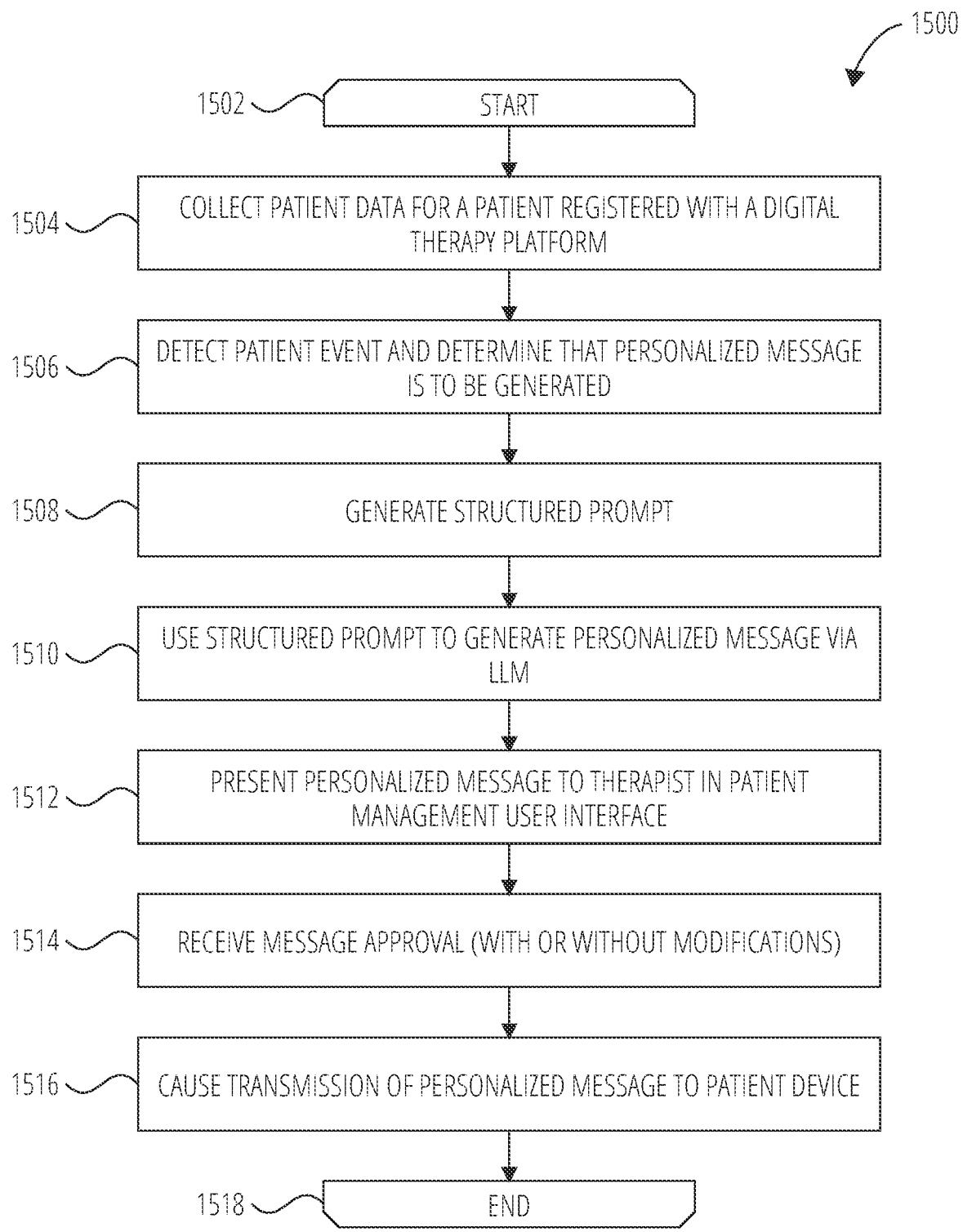
FIG. 15 is a flowchart illustrating a process for generating personalized recommendations to cause transmission of personalized messages in a digital therapy platform, according to some examples.

Personalized Recommendation Process for Patient Communications (FIG. 15)

FIG. 15 illustrates a method 1500 for generating personalized recommendations to cause transmission of personalized messages in a digital therapy platform, according to some examples. The method 1500, as may be performed by the digital therapy platform 102 using components shown in FIG. 11, provides a technical solution to the challenge of generating and delivering personalized messages that are tailored to an individual patient, timeous, and/or responsive to patient events, significantly improving the interactivity and personalization of digital therapy.

Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

The method 1500 commences at opening loop element 1502, and proceeds to operation 1504, where the digital therapy platform 102 collects patient data for a patient registered with a digital therapy platform. The digital therapy platform 102 may collect and continuously or periodically update comprehensive patient information, which can include one or more of the data items described elsewhere herein.

Proceeding to operation 1506, the method 1500 includes detecting a patient event and determining that a personalized message is to be generated. For example, the digital therapy platform 102 may be configured to generate a personalized message for review by the therapist if it detects one of a predefined set of events, such as an incoming message from the patient or patient data indicating a missed session. This operation employs technical mechanisms as described elsewhere herein to identify, by the digital therapy platform 102, specific events within the patient's therapy journey, such as feedback provided or unmet milestones, which may necessitate a personalized response from the therapist assigned to the patient.

At operation 1508, the method 1500 includes generating a structured prompt. This prompt is crafted using technical processes as described elsewhere herein that integrate relevant patient data and contextual information, forming the basis for generating a personalized message that is both clinically pertinent and empathetically crafted. Using the structured prompt, operation 1510 involves the generation of a personalized message via an LLM (e.g., the LLM 140).

For example, the recommendation customization and personalization system 1110 can communicate pertinent patient data obtained from the data collection and management system 1102 to the prompt generation and processing engine 1112. The prompt generation and processing engine 1112 then constructs the prompt based on a predetermined scaffolding or format (e.g., using an event descriptor, system prompt, and user prompt, as described elsewhere). The prompt generation and processing engine 1112 then communicates with the LLM 140 via the AI integration system 1114 to obtain output, which is fed back to the recommendation customization and personalization system 1110 for further processing. This operation leverages the advanced natural language processing capabilities of an LLM to interpret the prompt and produce a message that is tailored to the patient's specific circumstances and therapy needs.

At operation 1512, the method 1500 includes presenting the personalized message to the therapist in a patient management user interface (e.g., the patient management user interface 218). For example, the recommendation customization and personalization system 1110 can parse the output of the LLM to extract, from the output, the recommended message and the reasons for the recommendation, respectively. The recommendation customization and personalization system 1110 then communicates with the therapist UI and feedback system 1116 to present the recommendation and the reasons to the therapist for review. This makes it easy for the therapist to review the AI-generated suggestion.

Following the presentation of the personalized recommendation, operation 1514 includes receiving message approval from the therapist, which may occur with or without modifications. In this regard, reference can be made to the example of the patient management user interface 218 in FIG. 13 that illustrates the ability to "edit" a recommended message before triggering transmission thereof. This can allow the therapist to exercise professional judgment and attend to potential customization of the message to enhance its relevance and/or impact.

Once the message is approved, operation 1516 includes causing the transmission of the personalized message to the patient device (e.g., the user device 108 of FIG. 2 that is communicatively coupled to the digital therapy platform 102). The patient profile is adjusted or updated to reflect the transmitted message. In the case of the method 1500, both the patient and therapist receive an indication of the invoked action, since the therapist is presented with the message in the patient management user interface (e.g., in the patient chat section 1312) and the message is also delivered to the patient device. For example, where the user device 108 has the digital therapy application installed thereon, the user device 108 may generate or present a notification to the patient that includes the message from the therapist. The digital therapy application of the patient can also provide a chat section similar to the patient chat section 1312 shown in FIG. 13. The method 1500 concludes at closing loop element 1518.

The flowchart in FIG. 15 thus illustrates a method 1500 that integrates patient data collection, event detection, and the use of LLMs to enhance patient-therapist communication within a digital therapy platform. This process addresses technical challenges associated with generating timely, personalized, and clinically relevant messages in a digital therapy context. It represents a significant technical advancement over existing systems, offering a more adaptive, responsive, and engaging communication experience for patients undergoing therapy.

Figure 16:
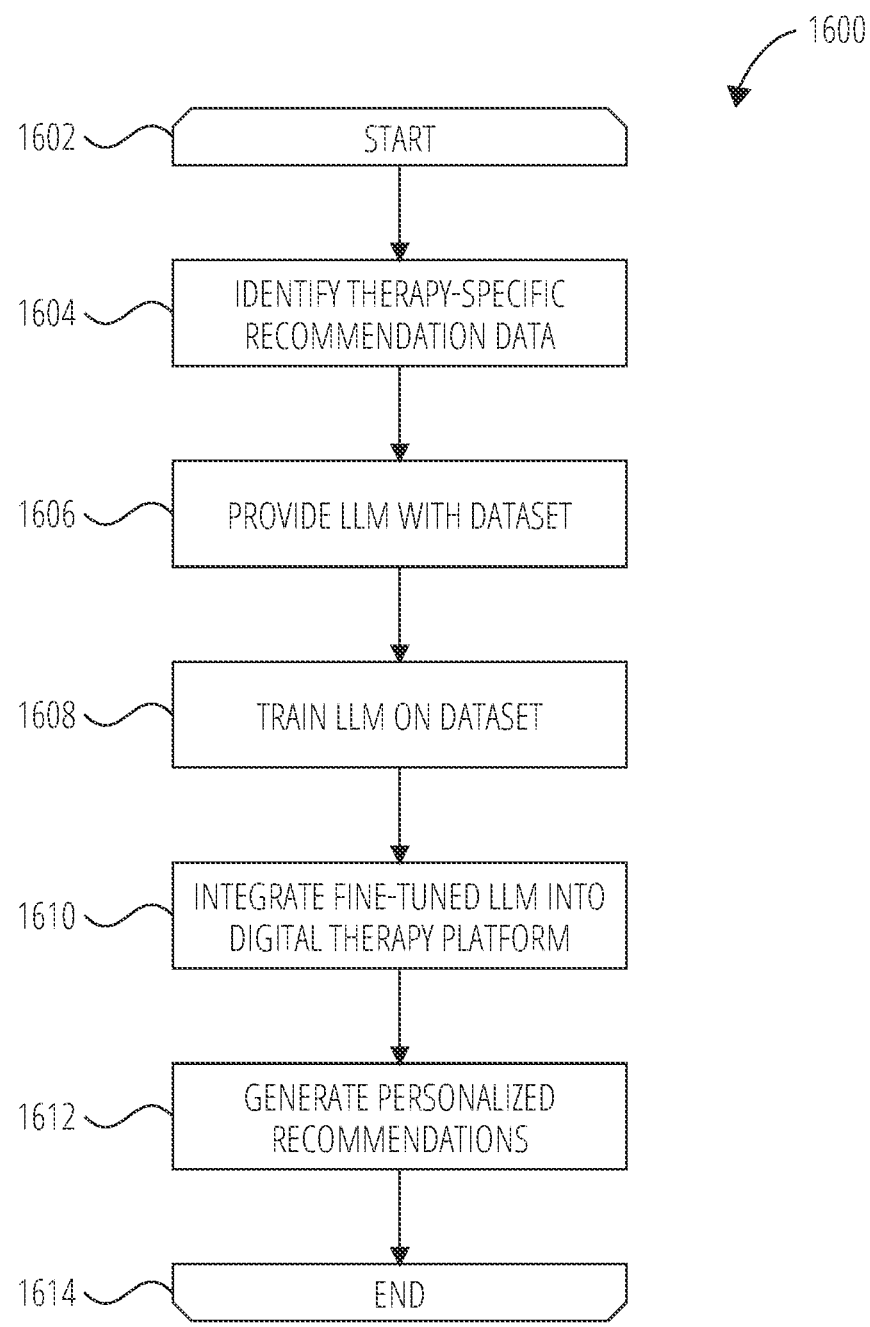
FIG. 16 is a flowchart for fine-tuning a machine learning model for personalized recommendations in a digital therapy platform, according to some examples.

Fine-Tuning an LLM for Personalized Recommendations in a Digital Therapy System (FIG. 16)

Referring to FIG. 16, a flowchart for a method 1600 of fine-tuning an LLM (e.g., an LLM 140) for personalized recommendations in a digital therapy platform is presented. The LLM 140 is used as an example in the description below.

Although the example method 1600 depicts a particular sequence of operations, the sequence may be altered without departing from the scope of the present disclosure. For example, some of the operations depicted may be performed in parallel or in a different sequence that does not materially affect the function of the method 1600. In other examples, different components of an example device or system that implements the method 1600 may perform functions at substantially the same time or in a specific sequence. The method 1600 begins at opening loop element 1602, marking the initiation of the fine-tuning process. This operation may involve the digital therapy platform 102 loading the LLM 140, which may be hosted internally or accessed via cloud-based services. The LLM 140 is a sophisticated AI model capable of understanding and generating natural language text, making it a valuable tool for generating personalized recommendations in the digital therapy system. As mentioned, the LLM 140 can be a foundation LLM, and it may be desirable to fine-tune the foundation LLM to better suit particular requirements of the therapy domain.

The method 1600 then moves to operation 1604, where the digital therapy platform 102 identifies specific data that is relevant to the generation of recommendations in a digital therapy context. Relevant data items may include example patient messages and responses thereto, examples of baseline patient profiles with their corresponding initial prescriptions, and/or examples of useful adjustments to a digital therapy program responsive to challenges faced by a patient.

Next, the method 1600 proceeds to operation 1606, which includes providing the LLM 140 with a dataset that includes the data gathered in operation 1604. This dataset can be referred to as a training dataset or a fine-tuning dataset. By providing the LLM 140 with this dataset, the digital therapy platform 102 ensures that the LLM 140 has access to the data needed to generate suitable personalized recommendations.

At operation 1608, the digital therapy platform 102 fine-tunes the LLM 140 by training it on the provided dataset. The training process involves adjusting the LLM's parameters to optimize its performance for recommendation-generation tasks. In this case, fine-tuning thus involves providing the LLM 140 with a smaller, more domain-specific dataset to alter its parameters. Other examples of fine-tuning are mentioned elsewhere in the present disclosure.

At operation 1610, the fine-tuned LLM 140 is integrated into the digital therapy platform 102. The integration process ensures that the LLM 140 is seamlessly incorporated into the platform's feedback generation process, enabling the platform to leverage the LLM's capabilities to deliver personalized recommendations to patients.

Operation 1612 involves the LLM 140 generating personalized recommendations based on an analysis of patient data as described herein. For example, the fine-tuned LLM 140 can be prompted using structured prompts, as described, to generate improved recommendations as a result of the fine-tuning process. The method 1600 concludes at closing loop element 1614.

Thus, the method 1600, depicted in FIG. 16, provides a process for fine-tuning an LLM for a digital therapy platform 102. It illustrates the sequence of activities from the identification of relevant fine-tuning data to the generation of personalized recommendations, and how the LLM is integrated into the digital therapy platform 102. Further details regarding certain aspects of model training are provided below with reference to FIG. 17.

Figure 17:
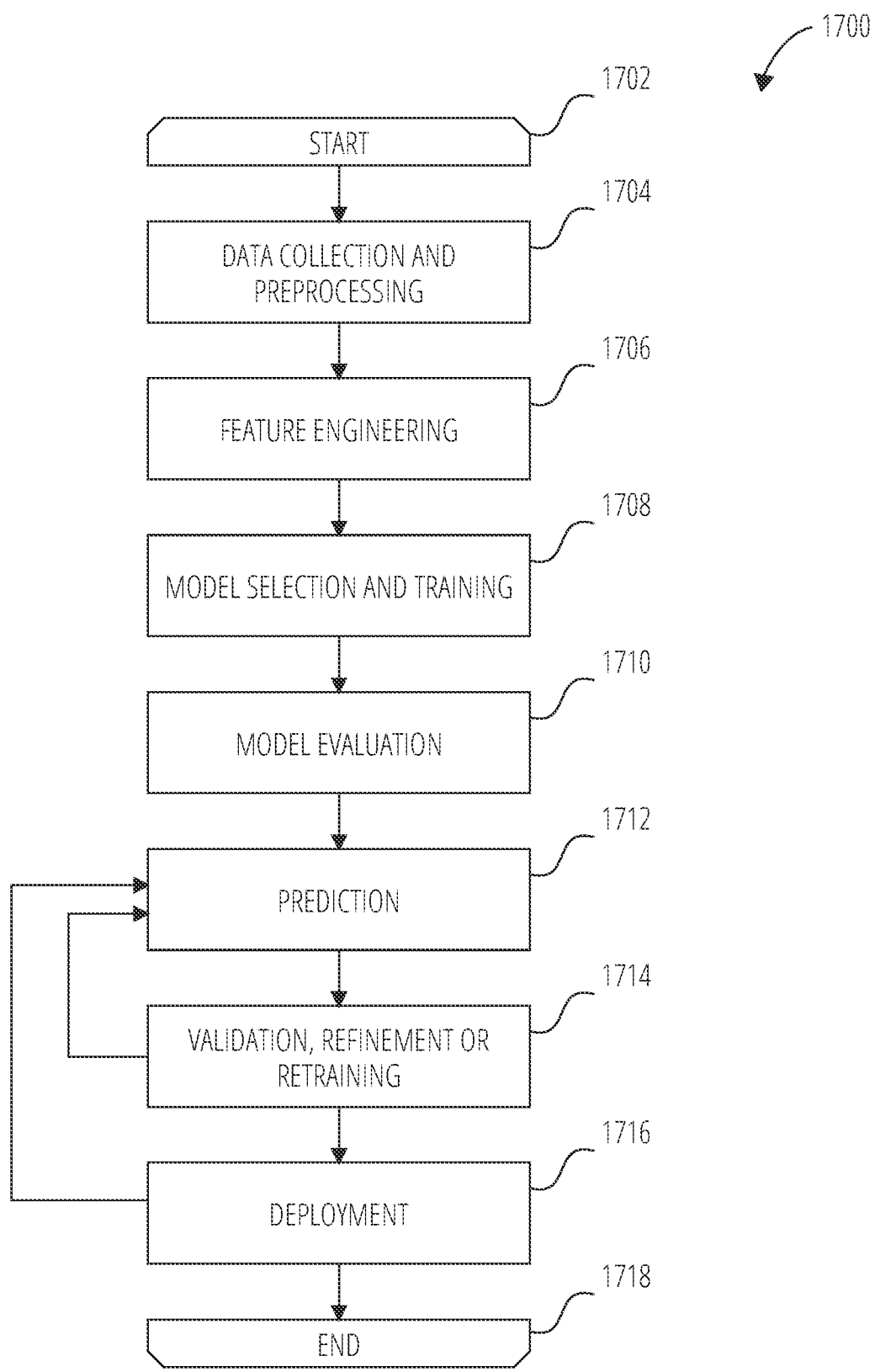
FIG. 17 is a flowchart illustrating a machine learning pipeline, according to some examples.

Machine Learning Pipeline 1700 (FIG. 17)

FIG. 17 is a flowchart depicting a machine learning pipeline 1700, according to some examples. The machine learning pipeline 1700 may be used to generate a trained model. One or more aspects of the machine learning pipeline 1700 may be implemented using the machine learning system 138 of FIG. 1.

The generation of a trained model may include multiple phases between an opening loop element 1702 and a closing loop element 1718 that form part of the machine learning pipeline 1700, including, for example, the following phases illustrated in FIG. 17:

Data collection and preprocessing 1704: This phase may include acquiring, cleaning and/or performing initial processing of data to ensure that it is suitable for use in the machine learning model or for feature engineering purposes. This phase may also include removing duplicates, handling missing values, and/or converting data into a suitable format. Training data may be obtained or finalized at the end of data collection and preprocessing 1704.

Feature engineering 1706: This phase may include selecting and transforming the training data set, or portions thereof, to create features that are useful for predicting a target variable. Feature engineering may include (1) receiving features (e.g., as structured or labeled data in supervised learning) and/or (2) identifying features (e.g., unstructured or unlabeled data for unsupervised learning) in the training data. Training data may be modified based on the outcomes of feature engineering.

Model selection and training 1708: This phase may include selecting an appropriate machine learning algorithm and training it on the preprocessed and/or feature-engineered data. This phase may further involve splitting the data into training and testing sets, using cross-validation to evaluate the model, and/or tuning hyperparameters to improve performance.

Model evaluation 1710: This phase may include evaluating the performance of a trained model on a separate testing data set. This phase can help determine if the model is overfitting or underfitting and determine whether the model is suitable for deployment.

Prediction 1712: This phase involves using the trained model to generate predictions on new, unseen data.

Validation, refinement or retraining 1714: This phase may include updating a model based on feedback generated from the prediction phase, such as new data, new requirements, or user feedback.

Deployment 1716: This phase may include integrating the trained model into a more extensive system or application, such as the digital therapy platform 102 of FIG. 1. This phase can involve setting up APIs, building a user interface, and ensuring that the model is scalable and can handle large or relatively large volumes of data. It will be appreciated that the trained model may be continuously or periodically updated, making the machine learning pipeline 1700 an iterative or partially iterative process, as indicated by the arrows in FIG. 17.

Examples of specific machine learning algorithms and/or models are provided in examples herein. However, it is noted that various machine learning algorithms may be deployed, according to some examples, and depending on the use case.

Referring generally to machine learning models, logistic regression, which is a type of supervised learning algorithm, can be used for binary classification tasks. Logistic regression models the probability of a binary response variable based on one or more predictor variables. Another example type of machine learning algorithm is Naïve Bayes, which is a supervised learning algorithm used for classification tasks. Naïve Bayes is based on Bayes' theorem and assumes that the predictor variables are independent of each other. Random forest is another type of supervised learning algorithm used for classification, regression, and other tasks. Random forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms may include decision trees, k-nearest neighbors, clustering algorithms, and deep learning algorithms, such as Convolutional Neural Networks (CNN), Recurrent Neural Networks (RNN), and transformer models. The choice of algorithm may depend on, for example, the nature of the data, the complexity of the problem, and the performance requirements of the application. Deep learning algorithms such as convolutional neural networks, recurrent neural networks, and transformers, as well as more traditional machine learning algorithms like decision trees, random forests, and gradient boosting may be used in various machine learning applications.

The performance of a machine learning model may be evaluated on a separate test set of data that was not used during training to ensure that the model can generalize to new, unseen data. In addition to a training phase, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

In a prediction or inference phase, the trained machine learning model uses the relevant features for analyzing query data to generate inferences, outcomes, or predictions. In some examples, a machine learning model may be fine-tuned, e.g., after initial deployment. The term "fine-tuning," as used herein, generally refers to a process of adapting a pre-trained machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

Figure 18:
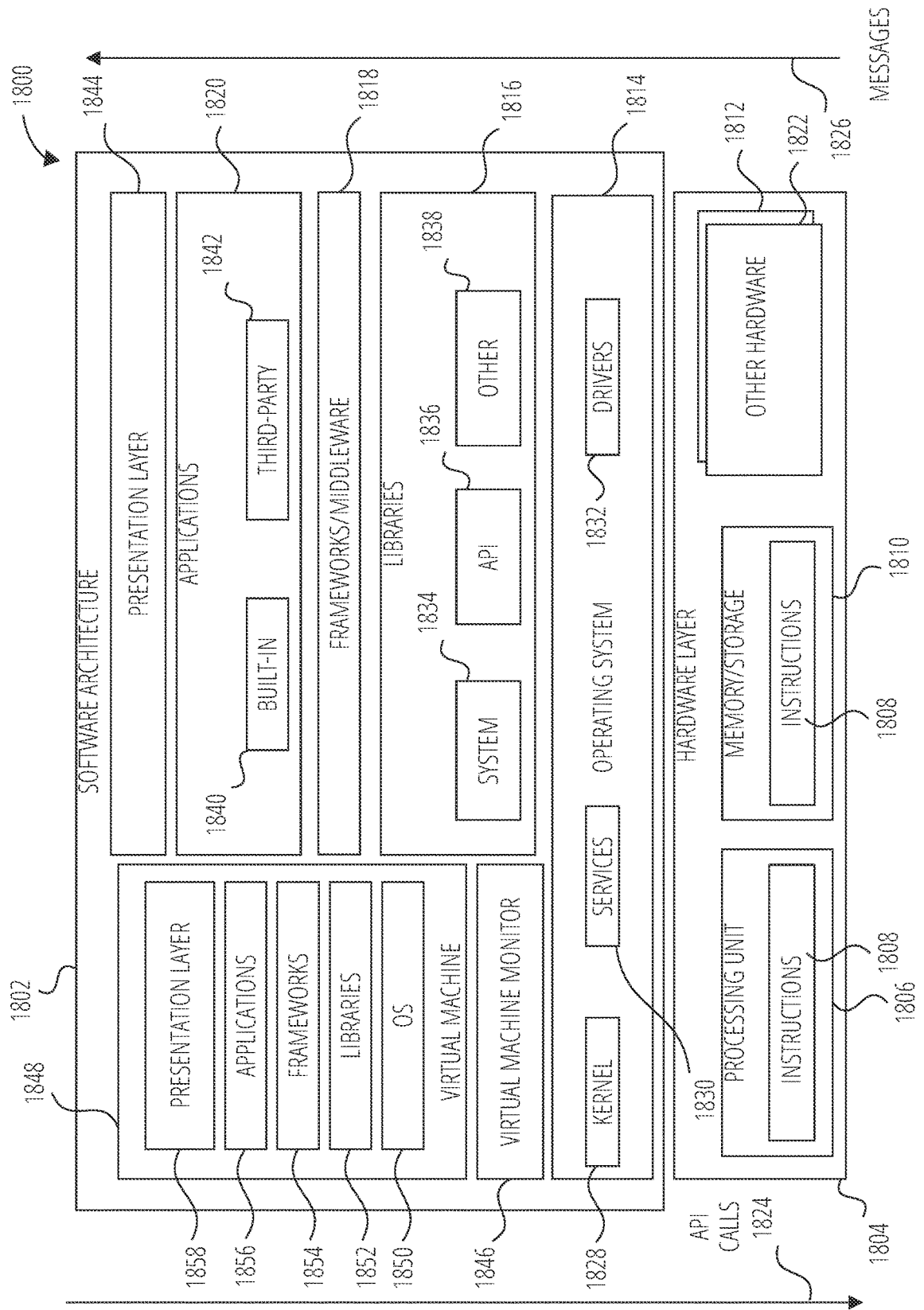
FIG. 18 is a block diagram showing a software architecture for a computing device, according to some examples.

Software Architecture 1802 (FIG. 18)

FIG. 18 is a block diagram 1800 showing a software architecture 1802 for a computing device, according to some examples. The software architecture 1802 may be used in conjunction with various hardware architectures, for example, as described herein. FIG. 18 is merely a non-limiting illustration of a software architecture, and many other architectures may be implemented to facilitate the functionality described herein. A representative hardware layer 1804 is illustrated and can represent, for example, any of the above referenced computing devices. In some examples, the hardware layer 1804 may be implemented according to the architecture of the computer system of FIG. 19.

The representative hardware layer 1804 comprises one or more processing units 1806 having associated executable instructions 1808. Executable instructions 1808 represent the executable instructions of the software architecture 1802, including implementation of the methods, modules, subsystems, and/or components, and so forth described herein and may also include memory and/or storage modules 1810, which also have executable instructions 1808. Hardware layer 1804 may also comprise other hardware as indicated by other hardware 1812 and other hardware 1822 which represent any other hardware of the hardware layer 1804, such as the other hardware illustrated or described as part of a computing device or computing system described herein.

In the architecture of FIG. 18, the software architecture 1802 may be conceptualized as a stack of layers where each layer provides particular functionality. For example, the software architecture 1802 may include layers such as an operating system 1814, libraries 1816, frameworks/middleware layer 1818, applications 1820, and presentation layer 1844. Operationally, the applications 1820 or other components within the layers may invoke calls, such as API calls 1824, through the software stack and access a response, returned values, and so forth illustrated as messages 1826 in response to the calls. The layers illustrated are representative in nature and not all software architectures have all layers. For example, some mobile or special purpose operating systems may not provide a frameworks/middleware layer 1818, while others may provide such a layer. Other software architectures may include additional or different layers.

The operating system 1814 may manage hardware resources and provide common services. The operating system 1814 may include, for example, a kernel 1828, services 1830, and drivers 1832. The kernel 1828 may act as an abstraction layer between the hardware and the other software layers. For example, the kernel 1828 may be responsible for memory management, processor management (e.g., scheduling), component management, networking, security settings, and so on. The services 1830 may provide other common services for the other software layers.

In some examples, the services 1830 include an interrupt service. The interrupt service may detect the receipt of an interrupt and, in response, cause the software architecture 1802 to pause its current processing and execute an interrupt service routine (ISR) when an interrupt is accessed.

The drivers 1832 may be responsible for controlling or interfacing with the underlying hardware. For instance, the drivers 1832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth, depending on the hardware configuration.

The libraries 1816 may provide a common infrastructure that may be utilized by the applications 1820 or other components or layers. The libraries 1816 typically provide functionality that allows other software modules to perform tasks in an easier fashion than to interface directly with the underlying operating system 1814 functionality (e.g., kernel 1828, services 1830, or drivers 1832). The libraries 1816 may include system libraries 1834 (e.g., C standard library) that may provide functions such as memory allocation functions, string manipulation functions, mathematical functions, and the like. In addition, the libraries 1816 may include Application Programming Interface (API) libraries 1836 such as media libraries (e.g., libraries to support presentation and manipulation of various media formats such as Moving Picture Experts Group Layer-4 (MPEG4), H.264, MP3, Advanced Audio Coding (AAC), Adaptive Multi-Rate (AMR), Joint Photographic Experts Group (JPG), Portable Network Graphics (PNG)), graphics libraries (e.g., an Open Graphics Library (OpenGL) framework that may be used to render two-dimensional and three-dimensional graphic content on a display), database libraries (e.g., SQLite that may provide various relational database functions), web libraries (e.g., WebKit that may provide web browsing functionality), and the like. The libraries 1816 may also include a wide variety of other libraries 1838 to provide many other APIs to the applications 1820 and other software components/modules.

The frameworks/middleware layer 1818 may provide a higher-level common infrastructure that may be utilized by the applications 1820 or other software components/modules. For example, the frameworks/middleware layer 1818 may provide various graphic user interface (GUI) functions, high-level resource management, high-level location services, and so forth. The frameworks/middleware layer 1818 may provide a broad spectrum of other interfaces, such as APIs, that may be utilized by the applications 1820 or other software components/modules, some of which may be specific to a particular operating system or platform.

The applications 1820 include built-in applications 1840 or third-party applications 1842. Examples of representative built-in applications 1840 may include, but are not limited to, a contacts application, a browser application, a book reader application, a location application, a media application, a messaging application, or a game application. Third-party applications 1842 may include any of the built-in applications as well as a broad assortment of other applications. In a specific example, the third-party application 1842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1842 may invoke the API calls 1824 provided by the mobile operating system such as operating system 1814 to facilitate functionality described herein.

The applications 1820 may utilize built in operating system functions (e.g., kernel 1828, services 1830, or drivers 1832), libraries (e.g., system libraries 1834, API libraries 1836, and other libraries 1838), and frameworks/middleware layer 1818 to create user interfaces to interact with users of the system. Alternatively, or additionally, in some systems, interactions with a user may occur through a presentation layer, such as presentation layer 1844. In these systems, the application/module "logic" can be separated from the aspects of the application/module that interact with a user.

Some software architectures utilize virtual machines. In the example of FIG. 18, this is illustrated by virtual machine 1848. A virtual machine creates a software environment where applications/modules can execute as if they were executing on a hardware computing device. A virtual machine is hosted by a host operating system (operating system 1814) and typically, although not always, has a virtual machine monitor 1846, which manages the operation of the virtual machine as well as the interface with the host operating system (e.g., operating system 1814). A software architecture executes within the virtual machine 1848 such as an operating system 1850, libraries 1852, frameworks/middleware 1854, applications 1856 or presentation layer 1858. These layers of software architecture executing within the virtual machine 1848 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations. It will be appreciated that the decision to implement a hardware-implemented module/component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 19:
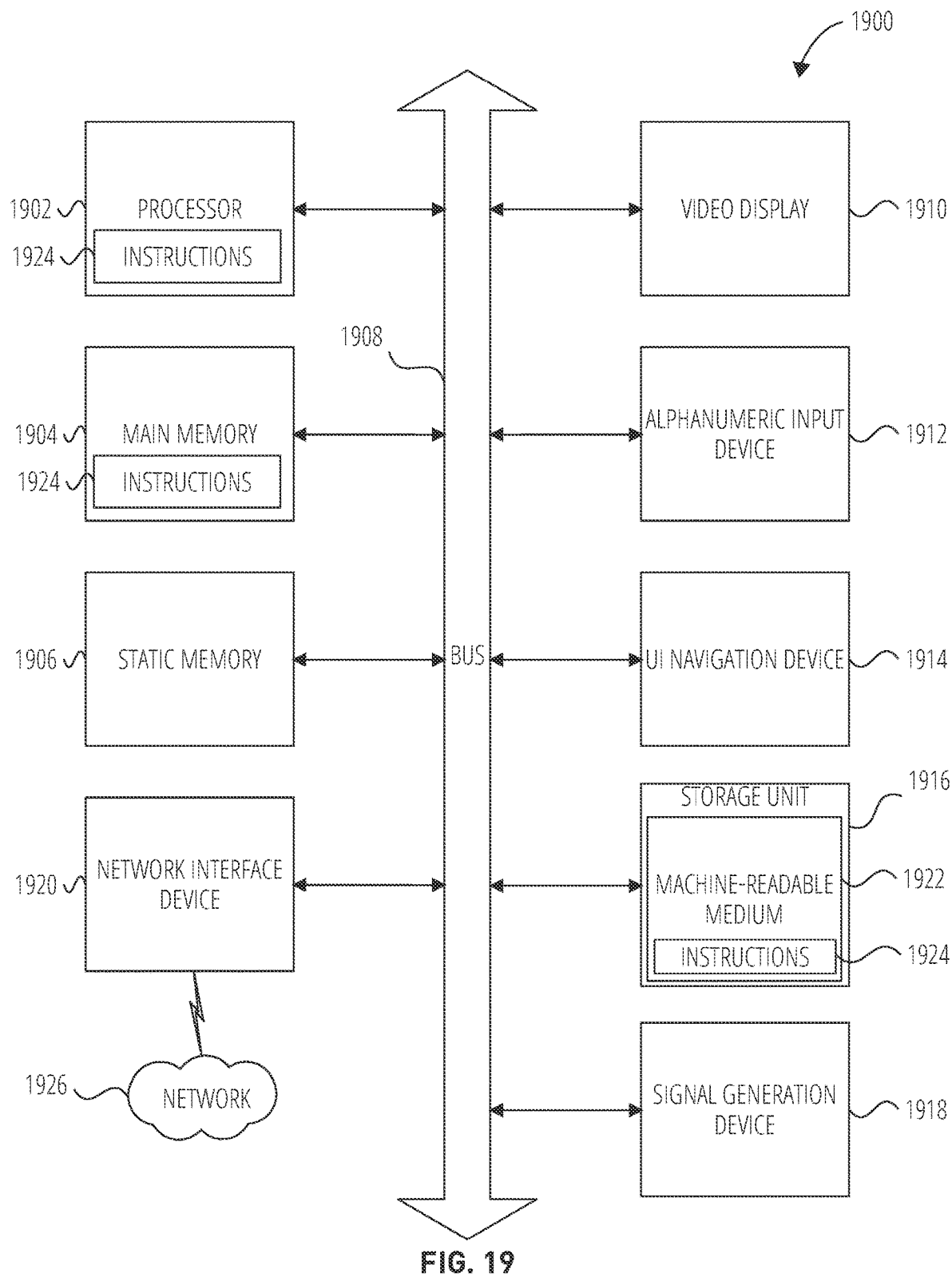
FIG. 19 is a block diagram of a machine in the form of a computer system, according to some examples, within which instructions may be executed for causing the machine to perform any one or more of the methodologies discussed herein.

Computer System 1900 (FIG. 19)

FIG. 19 is a block diagram of a machine in the example form of a computer system 1900 within which instructions 1924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902, a primary or main memory 1904, and a static memory 1906, which communicate with each other via a bus 1908. The computer system 1900 may further include a video display unit 1910 (e.g., a liquid crystal display (LCD) or a cathode ray tube (CRT)). The computer system 1900 may also include an alphanumeric input device 1912 (e.g., a keyboard or a touch-sensitive display screen), a UI navigation (or cursor control) device 1914 (e.g., a mouse), a storage unit 1916, a signal generation device 1918 (e.g., a speaker), and a network interface device 1920.

As used herein, the term "processor" may include any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

The storage unit 1916 includes a machine-readable medium 1922 on which is stored one or more sets of data structures and instructions 1924 (e.g., software) embodying or utilized by any one or more of the methodologies or functions described herein. The instructions 1924 may also reside, completely or at least partially, within the main memory 1904 or within the processor 1902 during execution thereof by the computer system 1900, with the main memory 1904 and the processor 1902 also each constituting a machine-readable medium 1922.

While the machine-readable medium 1922 is shown in accordance with some examples to be a single medium, the term "machine-readable medium" may include a single medium or multiple media (e.g., a centralized or distributed database, or associated caches and servers) that store the one or more instructions 1924 or data structures. The term "machine-readable medium" shall also be taken to include any tangible medium that is capable of storing, encoding, or carrying instructions 1924 for execution by the machine and that cause the machine to perform any one or more of the methodologies of the present disclosure, or that is capable of storing, encoding, or carrying data structures utilized by or associated with such instructions 1924. The term "machine-readable medium" shall accordingly be taken to include, but not be limited to, solid-state memories, and optical and magnetic media. Specific examples of a machine-readable medium 1922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1924 may further be transmitted or received over a communications network 1926 using a transmission medium. The instructions 1924 may be transmitted using the network interface device 1920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks. The term "transmission medium" shall be taken to include any intangible medium that is capable of storing, encoding, or carrying instructions 1924 for execution by the machine, and includes digital or analog communications signals or other intangible media to facilitate communication of such software.

Technical Advancements, Technical Solutions, and Integration into Practical Applications Examples of a digital therapy platform, such as the digital therapy platform 102 described herein, leverage advanced machine learning techniques to address the technical challenge of providing real-time, personalized, and contextually relevant feedback to patients during digital therapy sessions. In this regard, the platform's technical solutions may involve several components and processes that integrate a method into a practical application, such as:

Data collection and management: A practical application lies in the ability to provide a real-time, data-driven foundation for therapy feedback. By collecting and managing data from therapy sessions, the digital therapy platform 102 ensures that feedback is not based on generic templates but is instead tailored to the patient's actual performance and progress. This real-time data integration allows therapists to make informed decisions and adjust therapy plans on the fly, enhancing the overall effectiveness of the treatment.

Dynamic prompt generation: The dynamic generation of prompts is practically applied by enabling the digital therapy platform 102 to respond to the fluid nature of a therapy session. As patients perform exercises, their performance data can vary significantly. The platform's ability to generate prompts dynamically ensures that feedback is immediately relevant and personalized, which is crucial for maintaining patient engagement and motivation during therapy sessions.

Model integration: The integration of, for example, one or more LLMs into the digital therapy platform 102 serves the practical application of providing nuanced feedback that goes beyond simple encouragement. By understanding and processing natural language, the LLM can generate messages that resonate on a human level, offering empathy and support that can significantly impact a patient's therapy experience. This capability is particularly important in a digital setting where the absence of a human therapist could otherwise lead to a generic or less effective interaction.

Text-to-speech conversion: Converting text feedback into audio in real-time has the practical application of making the feedback more accessible and immediate for patients. This feature may be especially beneficial for patients who may be visually impaired or those who are engaged in exercises and unable to read a screen. The audio feedback mimics the experience of having a therapist present, providing a more immersive and supportive therapy session.

User interface and feedback delivery: The practical application delivered by, for example, the patient UI and feedback system 416, is to serve as the conduit for personalized therapy feedback. It is designed to be intuitive and user-friendly, accommodating patients' varying levels of technical proficiency. By delivering feedback through this interface, the platform ensures that patients receive the guidance they need in a format that is most useful to them, whether they are at home, in a clinic, or on the go.

Feedback customization and personalization: Customizing feedback, for example, by the recommendation customization and personalization system 410, to each patient's preferences and therapy goals has the practical application of making the therapy experience more relevant and effective. Personalized feedback has been shown to improve patient adherence to therapy regimens and can lead to better outcomes. By integrating patient-specific data into the feedback process, the platform ensures that each patient's unique therapy needs are met.

Healthcare provider interaction: The ability for healthcare providers to interact with the digital therapy platform 102 via the healthcare provider interaction interface 414 and adjust feedback is a practical application that ensures the digital therapy platform 102 remains a tool that complements professional medical care. Providers can oversee the automated feedback, make adjustments, and use the system's data to inform their clinical decisions, thereby maintaining the quality and efficacy of the therapy provided.

By integrating these technical features, the digital therapy platform may enable the real-time exchange of therapy-related information in a standardized format, regardless of the original input format. This practical application represents a tangible advancement in the technical field of digital therapy.

Furthermore, examples of a digital therapy platform, such as the digital therapy platform 102, utilize various techniques to overcome technical challenges associated with generating personalized, actionable recommendations for therapists managing digital therapy programs. In this regard, the platform's technical solutions may involve several components and processes that integrate a method into a practical application, such as:

Data collection and management: A practical application is found in the platform's ability to aggregate and interpret a wide range of patient data from various sources. By collecting and managing this data, the digital therapy platform ensures that recommendations are based on a comprehensive understanding of the patient's condition and therapy history. This integration of data sources allows therapists to receive a holistic view of the patient's progress, enabling precise adjustments to therapy plans and enhancing treatment effectiveness.

Event detection and recommendation generation: The practical application of event detection (e.g., by the event detection system 1108) and recommendation generation (e.g., by the recommendation customization and personalization system 1110) is realized by the platform's ability to identify significant patient events and generate corresponding recommendations. This dynamic response to patient data ensures that therapists are provided with timely and relevant suggestions for therapy adjustments, which may be useful for adapting to the patient's evolving needs and maintaining an effective therapy regimen.

Machine learning model integration: Integrating machine learning models, including LLMs, into the digital therapy platform serves the practical application of generating nuanced recommendations that consider the complexities of patient care. These models may process diverse data sets, including unstructured data such as clinical notes, to provide recommendations that are both clinically sound and tailored to the individual patient.

Therapist and patient interaction interface: Interfaces (e.g., as provided by the therapist UI and feedback system 1116) described herein are designed to be intuitive and user-friendly, ensuring that therapists and patients can easily understand and act upon the recommendations. By presenting information through these interfaces, the platform facilitates effective communication between an AI system and human users, enhancing a collaborative care process.

Recommendation customization and personalization: Customizing and personalizing recommendations, as facilitated by the recommendation customization and personalization system 1110, for example, has the practical application of making therapy management more patient-centric. Personalized recommendations are known to improve patient engagement and can lead to more successful therapy outcomes. By leveraging patient-specific data, the platform ensures that each recommendation is optimally aligned with the patient's unique therapy needs and preferences.

Adaptive digital therapy programs: Examples described herein provide a system that adaptively or dynamically modifies a patient's digital therapy program response to the patient's needs, progress, or challenges. This has the practical application of improving digital therapy.

By incorporating these technical features, the digital therapy platform may enable the generation and delivery of personalized recommendations in a standardized format, enhancing the practicality and effectiveness of digital therapy management.

The example digital therapy systems described herein address or alleviate the technical problem of providing personalized and contextually relevant feedback to patients during therapy sessions. Traditional systems often rely on static feedback mechanisms that do not account for the dynamic nature of a patient's progress or the specific context of their therapy session. This can result in feedback that is generic, non-motivational, and potentially less effective in promoting patient engagement and adherence to therapy regimens.

The solutions provided by the example systems involve a computer-implemented process that leverages real-time performance data, historical performance data, and advanced natural language processing capabilities of a generative model, such as an LLM, to generate personalized messages. This approach ensures that feedback is tailored to the individual patient's therapy journey, thereby enhancing the therapeutic experience, and potentially improving therapy outcomes.

Examples described herein integrate processing of performance data and the generation of natural language content into a practical application within the digital therapy system. At least one processor dynamically generates prompts that encapsulate both real-time and historical data, which are then provided to an LLM to produce personalized messages. This integration signifies that the method is directly tied to the operation of the digital therapy system, thereby providing a particular, practical application.

Examples described herein provide technical advantages by improving the interaction between the digital therapy system and the patient. By dynamically generating prompts that are informed by a comprehensive analysis of performance data, the example digital therapy platform 102 can provide feedback that is not only personalized but also delivered at impactful moments during the session. This represents an improvement in the technical field of digital therapy, as it provides a more engaging and adaptive feedback mechanism that is likely to encourage patient participation and adherence.

Example digital therapy systems described herein may also tackle the technical problem of generating actionable, personalized recommendations for therapists to manage patient care during sessions. Traditional systems may lack the capability to synthesize complex patient data into precise recommendations, which can lead to suboptimal therapy management and patient outcomes. These systems may not effectively utilize available patient data, resulting in a one-size-fits-all approach that fails to address the unique needs of each patient.

Examples described herein integrate the detection of patient events, the processing of diverse data sources, and the generation of personalized recommendations into a practical application within the digital therapy system. At least one processor is responsible for analyzing patient data to detect events that may require intervention and then using machine learning models, such as LLMs, to generate recommendations that are clinically relevant and personalized. This integration signifies that the method is tied to a particular, practical application that significantly improves therapy management. This also represents an improvement in the technical field of digital therapy management, as it provides a more sophisticated and adaptive recommendation system that may lead to more effective patient care.

Examples described herein go beyond the mere processing of data. The dynamic generation of prompts and the subsequent generation of personalized messages by an LLM are specific applications that provide a technological benefit to the field of digital therapy. These features are meaningful because they directly address the need for real-time, personalized feedback in digital therapy, which is a known challenge in the field. Furthermore, the detection of patient events, the integration of machine learning models, and the generation of personalized recommendations are specific applications that provide a technological benefit to the field of digital therapy. These features are meaningful because they directly address the need for sophisticated, data-driven recommendations in digital therapy, which is a recognized challenge in the field.

In conclusion, described examples relate to specific methods and systems of improving digital therapy systems. The operations, when taken as a whole, represent more than the sum of their parts and provide a specific, practical application that improves the functioning of the digital therapy system.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a computer-implemented method for facilitating personalized digital therapy, the method comprising: collecting, by at least one processor, patient data from a plurality of data sources associated with a patient profile of a patient in a digital therapy platform; processing, by the at least one processor, at least a subset of the patient data to detect a patient event; in response to detecting the patient event, generating, by the at least one processor and using at least one machine learning model, a personalized recommendation associated with the patient profile; invoking, by the at least one processor and based at least partially on the personalized recommendation, an action in the digital therapy platform; adjusting, by the at least one processor, the patient profile to reflect the action; and causing, by the at least one processor, presentation of at least one of a first indication of the action at a first device associated with a therapist assigned to the patient profile or a second indication of the action at a second device associated with the patient.

In Example 2, the subject matter of Example 1 includes, prior to invoking the action in the digital therapy platform: causing, by the at least one processor, presentation of the personalized recommendation in a patient management user interface of the digital therapy platform at the first device.

In Example 3, the subject matter of any of Examples 1-2 includes, wherein the personalized recommendation comprises at least one of: a recommended digital therapy program for the patient, a recommended modification of a digital therapy program of the patient, or a personalized message recommended for transmission to the patient.

In Example 4, the subject matter of any of Examples 1-3 includes, wherein the personalized recommendation comprises a recommended digital therapy program for the patient, and the method further comprises: causing, by the at least one processor, presentation of the recommended digital therapy program at the first device associated with the therapist; and receiving, by the at least one processor, user input from the first device indicating approval of the recommended digital therapy program, wherein the action comprises automatic assignment of a digital therapy program to the patient profile in response to the receiving of the user input from the first device, the assigned digital therapy program corresponding to the recommended digital therapy program, and wherein the adjustment of the patient profile comprises updating the patient profile to include details of the digital therapy program.

In Example 5, the subject matter of Example 4 includes, wherein the patient data is updated over time to include performance data of the patient related to one or more sessions of the assigned digital therapy program, and the method further comprises: processing, by the at least one processor, at least some of the updated patient data to detect a further patient event in the digital therapy platform; in response to detecting the further patient event, generating, by the at least one processor and using the at least one machine learning model, a further personalized recommendation associated with the patient profile, the further personalized recommendation comprising at least one of a recommended modification to the assigned digital therapy program or a personalized message recommended for transmission to the patient; and causing, by the at least one processor, presentation of the at least one of the recommended modification or the personalized message at the first device associated with the therapist.

In Example 6, the subject matter of any of Examples 1-5 includes, wherein the personalized recommendation comprises a recommended modification to a digital therapy program of the patient, and the method further comprises causing, by the at least one processor, presentation of the recommended modification to the digital therapy program at the first device associated with the therapist; and receiving, by the at least one processor, user input from the first device indicating approval of the recommended modification to the digital therapy program, wherein the action comprises modification of the digital therapy program in response to the receiving of the user input from the first device, and the adjustment of the patient profile comprises updating the patient profile to include details of the modification of the digital therapy program.

In Example 7, the subject matter of any of Examples 1-6 includes, wherein the personalized recommendation comprises a personalized message recommended for transmission to the patient, and the method further comprises: causing, by the at least one processor, presentation of the personalized message at the first device associated with the therapist; and receiving, by the at least one processor, user input from the first device indicating approval of the personalized message, wherein the action comprises automatic transmission of the personalized message to the second device associated with the patient in response to the receiving of the user input from the first device, and the adjustment of the patient profile comprises storing the personalized message in association with the patient profile.

In Example 8, the subject matter of any of Examples 1-7 includes, causing, by the at least one processor, presentation of the personalized recommendation at the first device associated with the therapist; and enabling, by the at least one processor, the therapist to modify the personalized recommendation prior to invoking the action in the digital therapy platform.

In Example 9, the subject matter of Example 8 includes, receiving, by the at least one processor, user input from the first device indicating a modification of the personalized recommendation; and modifying, by the at least one processor, the personalized recommendation based on the user input, wherein the action is invoked in the digital therapy platform based on the modified personalized recommendation.

In Example 10, the subject matter of any of Examples 1-9 includes, wherein the at least one machine learning model comprises at least one large language model (LLM).

In Example 11, the subject matter of any of Examples 1-10 includes, wherein the at least one machine learning model comprises an LLM, and the method further comprises: dynamically generating, by the at least one processor, a prompt comprising at least some of the patient data and an instruction for generating the personalized recommendation; and providing, by the at least one processor, the prompt to the LLM to obtain the personalized recommendation.

In Example 12, the subject matter of any of Examples 1-11 includes, wherein the personalized recommendation comprises a personalized message recommended for transmission to the patient, the invoking of the action comprises triggering transmission of the personalized message, and the method comprises causing presentation of the second indication of the action at the second device associated with the patient, the second indication comprising a notification that includes the personalized message.

In Example 13, the subject matter of Example 12 includes, wherein the at least one machine learning model comprises an LLM, the personalized message is generated using the LLM, and the method further comprises: receiving, by the at least one processor, a follow-up question from the patient in natural language format; generating, by the at least one processor and using the LLM, a response to the follow-up question; and causing presentation, by the at least one processor, of a further notification at the second device that includes the response generated using the LLM.

In Example 14, the subject matter of any of Examples 1-13 includes, wherein the first device and the second device each execute a digital therapy application, the second device including or being communicatively coupled to one or more sensors used to obtain at least one of motion data or patient feedback data from the patient during one or more sessions, the at least one of motion data or patient feedback data being collected as part of the patient data.

In Example 15, the subject matter of any of Examples 1-14 includes, wherein the personalized recommendation is automatically generated for the therapist by a patient management system of the digital therapy platform, and the patient management system is configured to communicate with a patient messaging system that transmits personalized messages to the patient during one or more sessions.

In Example 16, the subject matter of any of Examples 1-15 includes, wherein the plurality of data sources comprises a first data source comprising structured data and a second data source comprising unstructured data, and the at least one machine learning model processes the structured data and the unstructured data to generate the personalized recommendation.

In Example 17, the subject matter of any of Examples 1-16 includes, wherein the patient data comprises one or more of: data describing a therapy goal of the patient, data describing a baseline condition of the patient, data describing changes in a condition of the patient, motion data of the patient, patient feedback data, or performance data of the patient related to one or more sessions, wherein the performance data comprises data describing one or more of range of motion, pelvic floor muscle movement, exercise completion data, or movement accuracy.

In Example 18, the subject matter of any of Examples 1-17 includes, wherein the patient event comprises one of a plurality of predetermined patient events defined in the digital therapy platform, the plurality of predetermined patient events comprising one or more of: an onboarding event, completion of a session, completion of a scheduled assessment, improvement of a condition of the patient, deterioration of a condition of the patient, lack of participation in a digital therapy program, receipt of a message from the patient, or receipt of a therapy kit by the patient.

Example 19 is a system comprising: at least one processor; and at least one memory storing instructions that, when executed by the at least one processor, configure the system to perform operations comprising: collecting patient data from a plurality of data sources associated with a patient profile of a patient in a digital therapy platform; processing at least a subset of the patient data to detect a patient event; in response to detecting the patient event, generating, using at least one machine learning model, a personalized recommendation associated with the patient profile; invoking, based at least partially on the personalized recommendation, an action in the digital therapy platform; adjusting the patient profile to reflect the action; and causing presentation of at least one of a first indication of the action at a first device associated with a therapist assigned to the patient profile or a second indication of the action at a second device associated with the patient.

Example 20 is a non-transitory machine-readable storage medium, the machine-readable storage medium including instructions that when executed by a computer system, cause the computer system to perform operations comprising: collecting patient data from a plurality of data sources associated with a patient profile of a patient in a digital therapy platform; processing at least a subset of the patient data to detect a patient event; in response to detecting the patient event, generating, using at least one machine learning model, a personalized recommendation associated with the patient profile; invoking, based at least partially on the personalized recommendation, an action in the digital therapy platform; adjusting the patient profile to reflect the action; and causing presentation of at least one of a first indication of the action at a first device associated with a therapist assigned to the patient profile or a second indication of the action at a second device associated with the patient.

In Example 21, the subject matter of Example 11 includes, wherein the prompt comprises a request to provide the personalized recommendation together with one or more reasons for providing the personalized recommendation, and the method further comprises causing, by the at least one processor, presentation of the one or more reasons at the first device associated with the therapist.

Example 22 is at least one machine-readable medium including instructions that, when executed by processing circuitry, cause the processing circuitry to perform operations to implement any of Examples 1-21.

Example 23 is an apparatus comprising means to implement any of Examples 1-21.

Example 24 is a system to implement any of Examples 1-21.

Example 25 is a method to implement any of Examples 1-21.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the term "example" merely for convenience and without intending to voluntarily limit the scope of this application to any single example or concept if more than one is in fact disclosed.

Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may include actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, such as those depicted in the drawings, may include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" may be used to refer to elements in the drawings of this disclosure for ease of reference and it will be appreciated that each "operation" may identify one or more operations, processes, actions, or steps, and may be performed by one or multiple components.

As used in this disclosure, the term "machine learning model" (or simply "model") may include a single, stand-alone model, or a combination of models. The term may also refer to a system, component or module that includes a machine learning model together with one or more supporting or supplementary components that do not necessarily perform machine learning tasks.

What is claimed is:

1. A computer-implemented method for facilitating personalized digital therapy, the method comprising:
   providing, by at least one processor, to a first device associated with a therapist and to a second device associated with a patient, remote access to a digital therapy platform that enables digital therapy to be delivered to the patient, the therapist being assigned to a patient profile of the patient;
   automatically collecting, by the at least one processor, patient data from a plurality of data sources associated with the patient profile of the patient in the digital therapy platform;
   processing, by the at least one processor, at least a subset of the patient data to detect a patient event;
   in response to detecting the patient event, automatically generating, by the at least one processor and using at least one generative machine learning model, a personalized recommendation comprising at least one of a recommended digital therapy program for the patient, a recommended modification of a digital therapy program of the patient, or a personalized message recommended for transmission to the patient, wherein the at least one generative machine learning model comprises a transformer-based Large Language Model (LLM), and the automatic generation of the personalized recommendation comprises:
     dynamically generating, by the at least one processor, a prompt for processing by the transformer-based LLM, the prompt comprising at least some of the patient data and the prompt further comprising an instruction for generating the personalized recommendation, and
     providing, by the at least one processor, the prompt to the transformer-based LLM such that the transformer-based LLM processes the prompt and automatically generates the personalized recommendation;
   invoking, by the at least one processor and based at least partially on the personalized recommendation, an action in the digital therapy platform;
   automatically adjusting, by the at least one processor, the patient profile to reflect the action; and
   causing, by the at least one processor, presentation of at least one of a first indication of the action at the first device or a second indication of the action at the second device.

2. The method of claim 1, further comprising, prior to invoking the action in the digital therapy platform:
   causing, by the at least one processor, presentation of the personalized recommendation in a patient management user interface of the digital therapy platform at the first device.

3. The method of claim 1, wherein the personalized recommendation comprises the recommended digital therapy program for the patient, and the method further comprises:
   causing, by the at least one processor, presentation of the recommended digital therapy program at the first device associated with the therapist; and
   receiving, by the at least one processor, user input from the first device indicating approval of the recommended digital therapy program,
   wherein the action comprises automatic assignment of the digital therapy program to the patient profile in response to the receiving of the user input from the first device, the assigned digital therapy program corresponding to the recommended digital therapy program, and wherein the adjustment of the patient profile comprises updating the patient profile to include details of the digital therapy program.

4. The method of claim 3, wherein the patient data is updated over time to include performance data of the patient related to one or more sessions of the assigned digital therapy program, and the method further comprises:
   processing, by the at least one processor, at least some of the updated patient data to detect a further patient event in the digital therapy platform;
   in response to detecting the further patient event, automatically generating, by the at least one processor and using the at least one generative machine learning model, a further personalized recommendation associated with the patient profile, the further personalized recommendation comprising at least one of a recommended modification to the assigned digital therapy program or a personalized message recommended for transmission to the patient; and
   causing, by the at least one processor, presentation of the at least one of the recommended modification or the personalized message at the first device associated with the therapist.

5. The method of claim 1, wherein the personalized recommendation comprises the recommended modification to the digital therapy program of the patient, and the method further comprises:
   causing, by the at least one processor, presentation of the recommended modification to the digital therapy program at the first device associated with the therapist; and
   receiving, by the at least one processor, user input from the first device indicating approval of the recommended modification to the digital therapy program,
   wherein the action comprises modification of the digital therapy program in response to the receiving of the user input from the first device, and the adjustment of the patient profile comprises updating the patient profile to include details of the modification of the digital therapy program.

6. The method of claim 1, wherein the personalized recommendation comprises the personalized message recommended for transmission to the patient, and the method further comprises:
   causing, by the at least one processor, presentation of the personalized message at the first device associated with the therapist; and receiving, by the at least one processor, user input from the first device indicating approval of the personalized message, wherein the action comprises automatic transmission of the personalized message to the second device associated with the patient in response to the receiving of the user input from the first device, and the adjustment of the patient profile comprises storing the personalized message in association with the patient profile.

7. The method of claim 1, further comprising:

causing, by the at least one processor, presentation of the personalized recommendation at the first device associated with the therapist; and enabling, by the at least one processor, the therapist to modify the personalized recommendation prior to invoking the action in the digital therapy platform.

8. The method of claim 7, further comprising:

receiving, by the at least one processor, user input from the first device indicating a modification of the personalized recommendation; and modifying, by the at least one processor, the personalized recommendation based on the user input, wherein the action is invoked in the digital therapy platform based on the modified personalized recommendation.

9. The method of claim 1, wherein the prompt further comprises a request to provide the personalized recommendation together with one or more reasons for providing the personalized recommendation, the transformer-based LLM automatically generates the one or more reasons, and the method further comprises:

causing, by the at least one processor, presentation of the one or more reasons at the first device associated with the therapist.

10. The method of claim 1, wherein the personalized recommendation comprises the personalized message recommended for transmission to the patient, the invoking of the action comprises triggering transmission of the personalized message, and the method comprises causing presentation of the second indication of the action at the second device associated with the patient, the second indication comprising a notification that includes the personalized message.

11. The method of claim 10, wherein the method further comprises:

receiving, by the at least one processor, a follow-up question from the patient in natural language format;

generating, by the at least one processor and using the transformer-based LLM, a response to the follow-up question; and causing presentation, by the at least one processor, of a further notification at the second device that includes the response generated using the transformer-based LLM.

12. The method of claim 1, wherein the first device and the second device each execute a digital therapy application, the second device including or being communicatively coupled to one or more sensors used to obtain at least one of motion data or patient feedback data from the patient during one or more sessions, the at least one of motion data or patient feedback data being collected as part of the patient data.

13. The method of claim 1, wherein the personalized recommendation is automatically generated for the therapist by a patient management system of the digital therapy platform, and the patient management system is configured to communicate with a patient messaging system that transmits personalized messages to the patient during one or more sessions.

14. The method of claim 1, wherein the patient data comprises one or more of: data describing a therapy goal of the patient, data describing a baseline condition of the patient, data describing changes in a condition of the patient, motion data of the patient, patient feedback data, or performance data of the patient related to one or more sessions, wherein the performance data comprises data describing one or more of range of motion, pelvic floor muscle movement, exercise completion data, or movement accuracy.

15. The method of claim 1, wherein the patient event comprises one of a plurality of predetermined patient events defined in the digital therapy platform, the plurality of predetermined patient events comprising one or more of: an onboarding event, completion of a session, completion of a scheduled assessment, improvement of a condition of the patient, deterioration of a condition of the patient, lack of participation in the digital therapy program, receipt of a message from the patient, or receipt of a therapy kit by the patient.

16. The method of claim 1, wherein the dynamic generation of the prompt comprises:

accessing a base prompt structure associated with a scenario type of the patient event, the scenario type being one of a plurality of supported scenario types; and dynamically integrating at least some of the patient data into the base prompt structure.

17. The method of claim 1, wherein the prompt comprises:

a system prompt that includes the instruction;

a scenario descriptor associated with the patient event; and a user prompt that includes at least some of the patient data, the method comprising dynamically combining the system prompt, the scenario descriptor, and the user prompt to define the prompt for the transformer-based LLM.

18. A system comprising:

at least one processor; and at least one memory storing instructions that, when executed by the at least one processor, configure the system to perform operations comprising:

providing, to a first device associated with a therapist and to a second device associated with a patient, remote access to a digital therapy platform that enables digital therapy to be delivered to the patient, the therapist being assigned to a patient profile of the patient;

automatically collecting patient data from a plurality of data sources associated with the patient profile of the patient in the digital therapy platform;

processing at least a subset of the patient data to detect a patient event;

in response to detecting the patient event, automatically generating, using at least one generative machine learning model, a personalized recommendation comprising at least one of a recommended digital therapy program for the patient, a recommended modification of a digital therapy program of the patient, or a personalized message recommended for transmission to the patient, wherein the at least one generative machine learning model comprises a transformer-based Large Language Model (LLM), and the automatic generation of the personalized recommendation comprises:

dynamically generating a prompt for processing by the transformer-based LLM, the prompt comprising at least some of the patient data and the prompt further comprising an instruction for generating the personalized recommendation, and providing the prompt to the transformer-based LLM such that the transformer-based LLM processes the prompt and automatically generates the personalized recommendation;

invoking, based at least partially on the personalized recommendation, an action in the digital therapy platform;

automatically adjusting the patient profile to reflect the action; and causing presentation of at least one of a first indication of the action at the first device or a second indication of the action at the second device.

19. A non-transitory machine-readable storage medium, the machine-readable storage medium including instructions that when executed by a computer system, cause the computer system to perform operations comprising:

providing, to a first device associated with a therapist and to a second device associated with a patient, remote access to a digital therapy platform that enables digital therapy to be delivered to the patient, the therapist being assigned to a patient profile of the patient;

automatically collecting patient data from a plurality of data sources associated with the patient profile of the patient in the digital therapy platform;

processing at least a subset of the patient data to detect a patient event;

in response to detecting the patient event, automatically generating, using at least one generative machine learning model, a personalized recommendation comprising at least one of a recommended digital therapy program for the patient, a recommended modification of a digital therapy program of the patient, or a personalized message recommended for transmission to the patient, wherein the at least one generative machine learning model comprises a transformer-based Large Language Model (LLM), and the automatic generation of the personalized recommendation comprises:

dynamically generating a prompt for processing by the transformer-based LLM, the prompt comprising at least some of the patient data and the prompt further comprising an instruction for generating the personalized recommendation, and providing the prompt to the transformer-based LLM such that the transformer-based LLM processes the prompt and automatically generates the personalized recommendation;

invoking, based at least partially on the personalized recommendation, an action in the digital therapy platform;

automatically adjusting the patient profile to reflect the action; and causing presentation of at least one of a first indication of the action at the first device or a second indication of the action at the second device.

* * * * *